United States Patent
Liu

(10) Patent No.: US 12,500,514 B2
(45) Date of Patent: Dec. 16, 2025

(54) SYSTEM AND METHODS FOR USING A MEMS SWITCH AS AN IDEAL DIODE

(71) Applicant: DIGIQ POWER LTD., Kingston (CA)

(72) Inventor: Yan-Fei Liu, Kingston (CA)

(73) Assignee: DIGIQ POWER LTD., Kingston (CA)

( * ) Notice: Subject to any disclaimer, the term of this patent is extended or adjusted under 35 U.S.C. 154(b) by 0 days.

(21) Appl. No.: 19/020,314

(22) PCT Filed: Jul. 19, 2024

(86) PCT No.: PCT/CA2024/050966
§ 371 (c)(1),
(2) Date: Jan. 14, 2025

(87) PCT Pub. No.: WO2025/076614
PCT Pub. Date: Apr. 17, 2025

(65) Prior Publication Data
US 2025/0260313 A1    Aug. 14, 2025

Related U.S. Application Data

(60) Provisional application No. 63/543,498, filed on Oct. 10, 2023.

(51) Int. Cl.
*H02M 1/42* (2007.01)
*H02M 1/00* (2006.01)
(Continued)

(52) U.S. Cl.
CPC ....... *H02M 1/4233* (2013.01); *H02M 1/0048* (2021.05); *H02M 1/0058* (2021.05);
(Continued)

(58) Field of Classification Search
CPC ............ H02M 1/4225; H02M 1/0048; H02M 1/0067; H02M 1/4233; H02M 7/219;
(Continued)

(56) References Cited

U.S. PATENT DOCUMENTS 5,047,913 A * 9/1991 De Doncker ....... H02M 7/5152
  363/138
5,572,417 A * 11/1996 Vinciarelli ............ H02M 7/217
  323/222

(Continued)

OTHER PUBLICATIONS

Patent Cooperation Treaty, International Search Report and Written Opinion, dated Sep. 10, 2024.

*Primary Examiner* — Yusef A Ahmed
(74) *Attorney, Agent, or Firm* — Norton Rose Fulbright Canada LLP

(57) ABSTRACT

A system and method for converting an input AC voltage of a voltage source into an output DC voltage is proposed. The proposed system and method include at least two MEMS switches coupled in parallel with a corresponding voltage clamp switch within a MEMS rectifier. The MEMS switches achieve Zero-Voltage-Zero-Current (ZVZC) Turn on and Zero-Current-Zero-Voltage (ZCZV) Turn off through the inclusion of at least one high frequency switch and a current diverting circuit which ensure that when the at least two MEMS switches transition between an on-state and off-state there is no voltage or current present in the at least two MEMS switches.

20 Claims, 44 Drawing Sheets

(51) Int. Cl.
*H02M 1/08* (2006.01)
*H02M 1/32* (2007.01)
*H02M 3/156* (2006.01)
*H02M 3/335* (2006.01)
*H02M 7/219* (2006.01)

(52) U.S. Cl.
CPC ......... *H02M 1/0067* (2021.05); *H02M 1/083* (2013.01); *H02M 1/32* (2013.01); *H02M 1/4225* (2013.01); *H02M 3/156* (2013.01); *H02M 3/33571* (2021.05); *H02M 7/219* (2013.01)

(58) Field of Classification Search
CPC .... H02M 1/0058; H02M 1/007; H02M 1/083; H02M 1/32; H02M 3/01; H02M 3/156; H02M 3/33571
See application file for complete search history.

(56) References Cited

U.S. PATENT DOCUMENTS

| | | | | |
|---|---|---|---|---|
| 6,111,770 A * | 8/2000 | Peng | ............... | H02M 7/4826 |
| | | | | 363/138 |
| 7,215,560 B2 * | 5/2007 | Soldano | ............. | H02M 1/4225 |
| | | | | 363/44 |
| 8,363,434 B2 * | 1/2013 | Lin | ................... | H02M 1/4208 |
| | | | | 363/44 |
| 9,343,995 B2 * | 5/2016 | Banno | ................ | H02M 5/458 |
| 9,490,694 B2 * | 11/2016 | Alam | ................... | H02M 1/44 |
| 11,381,175 B2 * | 7/2022 | Jang | ................ | H02M 1/4233 |
| 12,184,195 B2 * | 12/2024 | Gonthier | ............ | H02M 1/4233 |
| 2007/0279955 A1 * | 12/2007 | Liu | ................... | H02M 1/4225 |
| | | | | 363/125 |
| 2012/0013369 A1 * | 1/2012 | Coteus | ............. | H02M 3/33592 |
| | | | | 327/109 |
| 2012/0063175 A1 * | 3/2012 | Wang | ............... | H02M 3/33592 |
| | | | | 363/21.14 |
| 2012/0262954 A1 * | 10/2012 | Duvnjak | ........... | H02M 1/4258 |
| | | | | 363/21.02 |
| 2014/0268959 A1 | 9/2014 | Frohman et al. | | |
| 2015/0249394 A1 * | 9/2015 | Liu | ................... | H02M 3/3376 |
| | | | | 363/21.02 |
| 2015/0263605 A1 * | 9/2015 | Alam | ................ | H02M 3/33546 |
| | | | | 363/21.02 |
| 2017/0126134 A1 | 5/2017 | Young | | |
| 2017/0288557 A1 * | 10/2017 | Fang | ................... | H02M 1/15 |
| 2017/0302177 A1 * | 10/2017 | LaBella | .............. | H02M 1/08 |
| 2018/0248472 A1 * | 8/2018 | Qiu | ..................... | H02M 1/143 |
| 2019/0260303 A1 * | 8/2019 | Chen | .................. | H02M 7/217 |
| 2020/0098968 A1 * | 3/2020 | Despesse | ........... | H10N 30/804 |
| 2020/0366079 A1 * | 11/2020 | Telefus | ............. | H02J 13/00022 |
| 2020/0395839 A1 * | 12/2020 | Ayyanar | ............ | H02M 1/4208 |
| 2022/0345026 A1 * | 10/2022 | Sadilek | ............. | H02M 1/4233 |
| 2022/0399826 A1 | 12/2022 | Oisson | | |

* cited by examiner

PRIOR ART

SYSTEM AND METHODS FOR USING A MEMS SWITCH AS AN IDEAL DIODE

CROSS REFERENCE

This application is a non-provisional of, and claims priority to, U.S. provisional Patent Application Ser. No. 63/543,498, entitled "USING MEMS SWITCH AS AN IDEAL DIODE", filed Oct. 10, 2023, the entire content of which is hereby incorporated by reference.

FIELD

Embodiments of the present disclosure relate to the field of electrical circuitry, and more specifically, embodiments relate to devices, systems and methods for improved AC to DC converters.

INTRODUCTION

AC-to-DC converters are a widely used component in electrical circuitry. In an AC-to-DC converter, the AC voltage is rectified (i.e. converted) into a DC voltage which flows in only one direction. Diodes, such as silicon diodes, are typically used in electrical circuits to convert an AC voltage source into a DC voltage.

A typical forward voltage drop of a diode is around 0.7V, leading to a power loss across the diode which can impact circuit performance. This power loss translates into extra heat, which is not desirable as it may damage other circuit components or require additional components including heat shielding.

SUMMARY

MEMS (Micro-Electro-Mechanical-System) power switch are exceptionally small devices that incorporate mechanical and electrical components into a single microchip. A MEMS switch may operate as a mechanical switch containing a plurality of metal branches (such as about 100 branches) that are housed within a small package and are connected in parallel to carry current. MEMS switches may have a low on-resistor (Rds) when it is in the on-state, the Rds can be around 10 times smaller than the Rds of a MOSFET. MEMS switches can also withstand both positive and negative voltage (a bi-directional switch). The state of MEMS switch (on-state, off-state) is controlled by a gate signal. When the gate voltage is high, such as 80V, the MEMS switch is in an on-state and conducting current. When the gate voltage is low, such as 0V, the MEMS switch is in an off-state and no current flows through it.

However, MEMS switches may be unable to withstand hard switching. In other words, it must change state (from on-state to off-state, or from-off state to on-state) when the voltage across it is close to zero, such as less than 1V. Extra circuits may be needed to use MEMS switches to act as a diode for operating in an AC-to-DC rectifier, when the MEMS switches will change state at either 50 Hz or 60 Hz.

Embodiments described herein introduce a circuit topology and control strategy for an AC-to-DC Boost converter having MEMS switches.

Structural components include, but are not limited to at least two MEMS rectifiers each housing a MEMS switch and voltage clamp switch configured in parallel. A current diverting circuit comprising at least one switch, and at least one high frequency switch. A voltage source generating an input AC voltage and current to the converter circuit, and a voltage output terminal.

In some embodiments, the MEMS rectifiers may be arranged in a totem pole converter circuit topology. In some embodiments, the converter circuit contains two MEMS rectifiers connected in series. In a further embodiment, the current diverting circuit shares a common node with both MEMS rectifiers and is connected in series with the voltage source. In a further embodiment, there are two high frequency switches sharing a common node connected to the voltage source and both being connected in series with a respective MEMS rectifier. In some embodiments, the converter circuit may have a capacitor connected in parallel with the two MEMS rectifiers.

In some embodiments, the converter circuit contains four MEMS rectifiers arranged in a full bridge configuration, where two nodes of the bridge connect to the voltage source, and two nodes of the bridge connect to the current diverting circuit. In a further embodiment, the current diverting circuit is connected in parallel with two of the four MEMS rectifiers. In some embodiments, the current diverting circuit has two switches. In some embodiments, the current diverting circuit has a single switch. In some embodiments, the at least one high frequency switch is connected in parallel with the current diverting circuit. In some embodiments, an inductor is connected in series with the at least one high frequency switch and the current diverting circuit, and a capacitor is connected in parallel with the at least one high frequency switch and the current diverting circuit.

In use, the MEMS switches, voltage clamp switches, current diverting switch, and at least one frequency switching device interoperate to perform steps of a method including, but not limited to when the input AC voltage is in a zero crossing period, the current diverting switch is transitioned to the on-state and diverts the input AC current from the MEMS rectifiers. The current through the MEMS rectifiers is therefore about zero before the MEMS switch begins to transition between the on-state and off-state. Before initiating the transition of the MEMS switch, the corresponding voltage clamp switch transitions to the on-state. Due to the current diverting circuit also being in the on-state, the current through the voltage clamp switch is about zero, and therefore the voltage clamp switch clamps the terminal voltage of the corresponding MEMS switch to about zero. The MEMS switch can now transition between the on-state and off-state in a low stress condition as the current and voltage across the MEMS switch are both about zero. In practical operation, two or more MEMS rectifiers can be configured in a circuit along with a current diverting circuit and at least one high frequency switch to create an AC-to-DC Boost converter having MEMS switches capable of transitioning between an on-state and off-state with reduced stress.

In some embodiments, the voltage clamp switch is either a MOSFET or a diode.

In some embodiments, the MEMS switches and voltage clamp switches, the current diverting circuit, and the at least one high frequency switch transition between an on-state and an off-state based on a corresponding gate voltage.

In some embodiments, the corresponding gate voltage is generated by a control circuit based at least on the input AC voltage, an input AC current and the output DC voltage. In some embodiments, the control circuit generates the corresponding gate voltage for at least one of the MEMS switches and voltage clamp switches, the current diverting circuit, and the at least one high frequency switch when the input AC voltage is −5V or +5V. In some embodiments, the control circuit generates the corresponding gate voltage for at least one of the MEMS switches and voltage clamp switches, the current diverting circuit, and the at least one high frequency switch when the input AC voltage is between −1V to −10V or +1V to +10V.

In some embodiments, the circuit is operated in discontinuous conduction mode and the at least one high frequency switch has a switching frequency of about 100 KHz.

In some embodiments, an input AC current from the voltage source has the same sinusoidal waveform as the input AC voltage.

In some embodiments, the current rating of the voltage clamp switches is 5 to 10 times smaller than the current rating for the at least one high frequency switch and the MEMS switches.

In some embodiments, the voltage clamp switches have an Rds value that is about 10% to 20% of the Rds value for the at least one high frequency switch.

The system may operate in household charging circuits including USB type C power adapters for personal use devices (phone, tablets, computers), power supply environments including for large infrastructure centers such as data centers, and for high power charging environments such as fast chargers for electric vehicles.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1A:
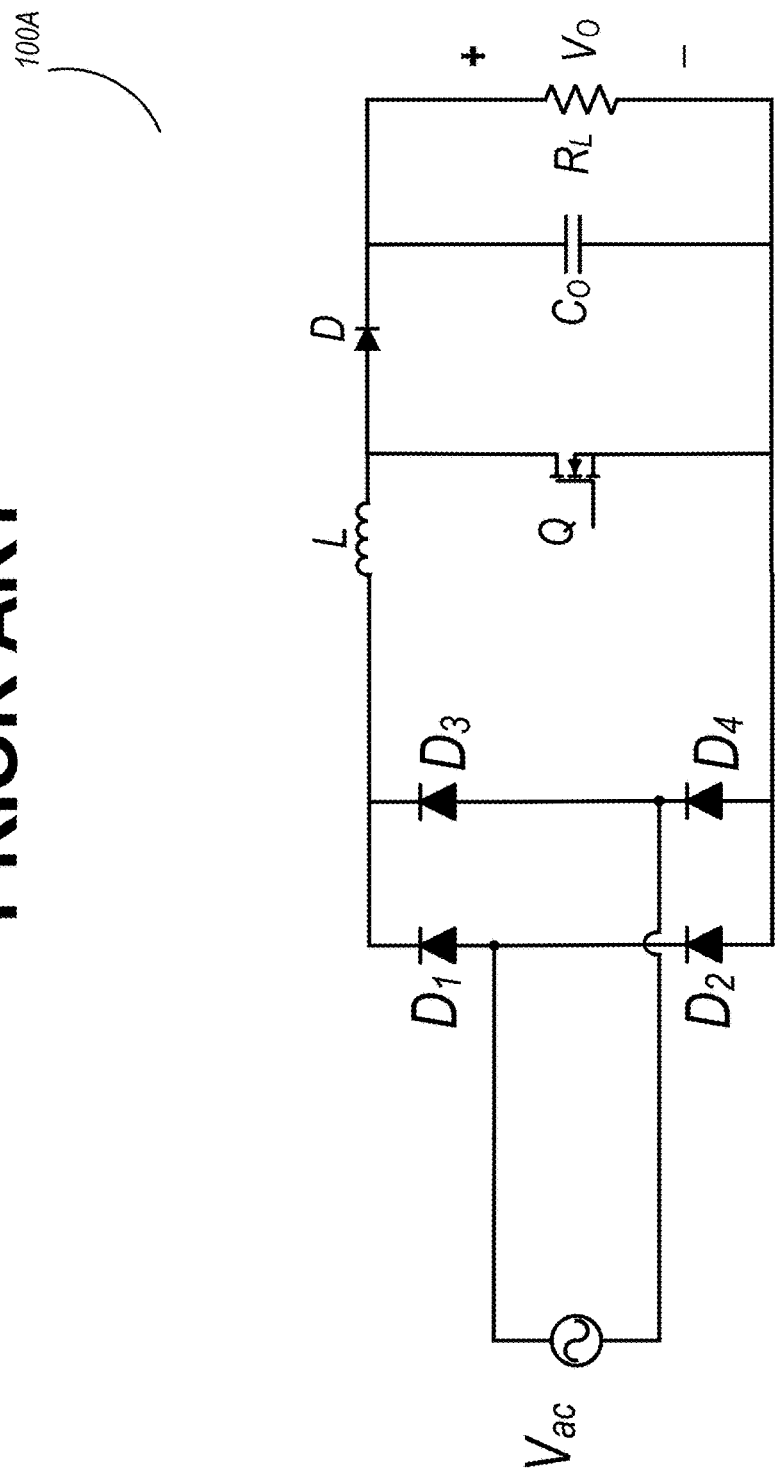
FIG. 1A is a circuit diagram of a conventional AC-to-DC converter using a Boost converter, according to some embodiments
Figure 1B:
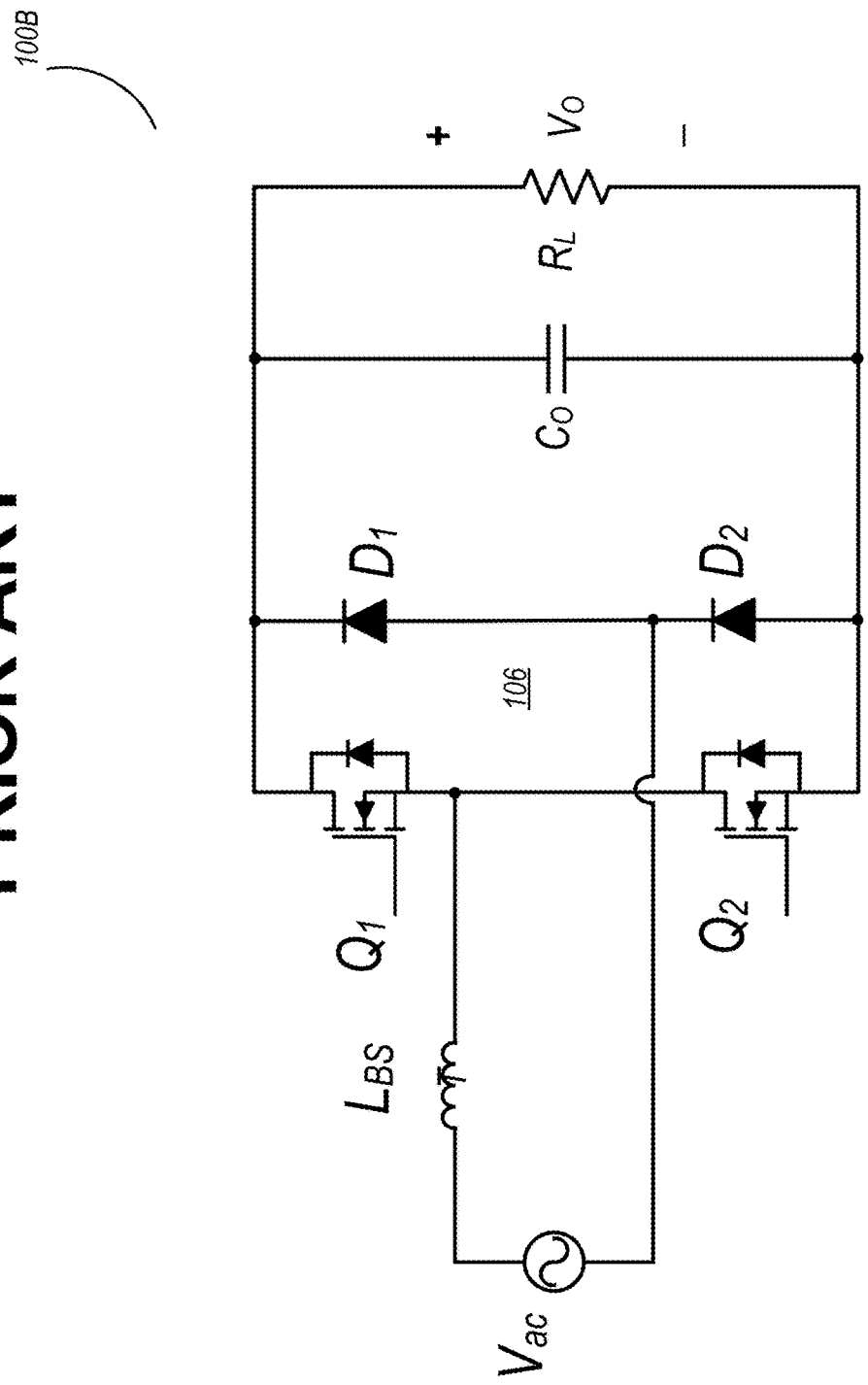
FIG. 1B is a circuit diagram of a conventional AC-to-DC converter using a Totem-pole Boost converter configuration, according to some embodiments.

Diodes, such as silicon diodes, are typically used in electrical circuits to convert an AC voltage source into a DC voltage, as shown in FIGS. 1A, 1B, 1C and 1D. FIG. 1A shows a conventional AC-to-DC converter using Boost converter 100A, where the input diode bridge, D1, D2, D3, and D4 converts the AC voltage into DC, and the Boost converter converts the DC voltage into a high voltage DC voltage. FIG. 1B shows a conventional AC-to-DC converter using Totem-pole Boost converter 100B, where diode D1 and D2 convert the AC voltage into DC voltage. A typical forward voltage drop of a diode is around 0.7V, leading to a power loss across the diode which can impact circuit performance. This power loss translates into extra heat, which is not desirable as it may damage other circuit components or require additional components including heat shielding.

Conventional circuits using diodes to convert an AC voltage source into a DC voltage may achieve reduced power loss by using a MOSFET operating at synchronous mode. The MOSFET may require a very small on-resistor (Rds) to ensure the forward voltage drop of the MOSFET is lower than the voltage drop of the diode.

Figure 1C:
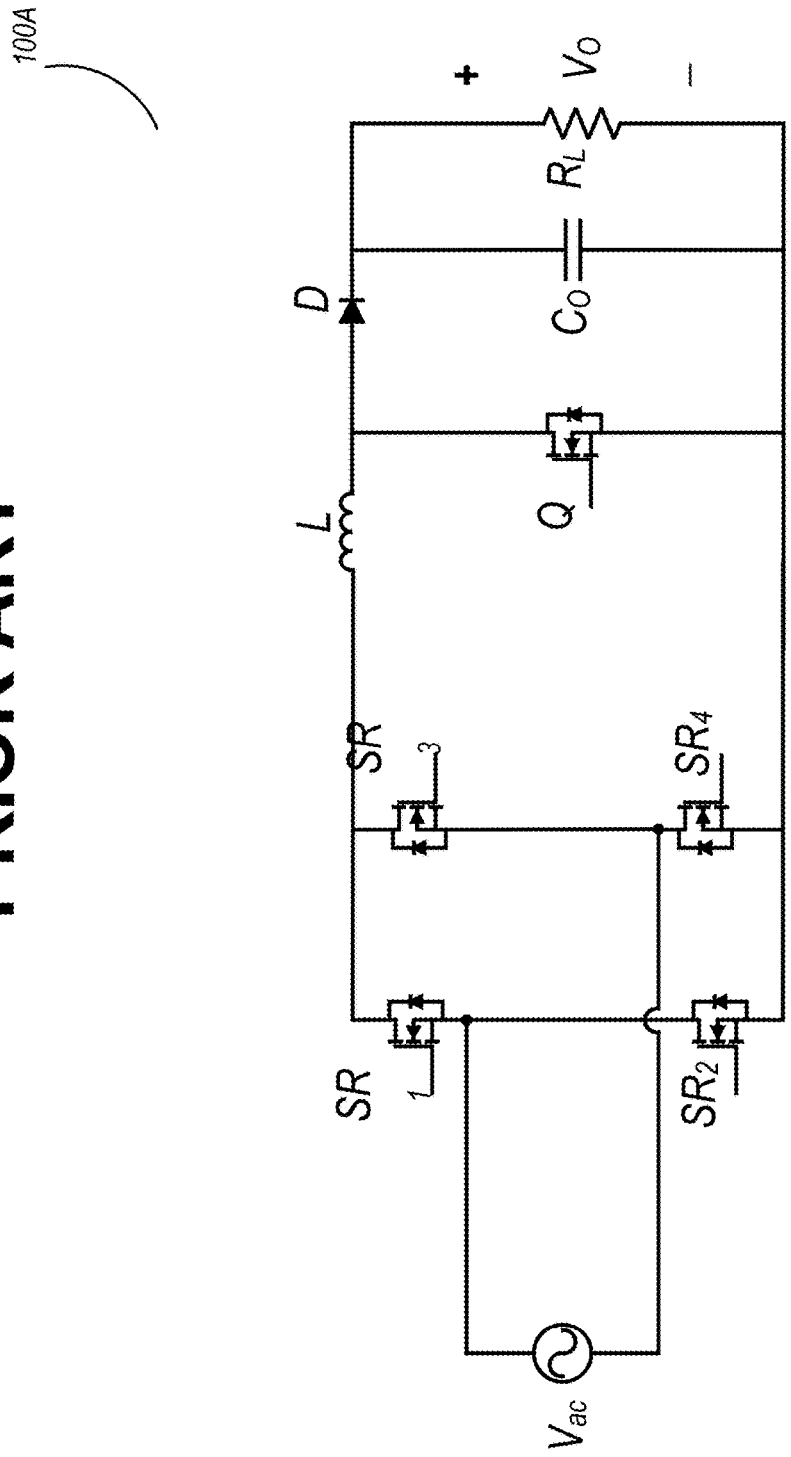
FIG. 1C is a circuit diagram of a conventional AC-to-DC rectifier using a MOSFET as a synchronous rectifier for a Boost converter, according to some embodiments.
Figure 1D:
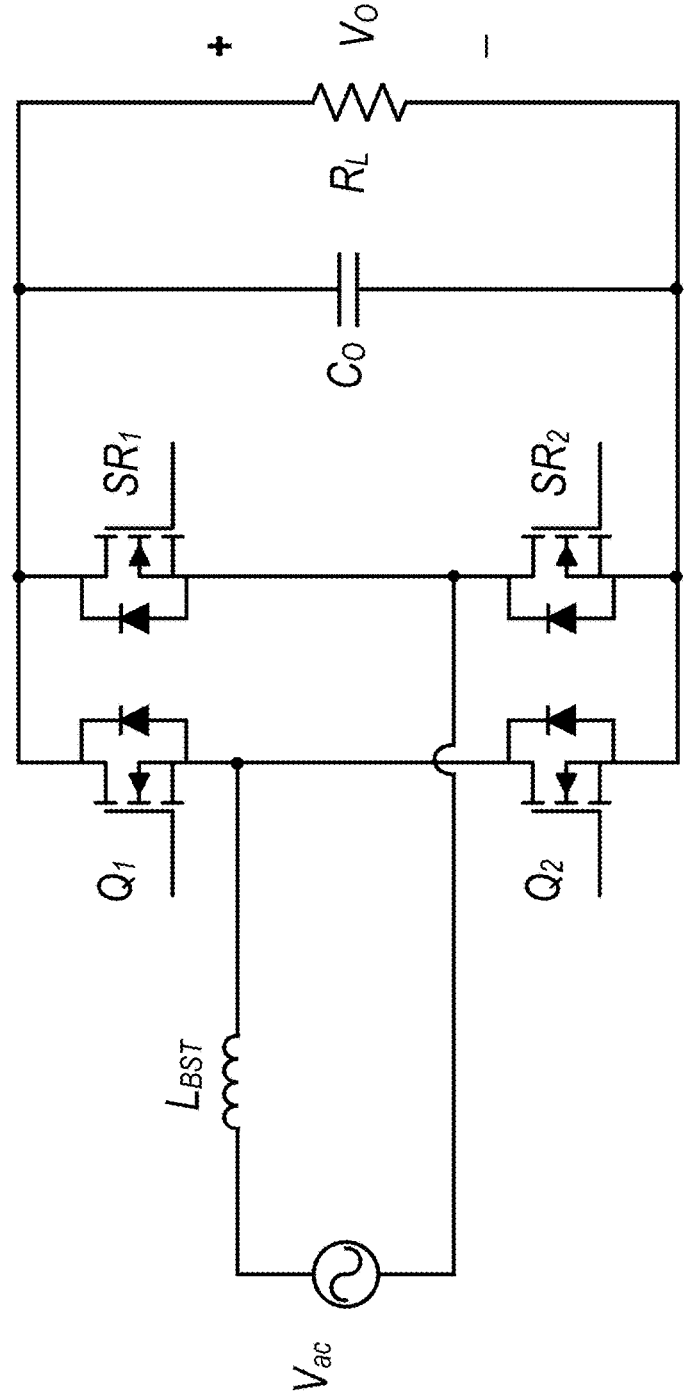
FIG. 1D is a circuit diagram of a conventional AC-to-DC rectifier for a Totem-Pole Boost converter, according to some embodiments.

FIG. 1C shows an AC-to-DC rectifier using a MOSFET as an synchronous rectifier for a conventional Boost converter 100A, where diodes D1, D2, D3, and D4, as shown in FIG. 1A are replaced with MOSFET SR1, SR2, SR3, and SR4. FIG. 1D shows the AC-to-DC rectifier for Totem-Pole Boost converter 100B, where diodes D1 and D2 are replaced with SR1 and SR2.

Two problems may arise when implementing the MOSFET as an synchronous rectifier for a Boost converter. MOSFETs may be expensive, especially as compared to a diode, leading to increased manufacturing and component costs, and at higher temperatures, such as 110-degree Celsius, (which is usually within the operating conditions of a Boost converter), the Rds of the MOSFET is increased by as much as 100% (or doubled) as compared with the Rds value at room temperature, leading to limited performance improvement within common operating conditions.

MEMS (Micro-Electro-Mechanical-System) power switches may provide a solution which resolves the power loss issues of the diode solution seen in FIGS. 1A and 1B, and the issues discussed above with MOSFET solutions seen in FIGS. 1C and 1D. MEMS switches are exceptionally small devices that incorporate mechanical and electrical components on a single microchip. A benefit of MEMS switches is that they have a low on-resistor (Rds) when it is in the "on" state (i.e. when the switch allows current to flow to the desired load). The Rds value may be around 10 times smaller than the Rds of a MOSFET. A further benefit of MEMS switches is that they may be capable of withstanding both positive and negative voltage (a bi-directional switch).

In operation, the state (on-state, off-state) of a MEMS switch is controlled by a gate signal which is dependent on a gate voltage. When the gate voltage is high, such as 80V, the MEMS switch is at on-state and conducting current to the desired load. When the gate voltage is low, such as substantially 0V, the MEMS switch is at off-state and no current flows through it to the desired load.

MEMS switches may struggle with the stress which is caused by hard switching. Therefore, MEMS switches may be designed to change state (from on-state to off-state, or from-off state to on-state) when the voltage across it is close to zero, such as less than 1V. To avoid hard switching and achieve state changes for MEMS switches at either 50 Hz or 60 Hz, further circuits may be needed to use MEMS switches to replace diodes for AC-to-DC rectification.

The proposed circuit topologies and control strategies discussed below provide an optimized system and method for using MEMS switches for rectification that may be used to replace diodes for AC-to-DC rectification. The MEMS switches are housed within a proposed MEMS-Rectifier that may allow the MEMS switch to operate as a rectifier diode in an AC system. The power losses within the rectifier is significantly reduced, such as by a factor of 10, when using the MEMS switches as a replacement for a rectifier diode. This can reduce the loss of the rectifier and reduce the size of the AC-to-DC power supply.

The proposed circuit topologies and control strategies achieve true Zero-Voltage-Zero-Current turn-on and Zero-Current-Zero-Voltage turn-off for a MEMS switch which reduces the stress on a MEMS switch during the transition between the on-state and off-state. The proposed circuit topology includes a current diverting circuit which diverts current from the MEMS switch when the MEMS switch is transitioning between an on-state to an off-state. The current diverting circuit begins diverting the current (i.e. in an on-state) during the input AC voltage crossing period when the AC voltage changes direction from a positive value to a negative value.

The circuit topology further includes a voltage clamp switch connected in parallel with the MEMS switch, the combination of the MEMS switch and voltage clamp switch act as a MEMS rectifier. In some embodiments, the voltage clamp switch may be a diode or a MOSFET. The voltage clamp switch is transitioned to the on-state before the corresponding MEMS switch is transitioned between an on-state and off-state. As the current diverting circuit diverts the input AC current from the MEMS rectifier, the current across the voltage clamp switch is very low, therefore, the voltage clamp switch may clamp the terminal voltage across the corresponding MEMS switch to about zero before the MEMS switch transitions between an on-state and off-state. The MEMS rectifier replaces the use of diodes or synchronous rectifiers in an AC-to-DC converter, while achieving a reduced power loss and component cost.

The proposed control strategies include gate drive logic for all the switches, such as the MEMS switches, voltage clamp switches, current diverting switch, and a frequency switching devices, which achieves a true Zero-Voltage-Zero-Current turn-on and true Zero-Current-Zero-Voltage turn-off for the MEMS switches within the MEMS Rectifiers.

When the input AC voltage is in a zero crossing period, the current diverting switch is transitioned to the on-state and diverts the input AC current from the MEMS rectifiers. The current through the MEMS rectifiers is therefore about zero before the MEMS switch begins to transition between the on-state and off-state. Before initiating the transition of the MEMS switch, the corresponding voltage clamp switch transitions to the on-state. Due to the current diverting circuit also being in the on-state, the current through the voltage clamp switch is about zero, and therefore the voltage clamp switch clamps the terminal voltage of the MEMS switch to about zero. The MEMS switch can now transition between the on-state and off-state in a low stress condition as the current and voltage across the MEMS switch are both about zero. In practical operation, two or more MEMS rectifiers can be configured in a circuit along with a current diverting circuit and at least one high frequency switch to create an AC-to-DC Boost converter having MEMS switches capable of transitioning between an on-state and off-state with reduced stress.

Further, since the current diverting circuit maintains a current of about zero across the voltage clamp switch when it is in the on-state, the voltage clamp switch can have a high Rds value and low current rating.

Figure 2A:
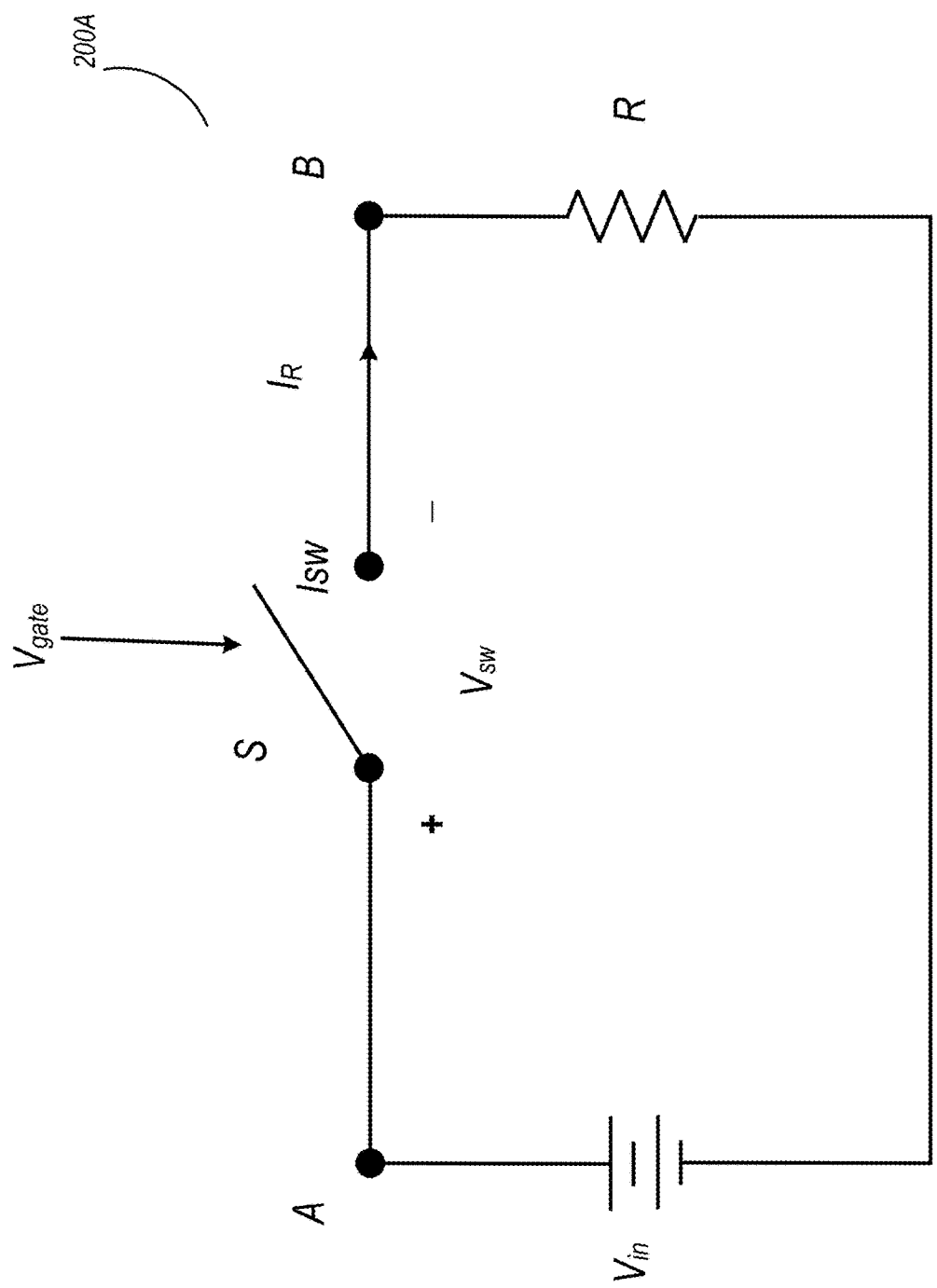
FIG. 2A is a circuit diagram of a switch circuit, according to some embodiments.
Figure 2B:
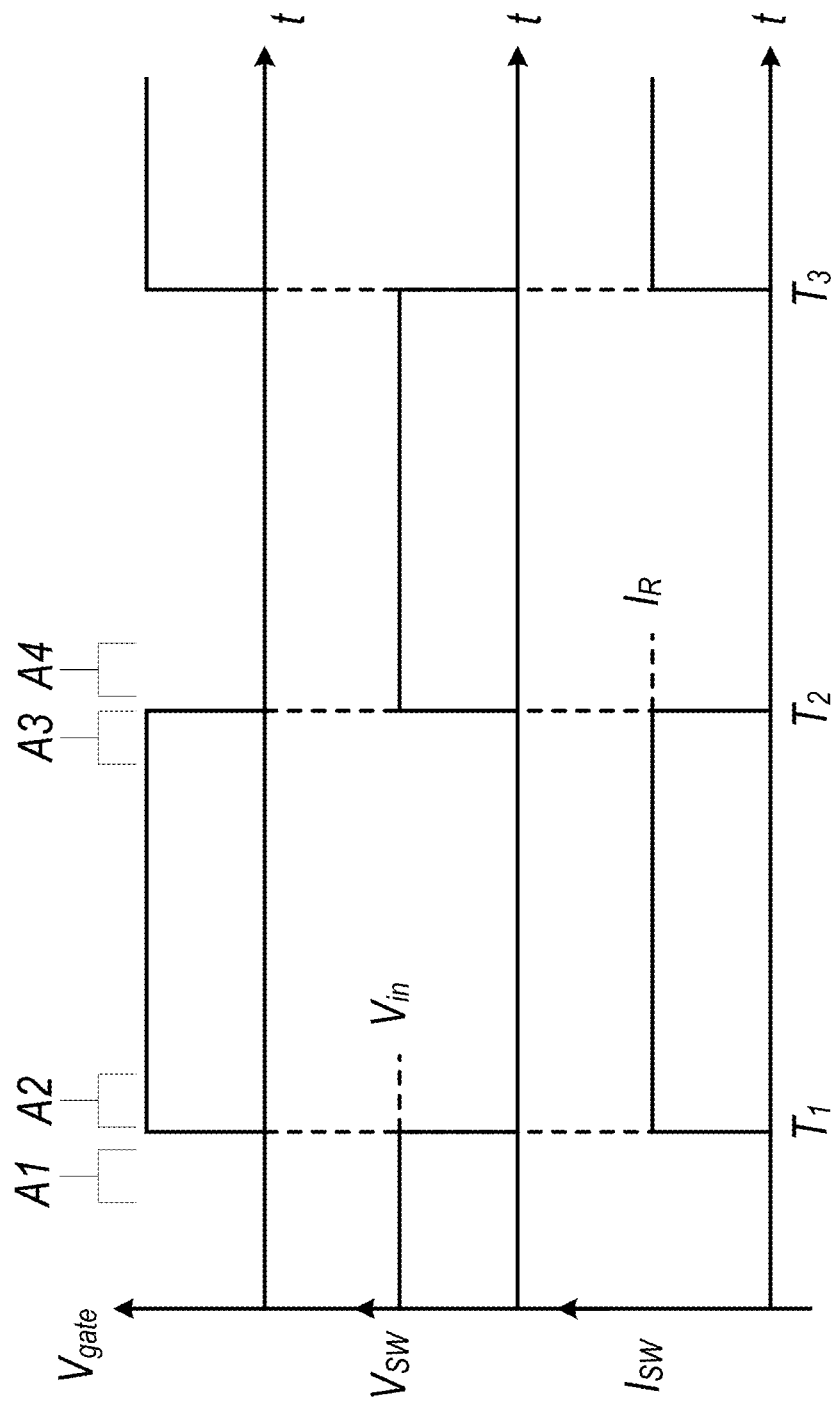
FIG. 2B is a conventional switching wave form graph for the switch circuit shown in FIG. 2A, according to some embodiments.

Zero-Voltage-Zero-Current (ZVZC) Turn On and Zero-Current-Zero-Voltage (ZCZV) Turn Off FIG. 2A shows a circuit diagram of a switch circuit 200A. FIG. 2B shows the typical switching waveform for the switch circuit shown in FIG. 2A. As shown in FIG. 2A, the switch, S, is connected between a voltage source, Vin, and the load, R. The state of switch S is controlled by its gate voltage, Vgate. When Vgate is high, the switch is on (short circuit), and the current through the switch, Isw, can be calculated by Equation (1):

$$Isw = IR = Vin/R \qquad (1)$$

The voltage Vsw across the switch, S, is zero, as it is a short circuit. In operation, Vsw may not be zero, but may be substantially smaller than Vin, such as about 0.1% of Vin, when the switch is on. In the embodiments described below, it is assumed that when Vsw is zero, the switch is at on-state, unless otherwise stated.

When Vgate is low (zero), the switch S is turned off and no current flows through it, Isw=0. The voltage across the switch is Vsw=Vin. The waveforms are shown in FIG. 2B.

In FIG. 2B, at time t=t1, Vgate rises from zero to high and the switch is turned on. At time t=t2, the switch is turned off. The modulation of Vsw and Isw is shown at various points below based on the state of the switch.

At point A1: immediately before switch S is turned on at t=T1, switch S is at off-state. The voltage Vsw across S is equal to Vin and the current Isw through S is equal to zero.

At point A2: immediately after switch S is turned on at t=T1, switch S is at on-state. The voltage Vsw across S is equal to zero and the current Isw through S is equal to IR.

At point A3: immediately before switch S is turned off at t=T2, switch S is at on-state. The voltage Vsw across S is equal to zero, and the current Isw through S is equal to IR.

At point A4: immediately after switch S is turned off at t=T2, switch S is at off-state. The voltage Vsw across S is equal to Vin and the current Isw through S is equal to zero.

As can be seen in FIG. 2B, a MEMS switch may not be operable in circuit 200A seen in FIG. 2A as the voltage and/or current across the switch(S) is not substantially equal to zero during switching transition (i.e. At point A1 and A3).

Figure 3:
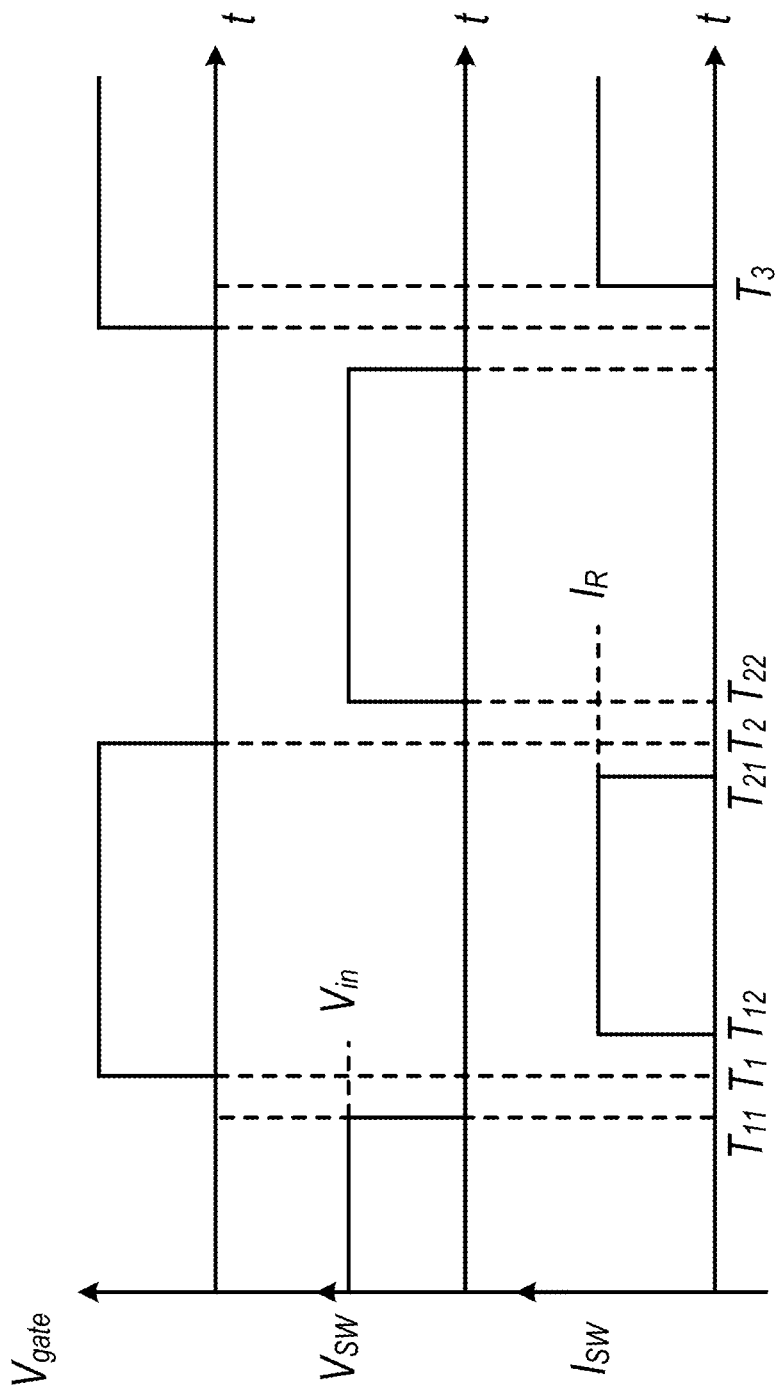
FIG. 3 is a proposed switching wave form graph for a proposed switch circuit, according to some embodiments.

The concept of a switch operating at Zero-Voltage-Zero-Current (ZVZC) turn-on and Zero-Current-Zero-Voltage (ZCZV) turn-off is proposed in this application and the switching waveforms are shown in FIG. 3.

As shown in FIG. 3, before the gate voltage, Vgate, is applied to switch S, at t=T1, the voltage Vsw across the switch S is reduced to zero at t=T11. Time instant T11 is before time instant T1. In other words, switch voltage Vsw is zero before the gate voltage is applied to the Switch S (turned-on). After switch S is turned on at t=T1, the current through switch S will not flow immediately. Current Isw of Switch S will flow at time t=tT2. Time instant T12 is after time instant T1. Between T1 and T12, the switch current Isw is still zero. Therefore, the proposed switching system and method may be capable of ensuring that before switch S is turned on, the switch voltage, Vsw, is zero and after switch S is turned on, the switch current, Isw, is also zero. The operating conditions described herein for modulating switch S to an on-state is called Zero-Voltage-Zero-Current turn-on, or ZVZC turn-on.

FIG. 3 also shows that before the gate voltage, Vgate, changes from high to zero at t=T2, the current Isw through switch S is reduced to zero at t=T21. Time instant T21 is before time instant T2. After switch S is turned off at t=T2, the voltage Vsw across switch S will remains at zero. The voltage Vsw across switch S will rise to VR at time t=T22. Time instant T22 is after time instant t2. Therefore, the proposed switching system and method may be capable of ensuring that before switch S is turned off, the switch current, Isw, is zero and after switch S is turned off, the switch voltage, Vsw, is also zero. This operating conditions described herein for modulating switch S to an off-state is called Zero-Current-Zero-Voltage turn-off, or ZCZV Turn-off.

The proposed embodiments described below provide the structural and methods necessary to achieve ZVZC turn-on and ZCZV turn-off so that MEMS switches may be used in a manner similar to a diode to convert the AC voltage into DC, without the performance disadvantages which result when using conventional diodes such as power loss and heat generation.

Totem-Pole Boost AC-to-DC Converter Using MEMS Switch

Figure 4:
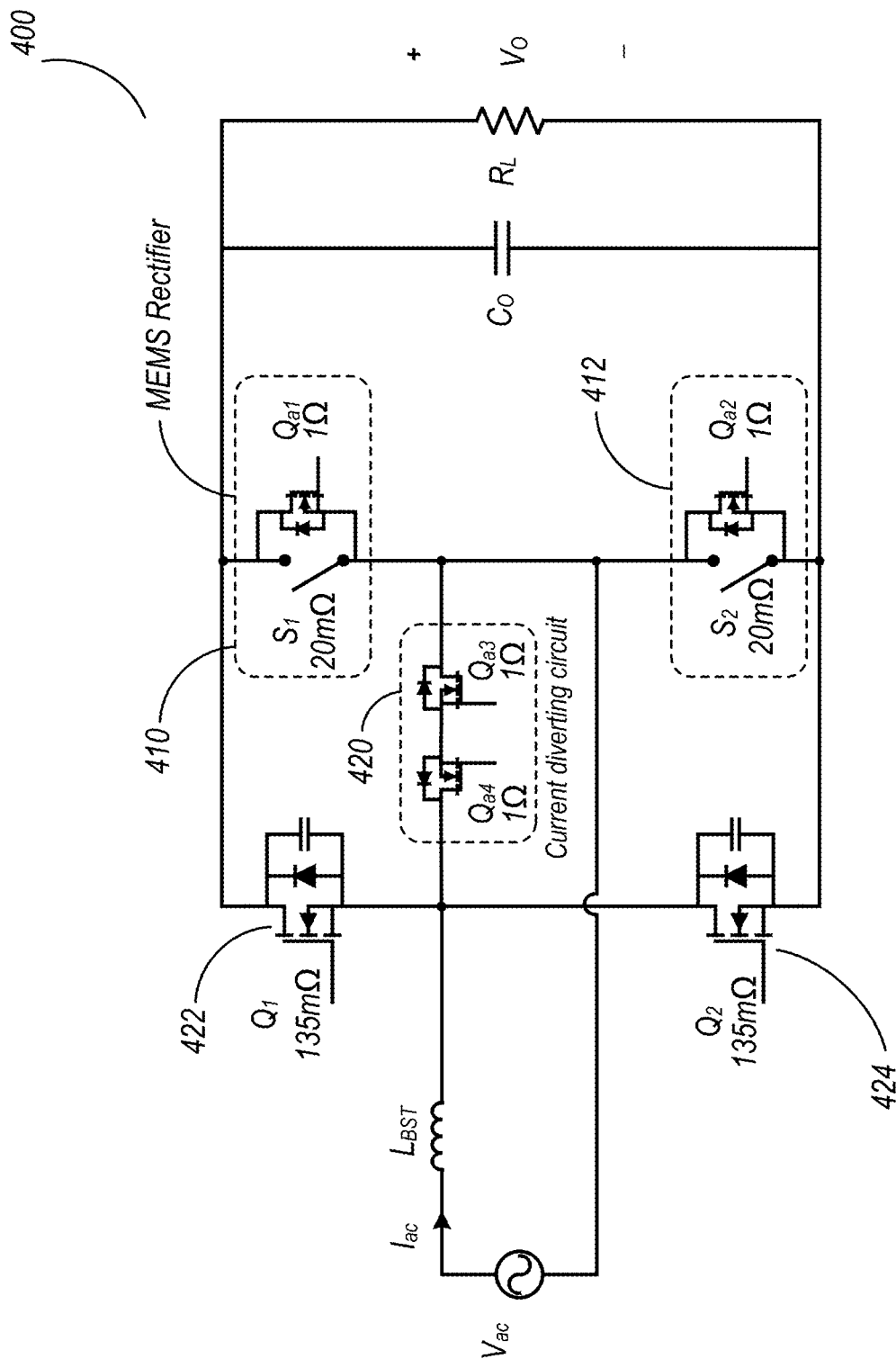
FIG. 4 is a circuit diagram for a proposed Totem-Pole Boost AC-to-DC converter using MEMS switches, according to some embodiments.

FIG. 4 shows a proposed Totem-Pole Boost AC-to-DC converter 400 using MEMS switches S1 and S2. MOSFET Qa1 may be connected in parallel with S1 and MOSFET Qa2 may be connected in parallel with S2. The parallel connection of Qa1 and S1 may form a first MEMS-Rectifier 410, which is equivalent to diode D1 (as shown in FIG. 1B), or SR1 (as shown in FIG. 1D). The parallel connection of Qa2 and S2 may form a second MEMS-Rectifier 412, which is equivalent to diode D2 (as shown in FIG. 1B), or SR2 (as shown in FIG. 1D). In a further embodiment, Qa3 and Qa4 may be connected in series with their source terminals connected together. In some embodiments, Qa3 and Qa4 may form a current diverting circuit 420. In some embodiments, MOSFETs Q1 and Q2 may be high frequency switching devices 422 and 424, similar to as seen in FIGS. 1B and 1D.

The Rds values recited in FIG. 4 for each of 410, 412, 420, 422 and 424 provides more information on the potential required specifications for the switches in this configuration. In some embodiments, the Rds value of high frequency switches 422, 424, (Q1, Q2) is 135 mΩ, while the Rds value for the four auxiliary MOSFETs, Qa1, Qa2, Qa3, and Qa4, within first MEMs Rectifier 410, second MEMs Rectifier 412 and current diverting circuit 420 is 10. This indicates that a much smaller MOSFETs are needed for the auxiliary MOSFETs. The Rds value of the MEMS switches S1 and S2 within first and second MEMS Rectifier 410 and 412 is 20 mΩ. This indicates that the loss of the MEMS switch may be very small and therefore, the loss to convert the AC voltage to DC voltage may be very small, especially as compared to the losses experienced by conventional Diode converters.

The detailed operation of this circuit is described as following by the help of computer simulation. It is assumed that the converter 400 shown in FIG. 4 operates in DCM (Discontinuous Conduction Mode) with a switching frequency of 100 kHz for Q1 and Q2.

It is noted that the input AC current of the AC-to-DC converter 400 may be controlled to be in the same shape as the input AC voltage to achieve power factor correction (PFC). In other words, the AC current may be an AC sinusoidal waveform. With an AC current, the switching action between S1 and S2 may occur when the AC current changes direction, from negative value, zero, to positive value, and from positive value, zero, to negative value.

Under normal operation, when the AC voltage is at a positive half cycle, and the AC current is also at a positive half cycle. Switch S2 is in an on-state and switch S1 is at an off-state. MOSFET Q2 may serve as the main switch and MOSFET Q1 may serve as the synchronous rectifier (SR) switch. The main switch may act as the control switch which receives a gate control signal with the desired duty cycle. The Synchronous Rectifier (SR) switch may transition to the on-state when the main switch is in the off-state. For example, if the duty cycle of the main switch is D_main=0.35, which means that the main switch will be on for 35% of the switching period, the duty cycle of the SR switch will be D_SR=0.65 (=1−0.35). The main switch and SR switch will not be in the on-state at the same time.

When the AC voltage is at a negative half cycle, and the AC current is also at a negative half cycle. Switch S1 is in an on-state and switch S2 is in an off-state. MOSFET Q1 serves as the main switch and MOSFET Q2 serves as the synchronous rectifier (SR) switch.

The detailed operation of circuit 400, as shown in FIG. 4, as it experiences transitions in the AC voltage Vac from negative to positive can be illustrated through a series of stages represented by the equivalent circuits shown in FIGS. 5A, 5B, 5C, 5D, 5E, 5F, 5G, 5H, 5I, 5J and 5K. During this transition, MEMS switch, S1, changes from the on-state to off-state and MEMS switch, S2, changes from off-state to on-state.

Stage 1: Initial Condition, Before t=T0

Figure 5A:
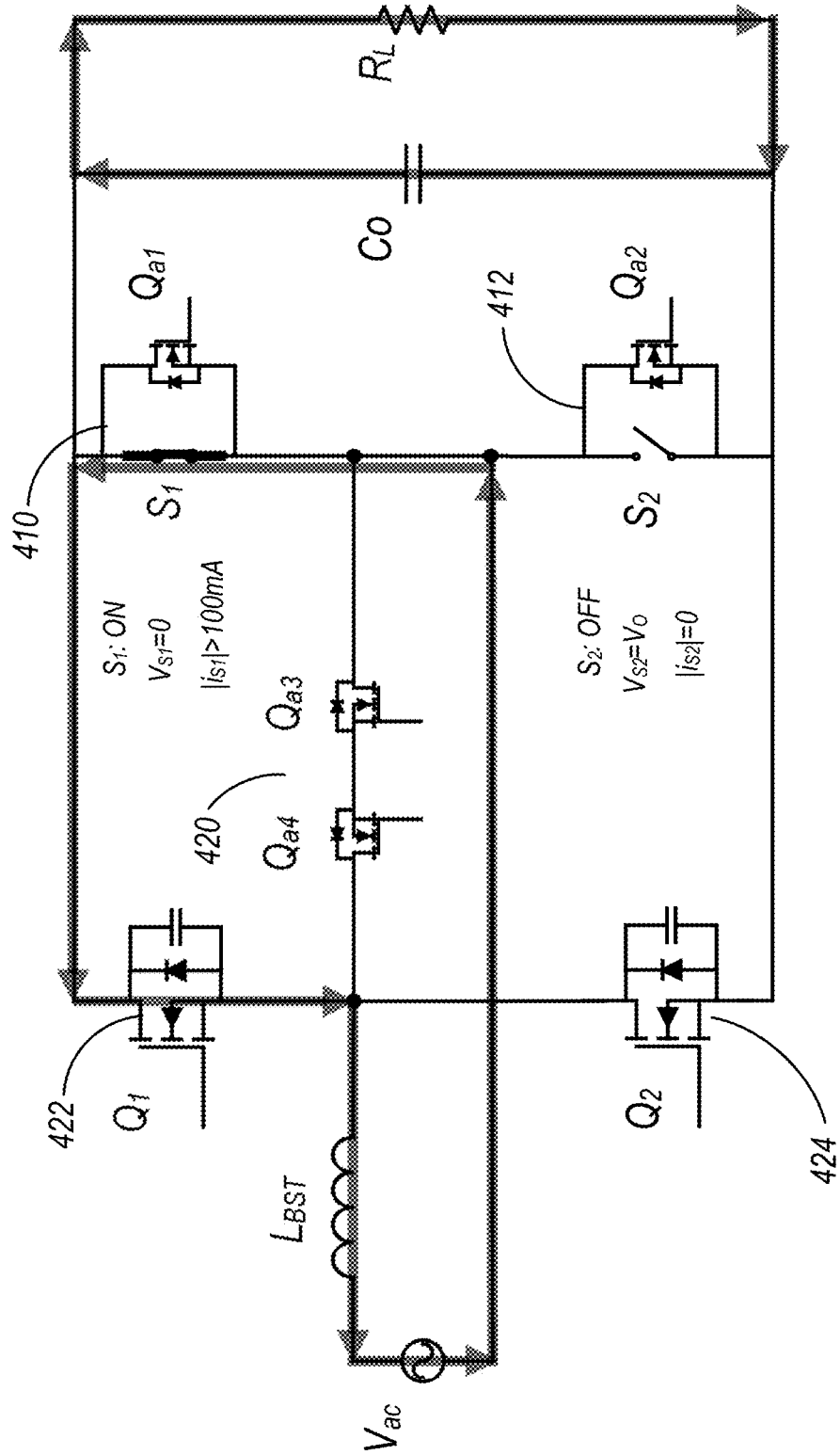
FIG. 5A, 5B, 5C, 5D, 5E, 5F, 5G, 5H, 5I, 5J, 5K show equivalent circuits for the proposed Totem-Pole Boost AC-to-DC converter using MEMS switches shown in FIG. 4 in operation, according to some embodiments.

It is assumed that initially, the AC voltage Vac is at negative half cycle and Q1/Q2 within the high frequency switching devices 422, 424 are switching. MEMS switch S1 is in an on-state and MEMS switch S2 is in an off-state. The equivalent circuit is shown in FIG. 5A.

Stage 2: Disable Switches Q1, Q2 (from t=T0 to t=T1)

Figure 5B:
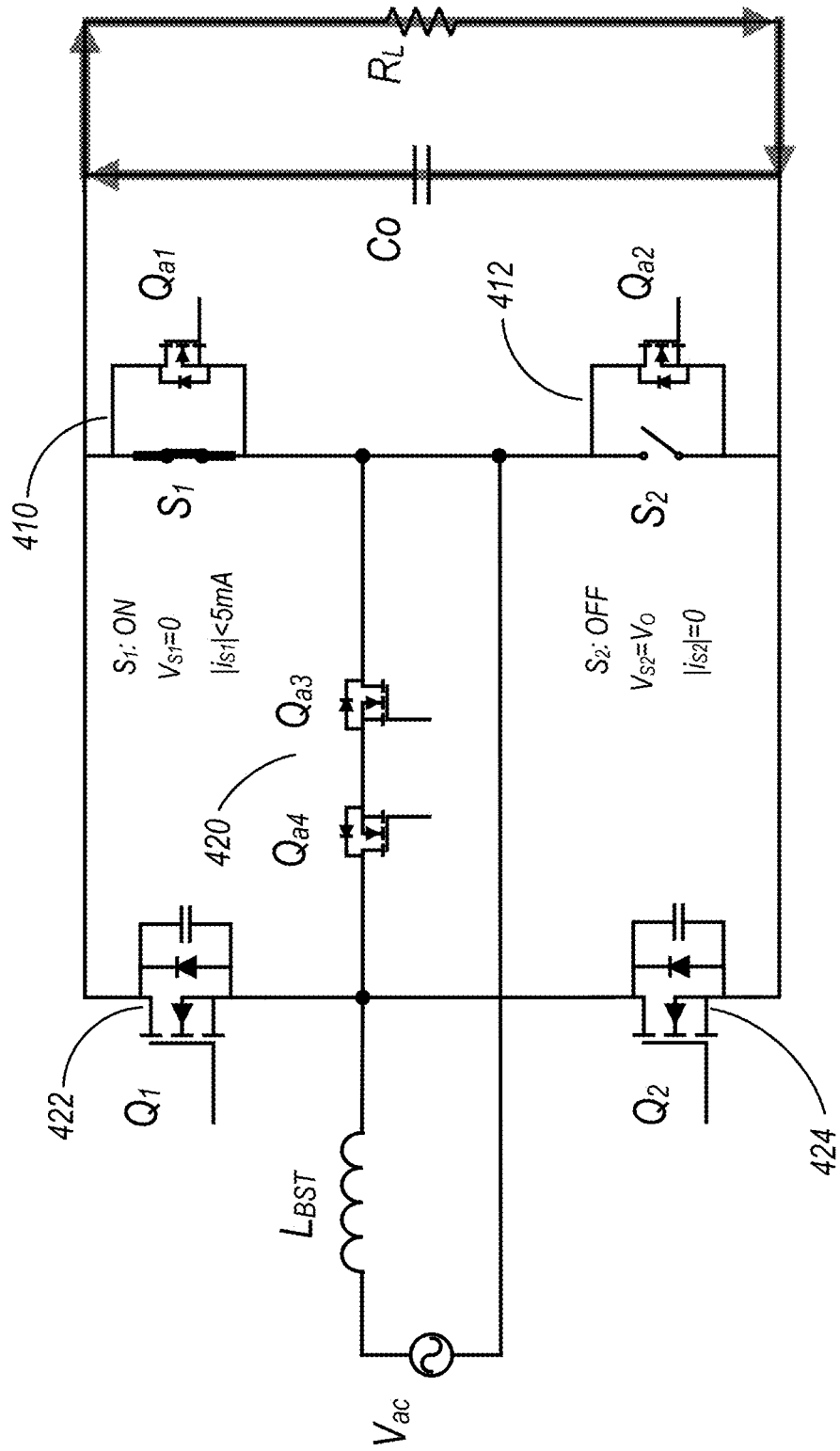
Figure 6:
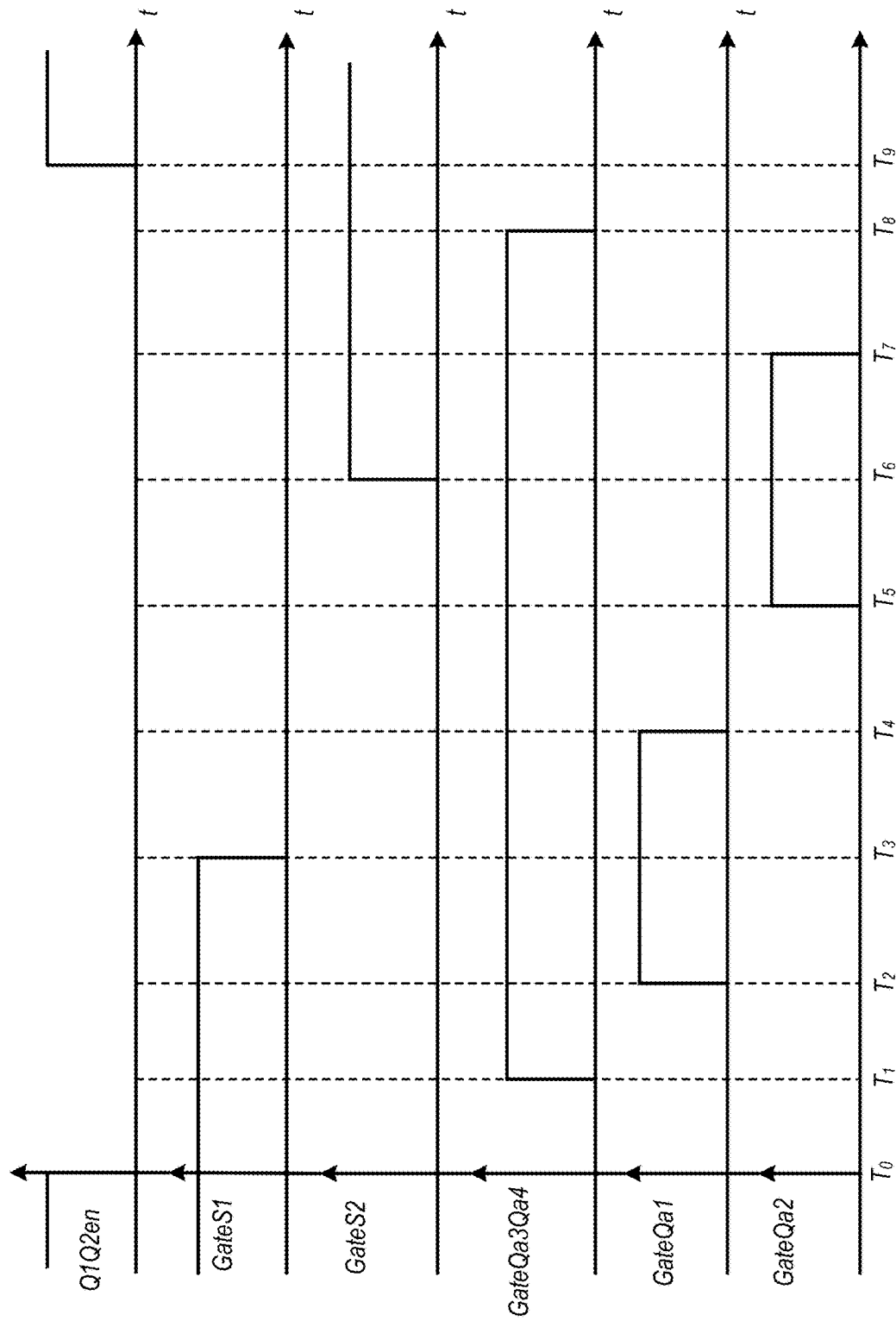
FIG. 6 is a timing diagram for the control signals of the switches in the proposed circuit shown in FIG. 4, according to some embodiments.

When the AC voltage is close to zero after the negative half cycle, such as when AC voltage Vac equals-5V, the transition of S1 to the off-state and S2 to the on-state begins. At t=T0, the gate drive signals for Q1, Q2 within the high frequency switching devices 422, 424 are disabled by signal Q1Q2en (low), as shown in FIG. 6. Then, Q1 and Q2 are both turned off. Since the AC voltage Vac is close to zero, such as at −5V, turning-off of Q1, Q2 does not impact the normal operation of the AC-to-DC converter 400 to achieve power factor correction. The load current is provided by the output capacitor Co. At this moment, MEMS switch S1 is in an on-state. The equivalent circuit is shown in FIG. 5B.

The AC voltage Vac level required to disable switches Q1, Q2 within the high frequency switching devices 422, 424 and to start the transition of turning off S1 and turning on S2 is a design parameter. In some embodiments, it may be selected to be a negative voltage, but close to zero, value, such as from −1V to −10V.

It is noted that at this stage, the current through S1 is also very small as the AC voltage Vac is very small.

Stage 3: Current Diverting Circuit 420 Switches, Qa3, Qa4, are Turned on (from t=T1 to t=T2)

Figure 5C:
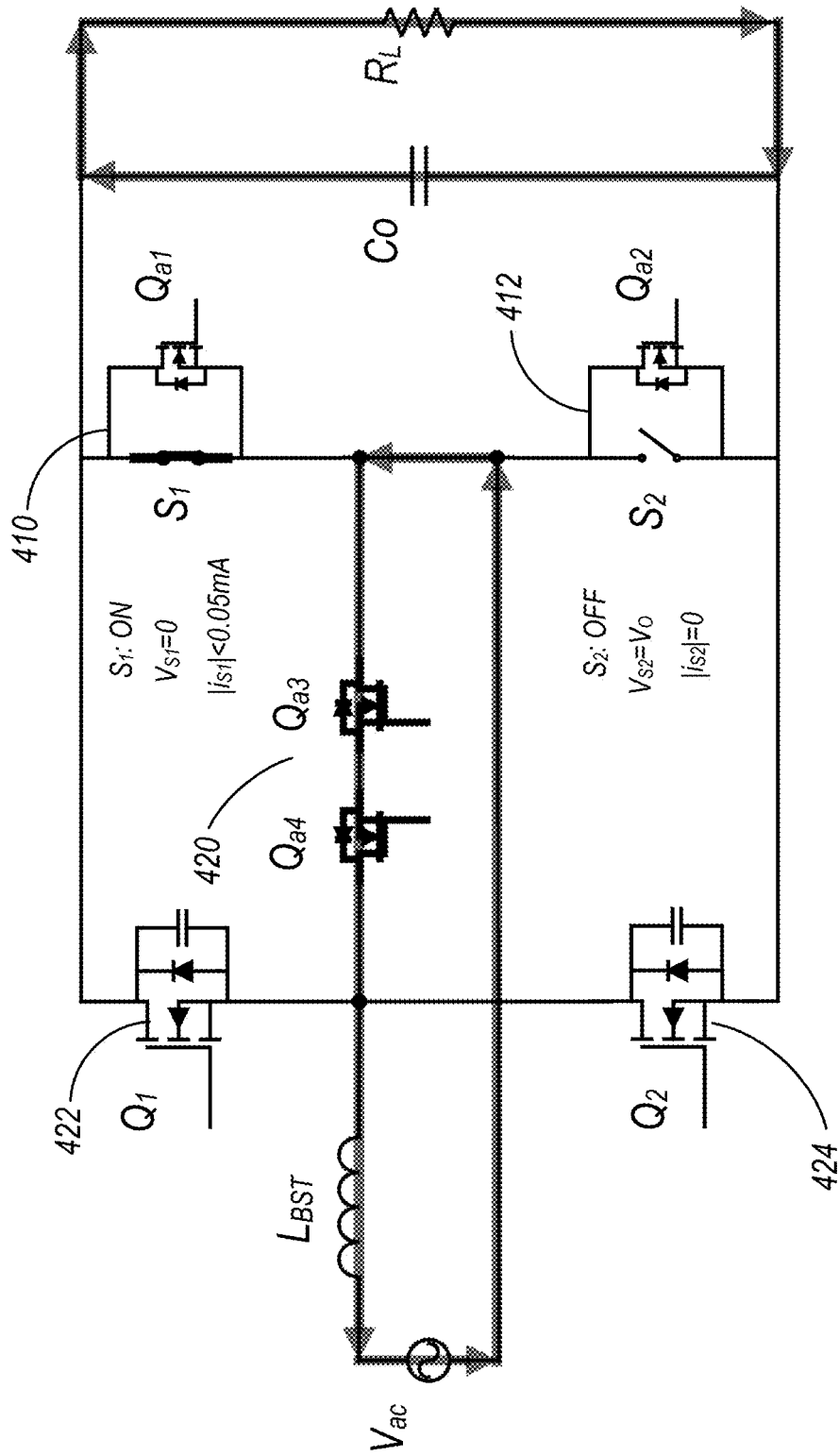

At t=T1, the current diverting circuit 420, consisting of two auxiliary MOSFETs, Qa3, Qa4, is turned on, by GateQa3Qa4, as shown in FIG. 6. The equivalent circuit is shown in FIG. 5C. In this stage, the inductor current $L_{BST}$, which is also the AC input current, Iac, is diverted from S1 to the current diverting circuit 420 and flows through Qa3, Qa4. The current through S1 is zero in theory. In practice, the current through S1 is very small, such as less than 0.05 mA. The load current is provided by the output capacitor Co.

Therefore, it is observed that although S1 is still on, the current through S1 is zero. S1 is therefore ready to be switched to the off-state, and to achieve Zero-Current-Zero-Voltage turn-off for S1.

Stage 4: Voltage Clamp Switch, Qa1, in First MEMs Rectifier 410 is Turned on (from t=T2 to t=T3)

Figure 5D:
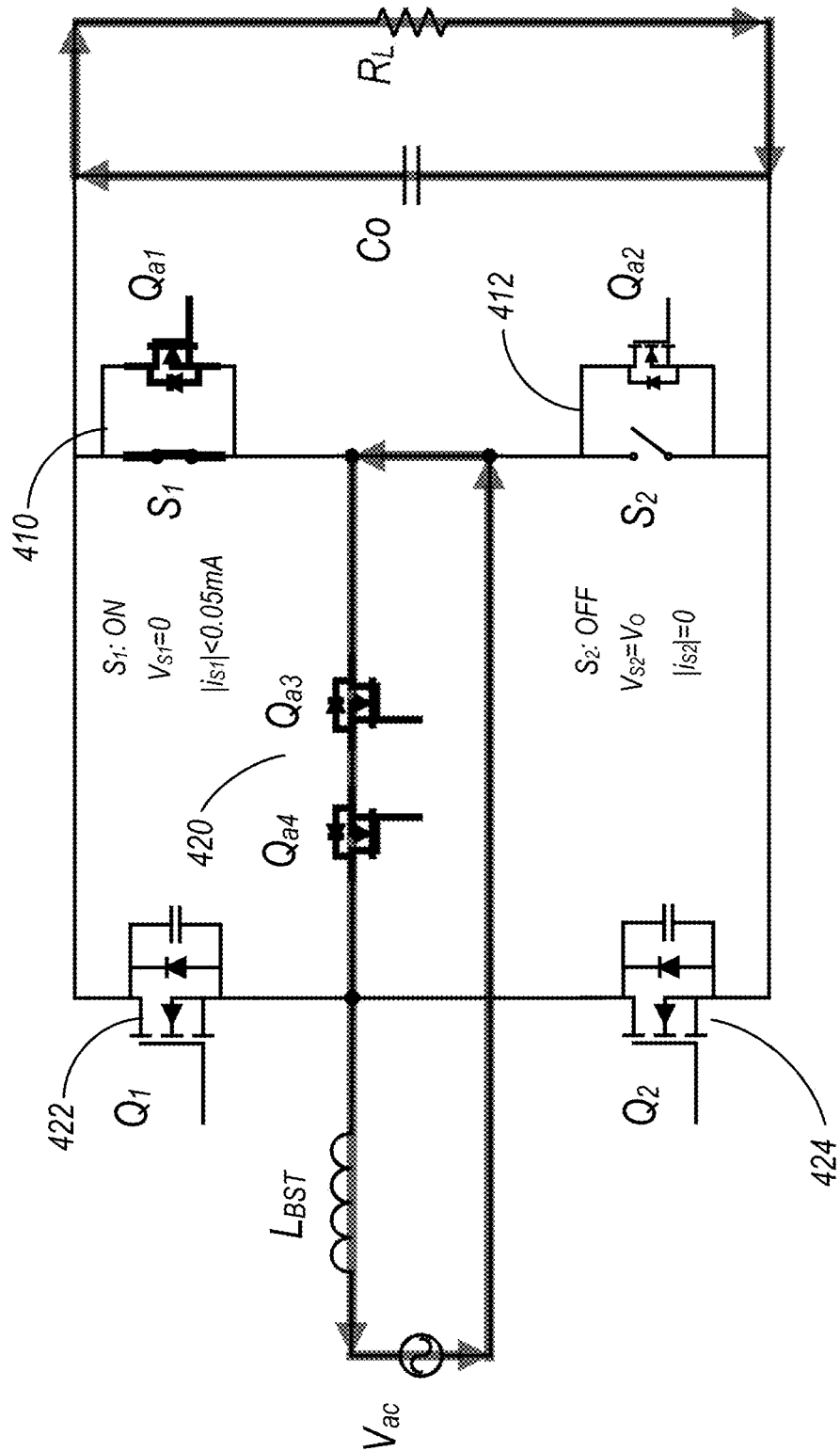

At t=T2, the voltage clamp switch for S1, Qa1, in the first MEMs rectifier 410 is turned on, the equivalent circuit is shown in FIG. 5D. Since the current through S1 is about zero, the current through both S1 and Qa1 will also be about zero. It is noted that the turn-on of Qa1 does not impact the circuit operation as the current through S1 is about zero.

Stage 5: MEMS Switch S1 is Turned Off (from t=T3 to t=T4)

Figure 5E:
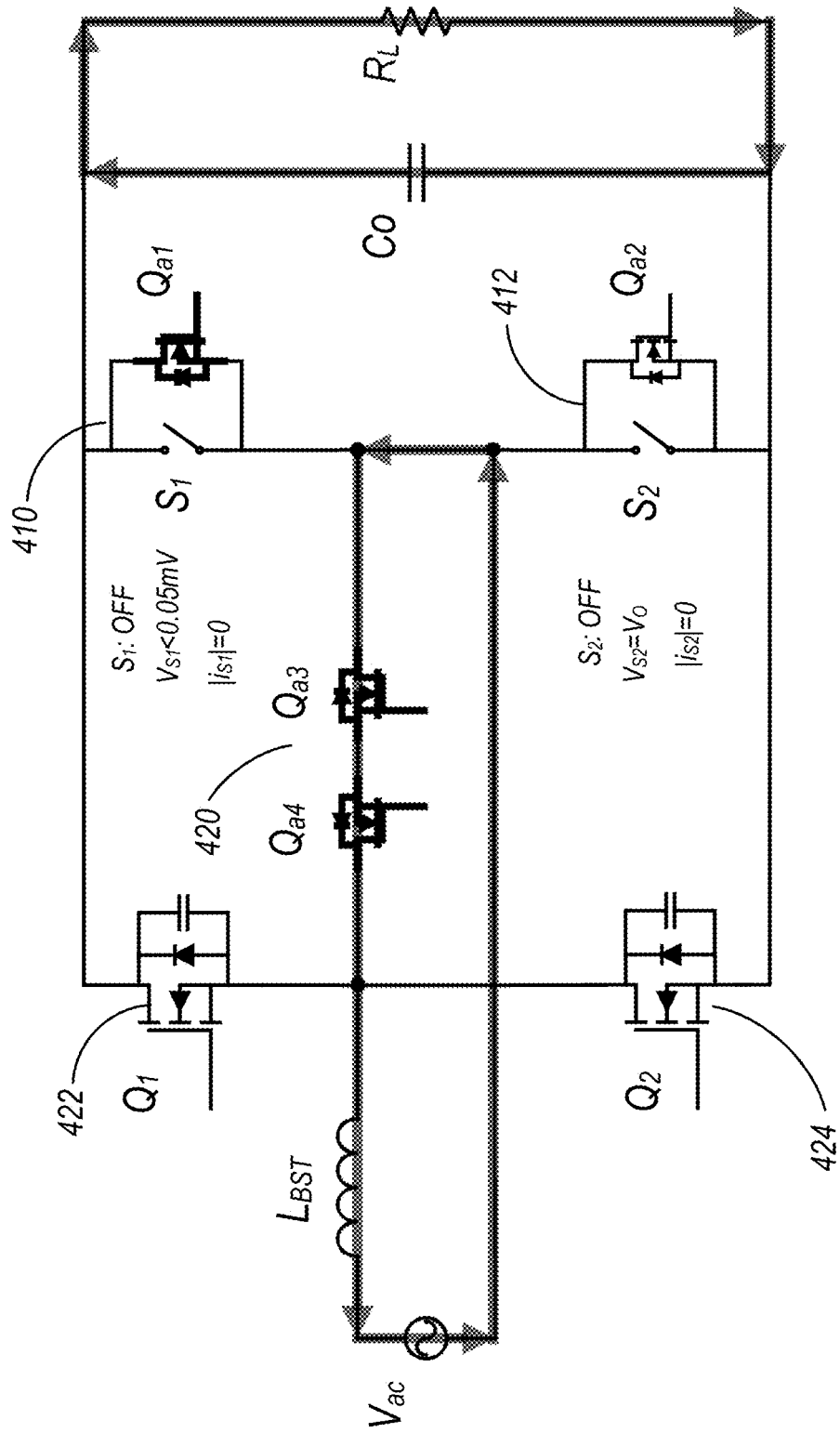

At t=T3, the gate voltage for MEMS switch S1 in first MEMs rectifier 410 is removed and MEMS switch S1 is turned off. The equivalent circuit is shown in FIG. 5E. Since Qa1 is in an on-state and the current through Qa1 is about zero, the voltage across Qa1 is about zero. Therefore, the voltage across S1 is also about zero.

It is noticed from stage 3 and stage 5 that before MEMS switch S1 is turned off, its current is zero, and that after S1 is turned off, the voltage through S1 is also about zero. Therefore, Zero-Current-Zero-Voltage turn-off is achieved for MEMS switch S1 in the first MEMs rectifier 410.

Stage 6: Voltage Clamp Switch Qa1 is Turned Off (from t=T4 to t=T5)

Figure 5F:
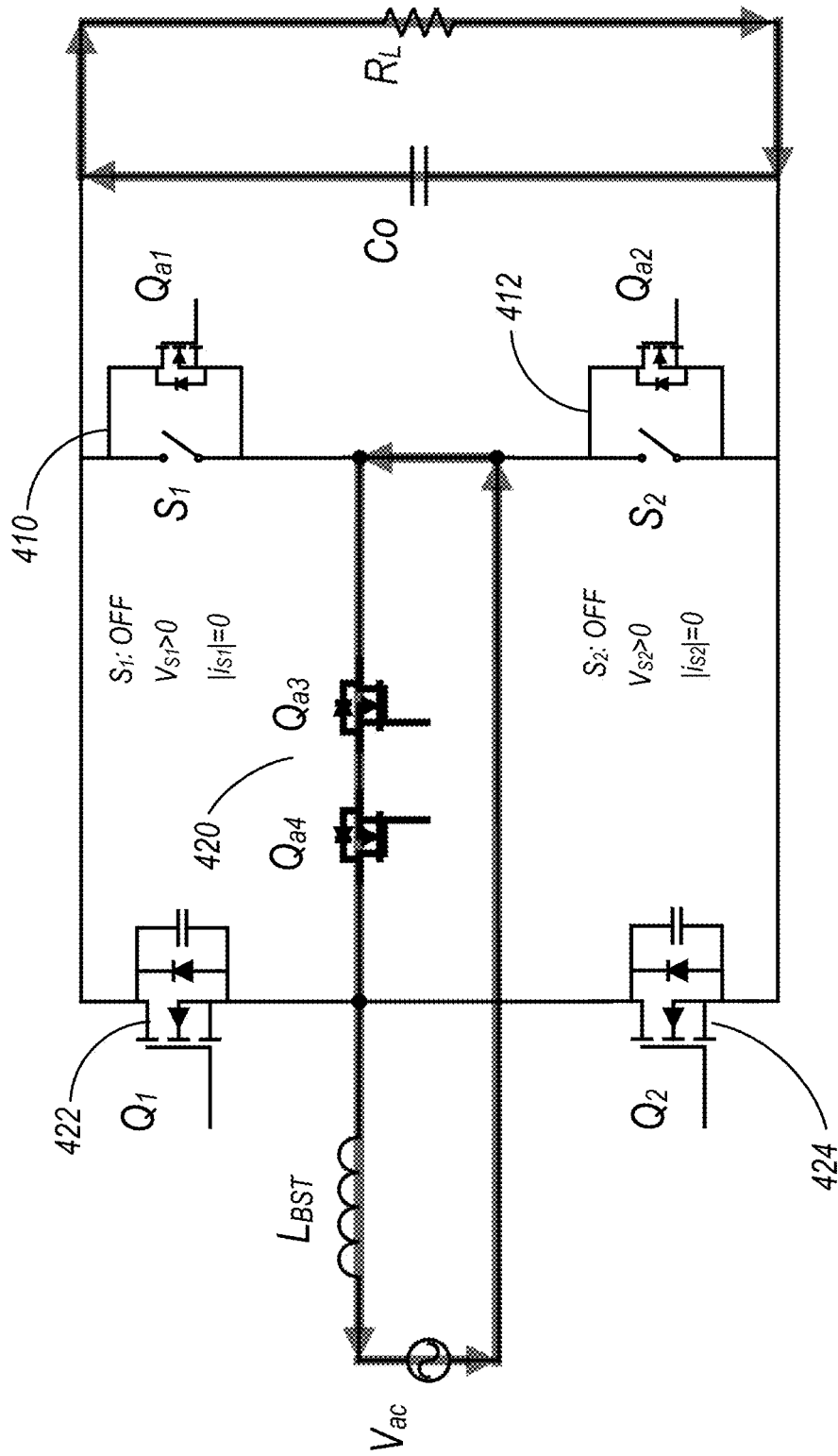

At t=T4, voltage clamp MOSFET Qa1 in the first MEMs rectifier 410 is turned off. In this stage, both S1 and Qa1 are in an off-state. The turn off transition for S1 is therefore completed. The circuit is ready for S2 to transition to the on-state. The equivalent circuit is shown in FIG. 5F.

Stage 7: Voltage Clamp Switch Qa2 is Turned on (from t=T5 to T6)

Figure 5G:
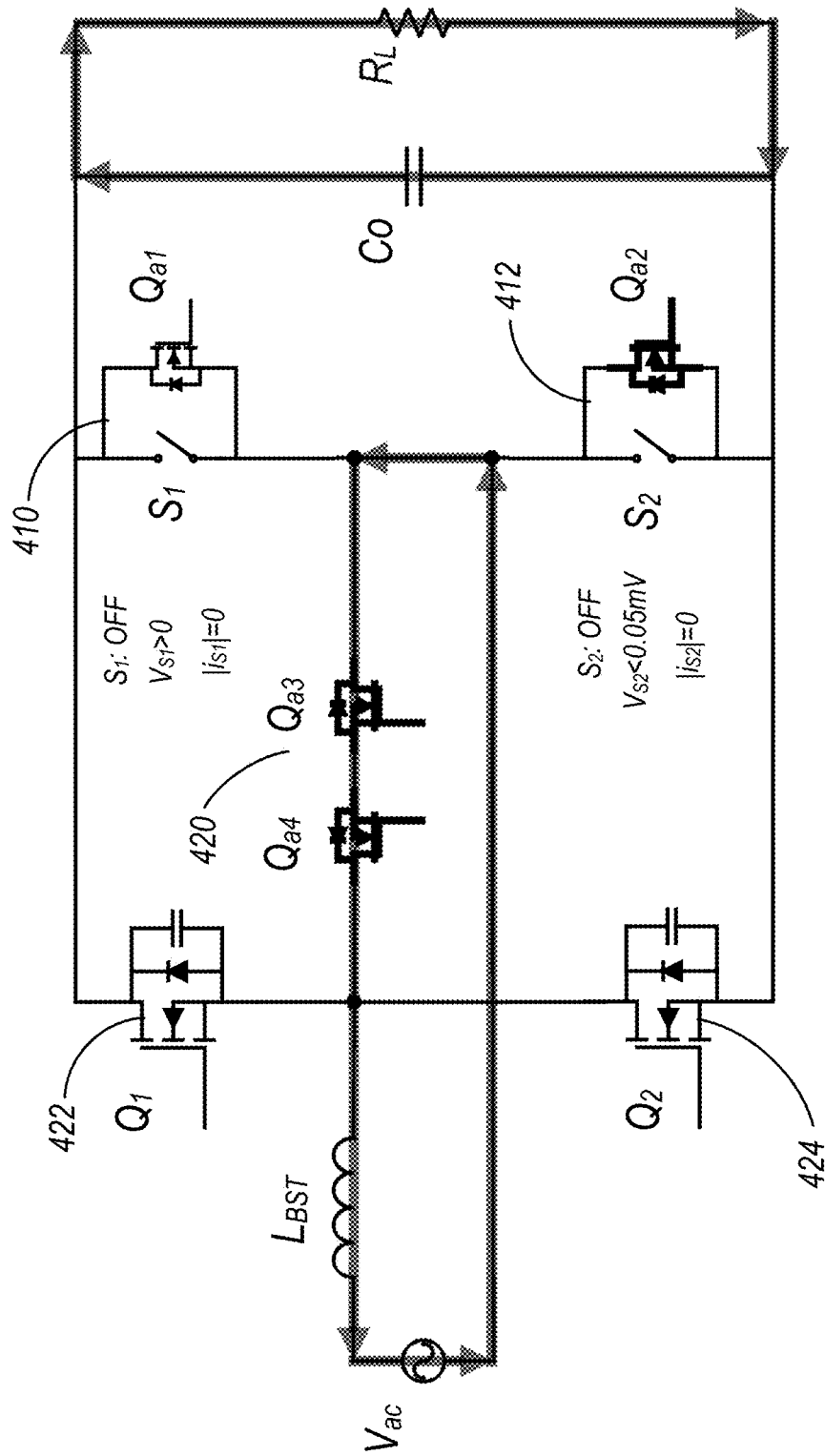

At t=T5, the voltage clamp switch, MOSFET Qa2, of second MEMs rectifier 412 is turned on. Since the inductor current still flows through the switches Qa3 and Qa4 of the current diverting circuit 420, no current will flow through Qa2, although it is turned on. Therefore, the voltage across MEMS switch S2 of the second MEMs rectifier 412 is about zero. The equivalent circuit is shown in FIG. 5G.

Stage 8: MEMS Switch S2 is Turned on (from t=T6 to t=T7)

Figure 5H:
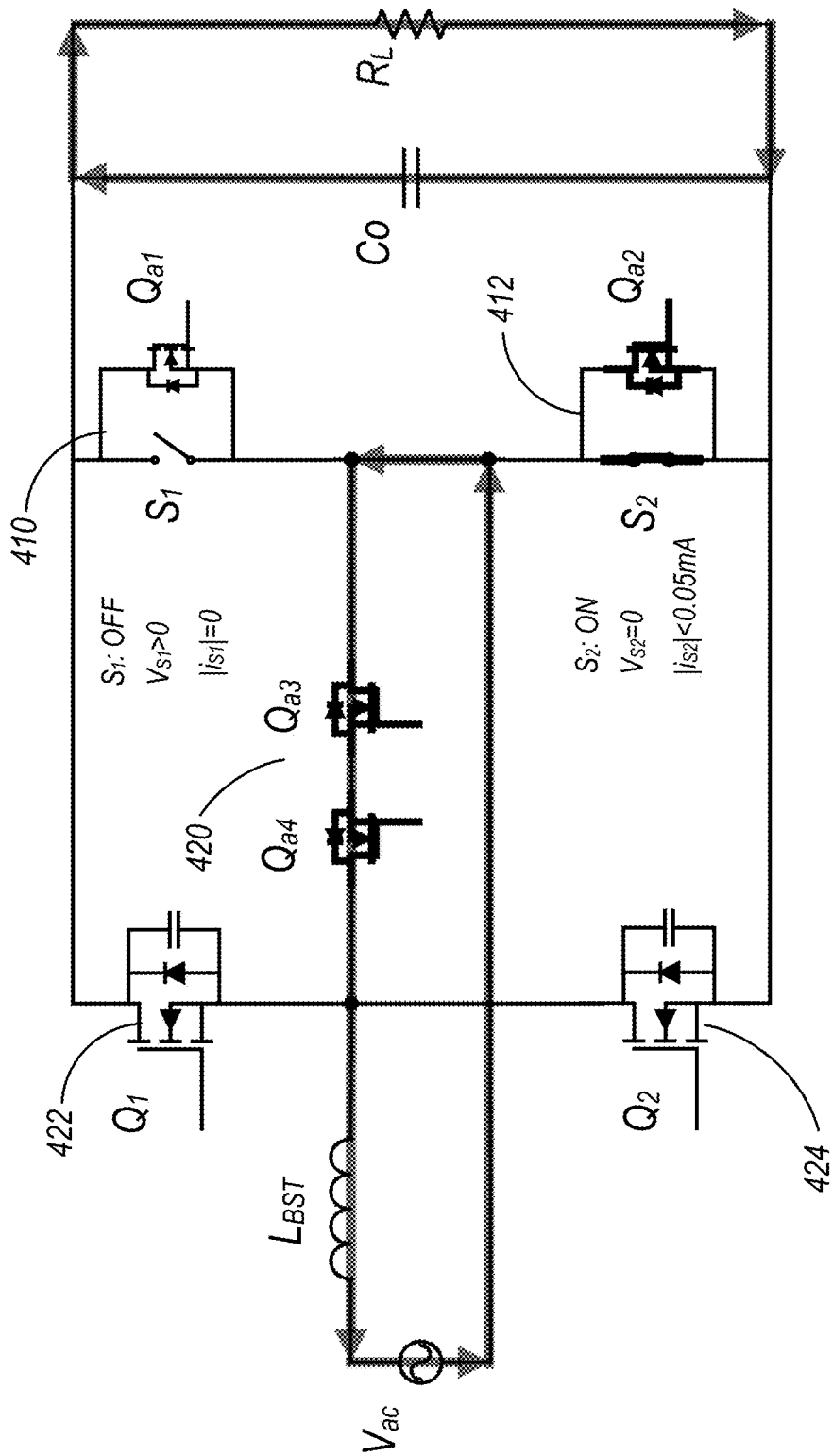

At t=T6, MEMS switch S2 of the second MEMs rectifier 412 is turned on by changing its gate voltage Vgate from zero to a high voltage. In some embodiments, the high voltage may be 80V. In some embodiments, the high voltage for the MEMS switch can be in a range from about 60V to 90V. Since the current through Qa2 is about zero, the current through MEMS switch S2 will also be about zero although it is turned on. The equivalent circuit is shown in FIG. 5H.

As can be seen above, from stage 7 and stage 8, before MEMS switch S2 is turned on, its voltage is zero and after S2 is turned on, its current is also zero. Therefore, Zero-Voltage-Zero-Current turn-on is achieved for MEMS switch S2 of the second MEMS rectifier 412.

Stage 9: Voltage Clamp Switch Qa2 is Turned Off (from t=T7 to T8)

Figure 5I:
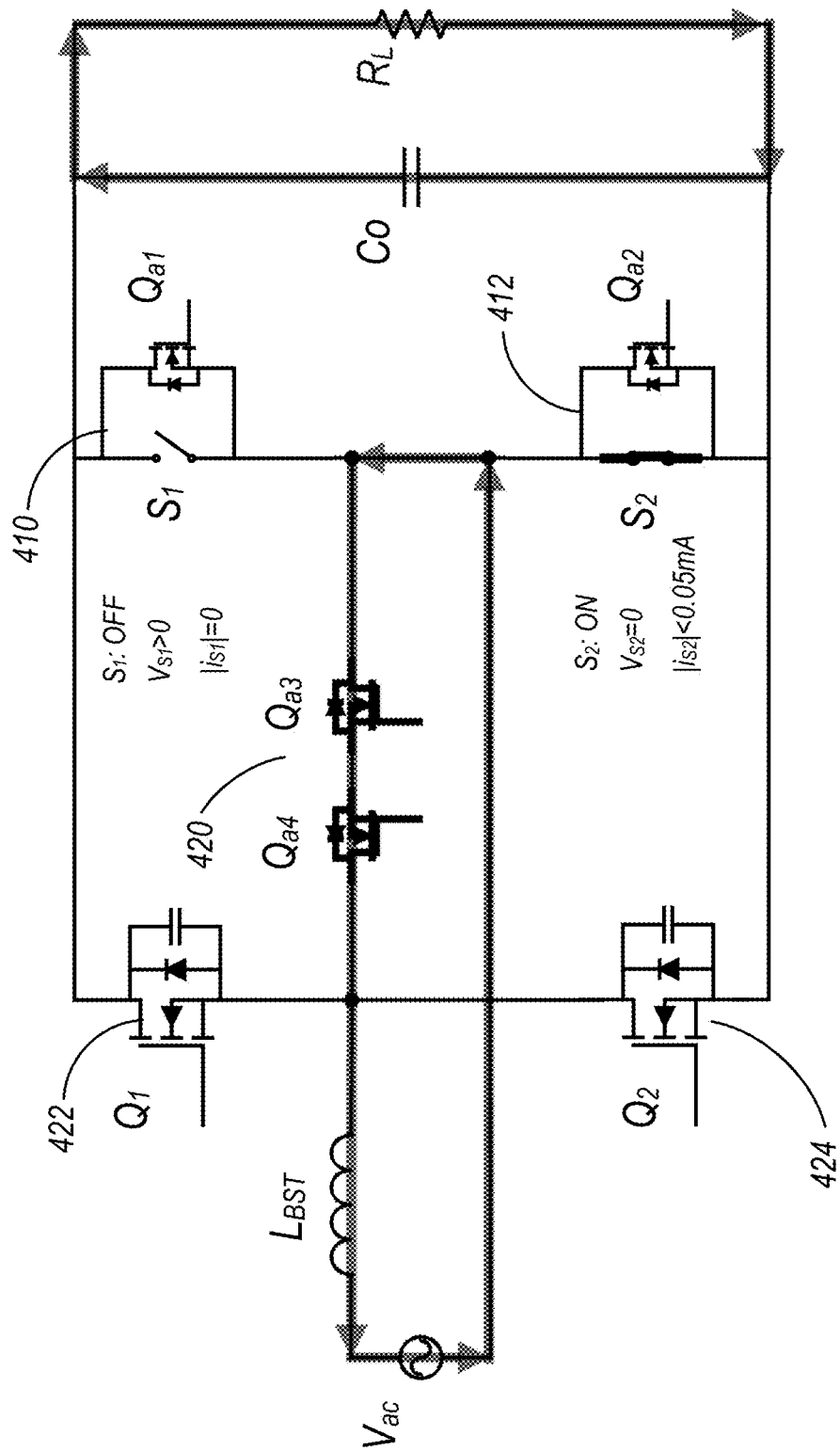

At t=T7, voltage clamp switch, MOSFET Qa2, of the second MEMS rectifier 412 is turned off. However, while MEMS switch S2 remains on, the current through MEMS switch S2 remains about zero. The equivalent circuit is shown in FIG. 5I.

Stage 10: Current diverting circuit, Qa3, Qa4, is turned off (from t=T8 to t=T9)

Figure 5J:
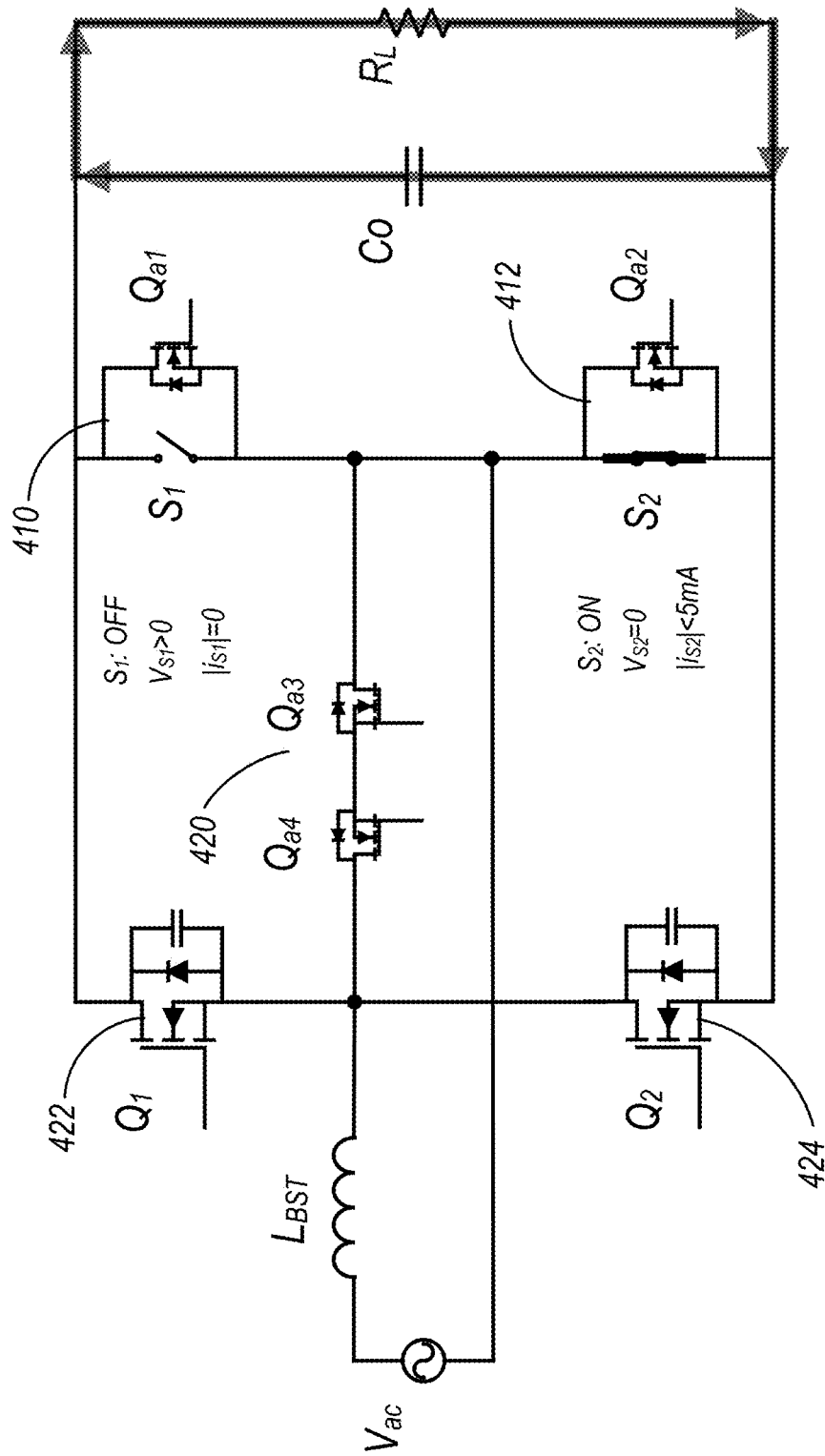

At t=T8, switches Qa3 and Qa4 of the current diverting circuit 420 is turned off. MEMS switch S2 of the second MEMS rectifier 412 is in an on-state and MEMS switch S1 of the first MEMS rectifier 410 is in an off-state state. The circuit is now ready for operation at a positive AC cycle from Vac. The equivalent circuit is shown in FIG. 5J.

Stage 11: Switching MOSFETs, Q1 and Q2, are Turned on (after t=T9)

Figure 5K:
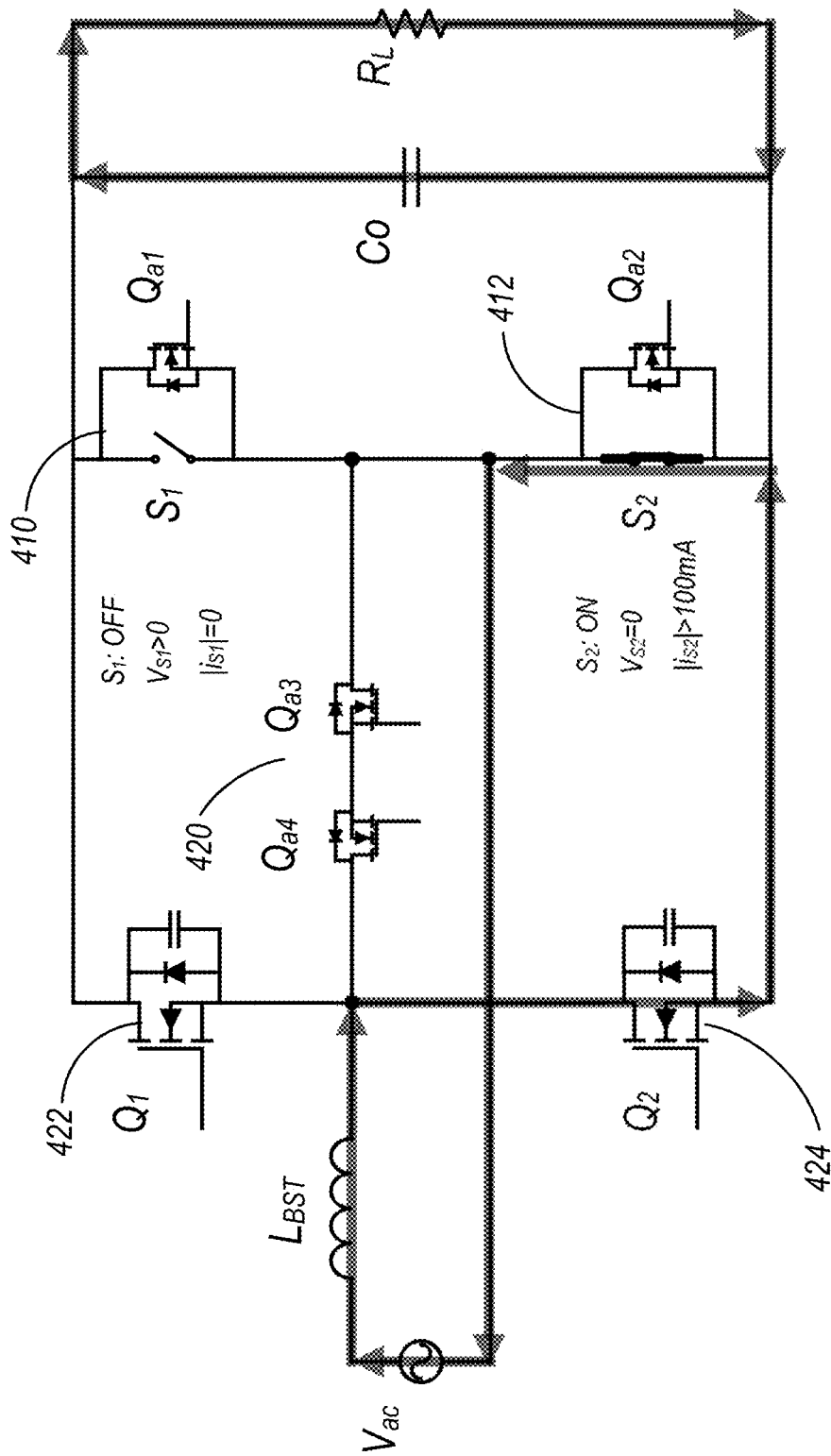

At t=T9, Q1Q2 enable signal (Q1Q2en), shown in FIG. 6, becomes high and the normal PWM operation resumes for totem-pole Boost converter 400. For a positive half AC cycle, Q2 is the main switch and Q1 is SR switch. FIG. 5K shows the equivalent circuit at this stage.

It is noted in the above figures, the components with thicker lines indicate an on-state. For example, in FIG. 5C, S1 of the first MEMS rectifier 410 is drawn with a thicker line.

This indicates that S1 is in an on-state. In FIG. 5D, S1 and Qa1 of the first MEMS rectifier 410 are drawn with thicker lines. This indicates that S1 and Qa1 are in an on-state. Although MEMS switch S1 is in an on-state as shown in FIGS. 5C and 5D, no current flows through it. Instead, the inductor current ($L_{BST}$) flows through the switches Qa3 and Qa4 of the current diverting circuit 420 instead.

FIG. 6 shows the timing diagram for the control signals of the switches Q1 and Q2 of the high frequency switching devices 422, 424, Qa4 and Qa3 of the current diverting circuit 420, and S1, S2, Qa1, Qa2 of the first and second MEMS rectifiers 410, 412. The signals described in FIG. 6 include gate signals (GateS1, GateS2) for MEMS switches S1 and S2, enable signal for Q1 and Q2 (Q1Q2en), gate signals for auxiliary MOSFET Qa1, Qa2 (GateQa1, GateQa2), and gate signal for auxiliary switches Qa3, Qa4 (GateQa3Qa4). It is noted that the gate signals for Qa3, Qa4 of the current diverting circuit 420 are the same. When GateS1, GateS2, Q1Q2en, GateQa1, GateQa2 and GateQa3Qa4 are high (i.e. high gate voltage), the corresponding switch will be in an on-state, and when GateS1, GateS2, Q1Q2en, GateQa1, GateQa2 and GateQa3Qa4 are low (i.e. low gate voltage, or zero in FIG. 6), the corresponding switch will be in an off-state.

Since the transition of S1 in the on-state to S2 in the on-state happens at zero crossing of the AC voltage Vac (from negative to positive), it is noted that the AC voltage Vac from t=T0 to t=T9 is very small. In some embodiments, the expected value for Vac may be Vac(T0)=−5V and Vac(T9)=+5V. In operation, Vac(T0) may have a range of −15V to −1V and Vac(T9) may have a range of +1V to +15V. It is also noted that the absolute value of Vac(T0) and Vac(T9) may be different. In some embodiments, the total time interval from T0 to T9 may be 100 us. In further, embodiments, the total time interval from T0 to T9 may be between about 50 us to 500 us.

In operation, when the half AC line cycle is around 8.3 ms, the total time interval from T0 to T9 is a small portion of the AC half line cycle. Before t=T0 and after t=T9, the circuit operates normally in a power factor correction mode.

The above disclosure describe the operation of the Totem-Pole Boost AC-to-DC converter 400 using MEMS rectifiers 410 and 412, as shown in FIG. 4, when the AC voltage changes from negative value to positive value. During this AC voltage zero-crossing transition, MEMS switch S1 is turned off at Zero-Current-Zero-Voltage (ZCZV) condition and MEMS switch S2 is turned on at Zero-Voltage-Zero-Current (ZVZC) condition.

The operation when the AC voltage Vac changes from positive value to negative value may follow the same operation stages. In this case, S2 would transition to the off-state and S1 would transition to the on-state.

When implementing the proposed circuit 400, the following design and control considerations may be implemented.

The first and second MEMS-Rectifiers 410, 412 may be constructed by connecting a voltage clamp switches Qa1, Qa2 in parallel with the MEMS switches S1 and S2. A MOSFET with a high Rds value may be used as the voltage clamp switches Qa1, Qa2 because it carries small current. In practical design, the Rds of the voltage clamp switches Qa1, Qa2 can be 10% to 20% of the Rds value for the main switches Q1, Q2.

For the MEMS switch, either S1 or S2, that is to be turned off, a voltage clamp switch, Qa1 or Qa2, may be added in parallel so that the current through the MEMS switch, S1 or S2, is zero and its voltage is clamped to zero by the voltage clamp switch, Qa1 or Qa2, before the MEMS switch is turned off (zero gate voltage Vgate). After the gate voltage Vgate of the MEMS switch, S1 or S2, is reduced to zero, its terminal voltage is clamped to zero by the voltage clamp switch, Qa1 or Qa2, which also conducts zero current.

More specifically, MEMS switch current is reduced to zero by diverting its current into a current diverting circuit and its terminal voltage is clamped to zero by a voltage clamp switch (MOSFET in the above description), before it is turned off (before its gate voltage reduced to zero). After its gate voltage is reduced to zero, the MEMS switch is turned off, the current through its voltage clamp switch (or the current through the MEMS-Rectifier) is still zero and its voltage is clamped to zero by its voltage clamp switch.

For the MEMS switch, S1 or S2, that is to be turned on, voltage clamp switch Qa1 or Qa2, may be added so that the voltage of the MEMS switch, S1 or S2, is clamped to zero by the voltage clamp switch, Qa1 or Qa2, which conducts zero current. After the gate voltage Vgate is applied (after S1 or S2 is turned on), the current through the first or second MEMS Rectifier 410, 412 (MEMS switch S1 or S2 and voltage clamp switch Qa1 or Qa2) remains zero.

More specifically, MEMS switch S1 or S2 voltage may be reduced to zero before it is turned on (before its gate voltage Vgate is applied) by diverting its current into the current diverting circuit 420 and its terminal voltage is clamped by the voltage clamp switch Qa1 or Qa2 to zero. After the gate voltage Vgate is applied, the MEMS switch S1 or S2 transitions to the on-state (two terminals are short circuited), the current through the MEMS switch S1 or S2 is still zero and its voltage is clamped by the voltage clamp switch Qa1 or Qa2 which conducts zero current.

In some embodiments, when the above proposed design and control schemes are implemented, no stress is applied to the MEMS switches S1 and S2 during the on-state and off-state transition.

For the AC-to-DC converter 400, the transition happens when the AC voltage Vac is at zero-crossing. During this time interval, the current in the Boost inductor $L_{BST}$ is very small. In some embodiments, Qa3 and Qa4 are MOSFET switches which serve as the current diverting circuit 420, and Qa1 and Qa2 are MOSFET switches which serve as the voltage clamp switches in the first and second MEMS rectifier 410, 412. In a further embodiment, if Qa1, Qa2, Qa3, and Qa4 are conducting when AC voltage Vac is at the zero crossing interval (i.e. when the AC current is small), the current for Qa1, Qa2, Qa3, and Qa4 is small. Therefore, a MOSFET with high Rds and low current rating may be used.

For example, assuming the root mean square (RMS) value of the AC current Iac is 10 A, the switching MOSFETs, Q1, Q2 of the high frequency switching device 422, 424 and the MEMS switches, S1, S2 of the first and second MEMS rectifiers 410, 412 should be selected based on 10 A rms current. Nevertheless, since the auxiliary MOSFETs, Qa1, Qa2, Qa3, Qa4 conduct during the zero crossing time interval of Vac, they can be selected based on 1 A to 2 A current rating. In other words, when implementing the auxiliary MOSFETs Qa1, Qa2, Qa3, Qa4 into the circuit 400, the current rating of the auxiliary MOSFETs may be 5 to 10 times smaller than the main MOSFETs and MEMS switches. In some embodiments, the Rds of the auxiliary MOSFETs may be 5 to 10 times larger than the Rds of the switching MOSFETs.

The gate control signals for the MEMS switches S1, S2, and voltage clamp switch Qa1, Qa2 of the first and second MEMS rectifier 410, 412; and the current diverting circuit 420 should be arranged to achieve the above objectives. The voltage clamp switch is arranged in the circuit topology to limit the possible voltage across the MEMS switch immediately after the MEMS switch transitions from the on-state and off-state. For example, immediately after a MEMS switch (such as S1) is turned off, its voltage is clamped to zero by Qa1 as Qa1 is still on. As the current through MEMS rectifier 410 is zero when S1 transitions from the on-state and off-state, the current through both S1 and Qa1 are about zero. Further, the voltage across S1 will be about zero as the current through Qa1 is about zero. This may be possible due to the current diverting circuit providing another current path for the inductor current (such as the $L_{BST}$ as shown FIG. 4). Therefore, the inductor current $L_{BST}$ does not flow through the MEMS rectifier 410, 412.

Figure 7:
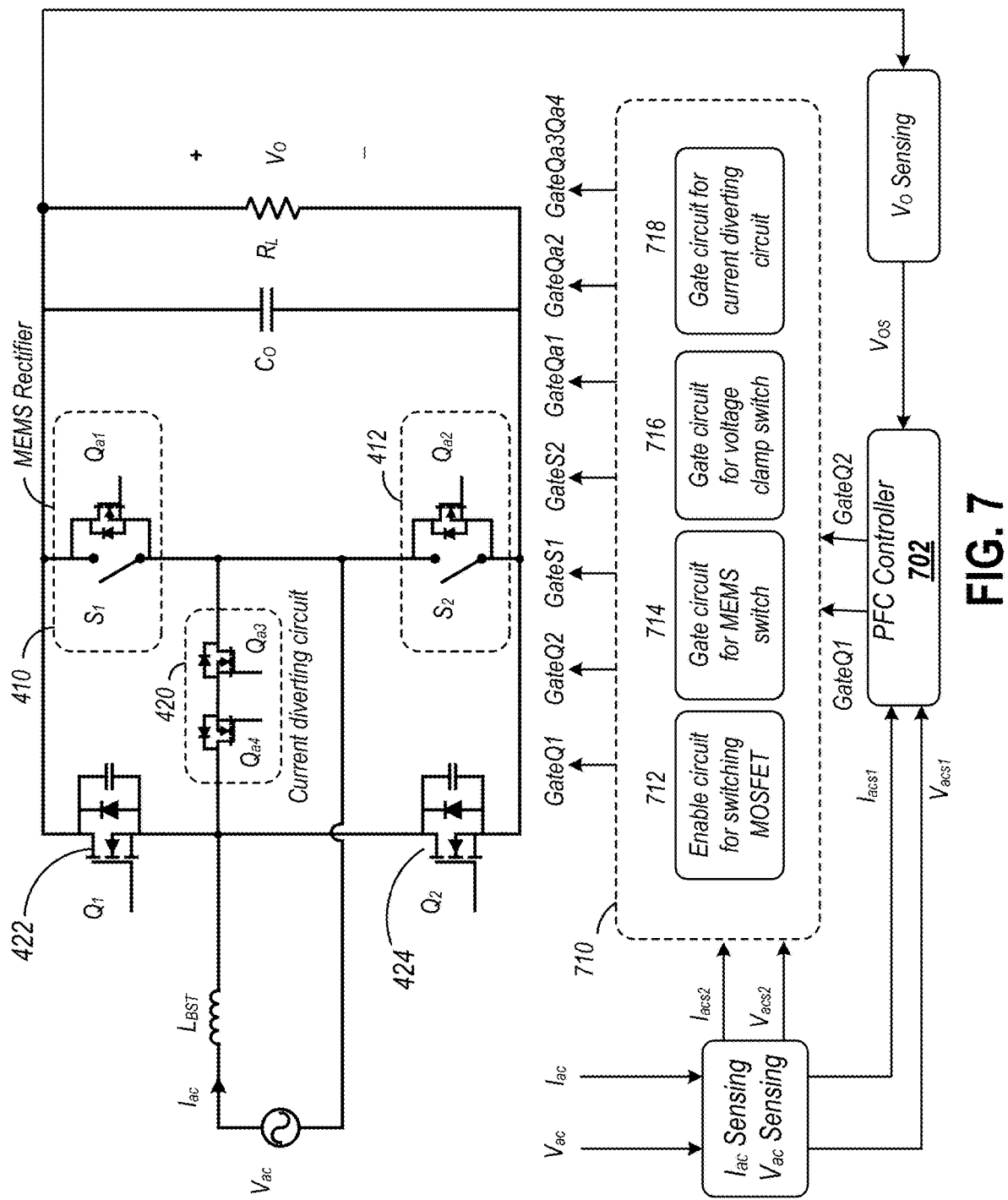
FIG. 7 is a circuit diagram of a control circuit used to achieve Zero-Current-Zero-Voltage turn-on and Zero-Voltage-Zero-Current turn-off for the circuit shown in FIG. 4, according to some embodiments.

A control circuit, as shown in FIG. 7, is used to achieve Zero-Current-Zero-Voltage turn-on and Zero-Voltage-Zero-Current turn-off for the MEMS switches S1 and S2 shown in FIG. 4.

As compared to the conventional Totem-Pole Boost AC-to-DC converter 100B, the block 710 is added to achieve ZCZV turn-off and ZVZC turn-on of the MEMS switches S1 and S2.

PFC controller 702 receives the sensed output voltage, Vos, input AC voltage Vacs1, and input AC current, Iacs1, and produce a pair of PWM control signals, GateQ1 and GateQ2, that is used to drive the main switches, Q1 and Q2, within the high frequency switching devices 422, 424 to achieve power factor correction.

Logic circuit block 710 is added to achieve ZCZV turn-off and ZVZC turn-on of the MEMS switches S1 and S2. The input AC voltage information, Vacs2, and input AC current information, Iacs2, may be fed into block 710. Based on Vacs2, Iacs2, the switching MOSFET enable circuit 712 produces an enable/disable signal, Q1Q2en, that disables the Q1, Q2 during zero crossing of the AC input voltage Vac. Gate circuit for MEMS switch 714 produces the gate drive signals for MEMS switch S1 and S2, according to the required control logic diagram as shown in FIG. 6. Gate circuit for voltage clamp switch 716 produces the gate drive signals for voltage clamp switches, MOSFETs, Qa1 and Qa2. Qa1 and Qa2 are connected in parallel with MEMS switch S1 and S2 within the first and second MEMS rectifier 410 and 412. Gate circuit for current diverting circuit 718 produces the gate drive signals for auxiliary MOSFETs Qa3 and Qa4. Qa3 and Qa4 forms the current diverting circuit 420 that diverts the current flowing through the MEMS switches S1 and S2.

Figure 8:
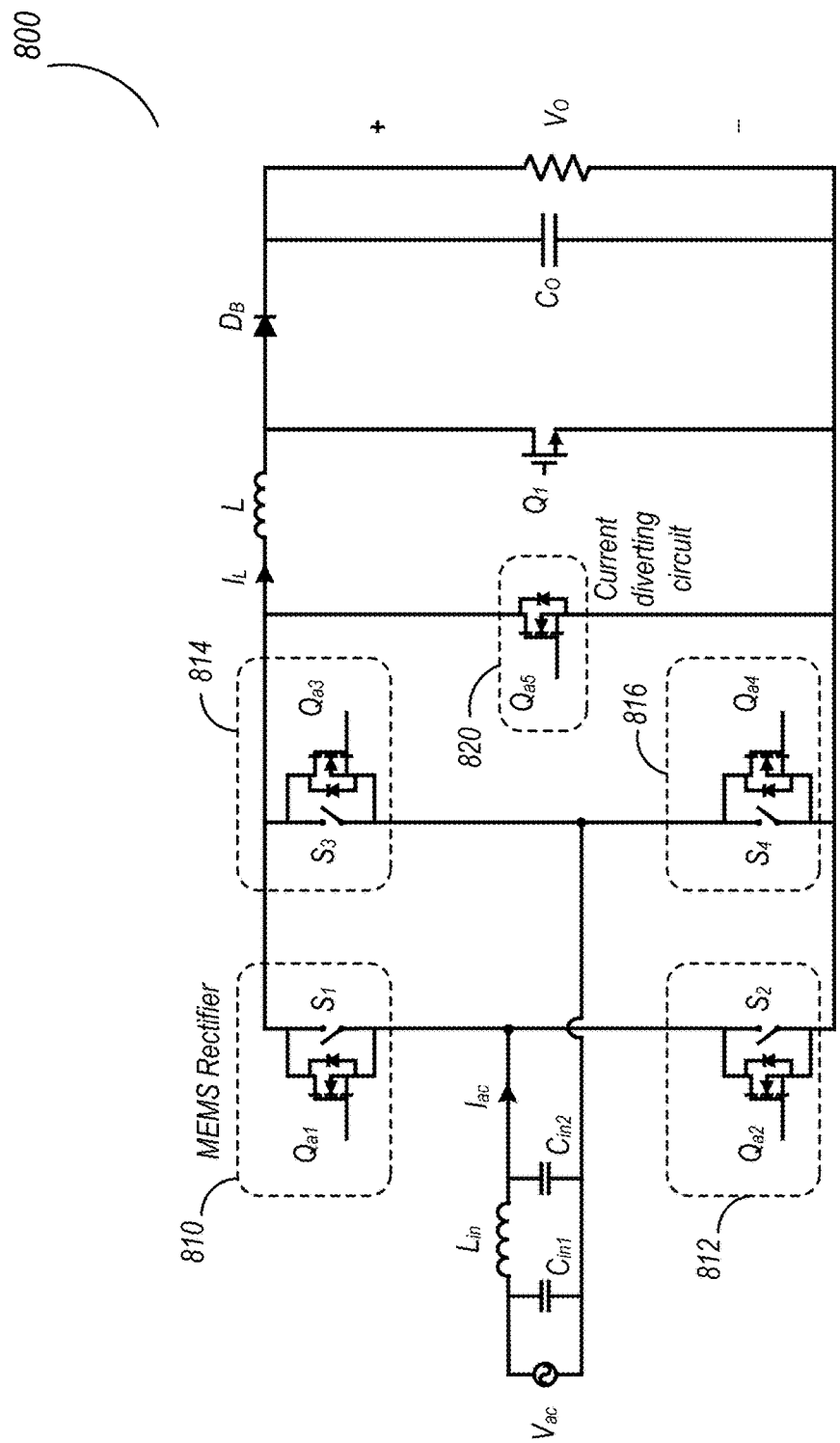
FIG. 8 is a circuit diagram for a proposed conventional Boost AC-to-DC converter using MEMS switches, according to some embodiments.

FIG. 8 shows a conventional Boost AC-to-DC converter 800 using MEMS switches. S1, S2, S3, and S4 are MEMS switches in the first, second, third, and fourth MEMS rectifier 810, 812, 814, 816. Qa1, Qa2, Qa3, Qa4, and Qa5 are auxiliary switches. Qa1, Qa2, Qa3, and Qa4 are voltage clamp switches to clamp the voltage across the MEMS switches S1, S2, S3 and S4 in the first, second, third, and fourth MEMS rectifier 810, 812, 814, 816. Qa5 is the current diverting circuit 820 which may divert the inductor current ($I_L$) when the AC voltage Vac is at a zero crossing interval to ensure that the current through MEMS switches S1, S2, S3 and S4 is zero.

Figure 10:
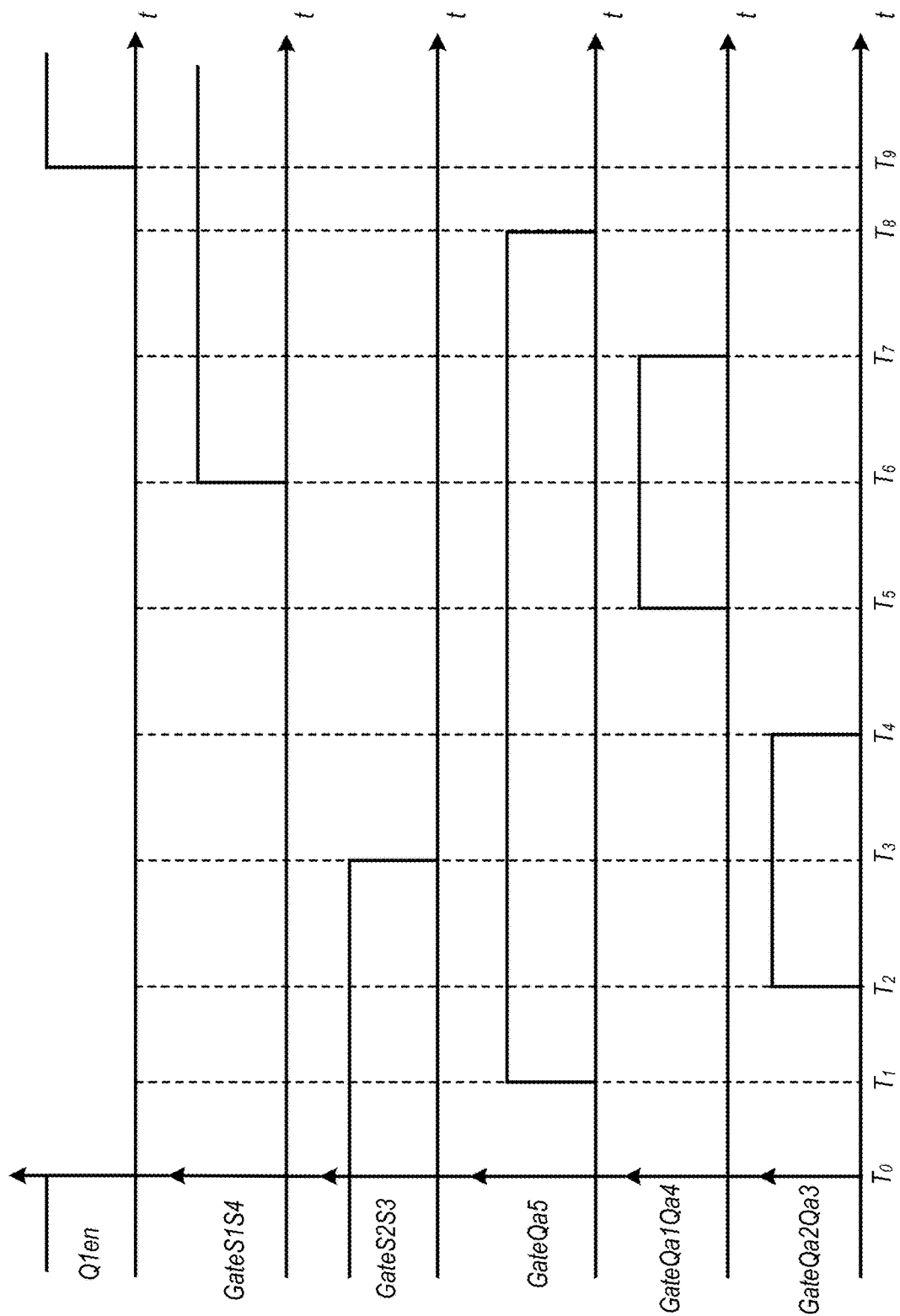
FIG. 10 is a timing diagram for the control signals of the switches in the proposed circuit shown in FIG. 8, according to some embodiments.

The gate drive signals for these switches and the operation of the circuit can be explained using the gate control signals shown in FIG. 10. FIG. 10 shows the operation of circuit 800 when the AC voltage Vac is at a zero crossing interval from a negative value to a positive value.

Stage 1: Initial Condition, at Before t=T0

Figure 9A:
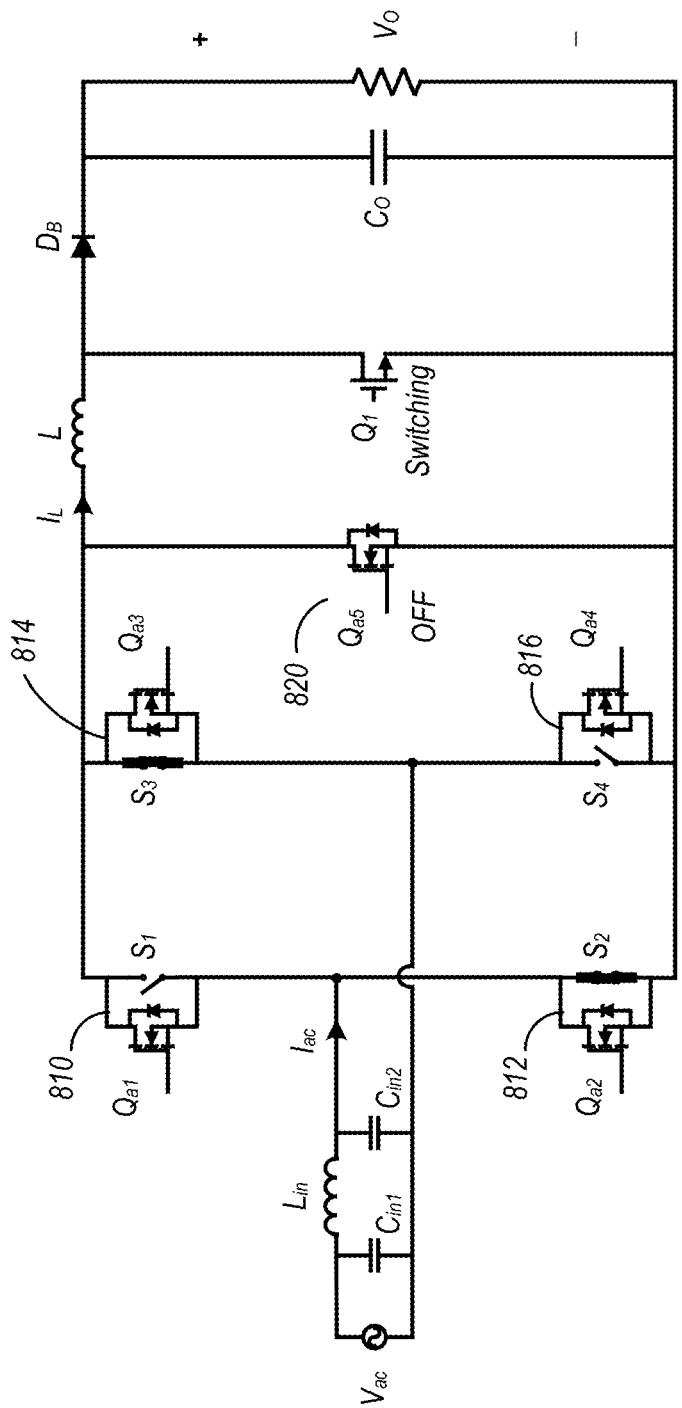
FIG. 9A, 9B, 9C, 9D, 9E, 9F, 9G, 9H, 9I, 9J, 9K show equivalent circuits for the proposed conventional Boost AC-to-DC converter using MEMS switches shown in FIG. 8 in operation, according to some embodiments.

It is assumed that initially, AC voltage Vac is at a negative half cycle, therefore, main switch Q1 is operating to achieve power factor correction. In this stage, MEMS switch, S2 and S3 are in the on-state. MEMS switch S1 and S4 are in the off-state. The equivalent circuit is shown in FIG. 9A.

Stage 2: Disable Switch Q1 (from t=T0 to t=T1)

Figure 9B:
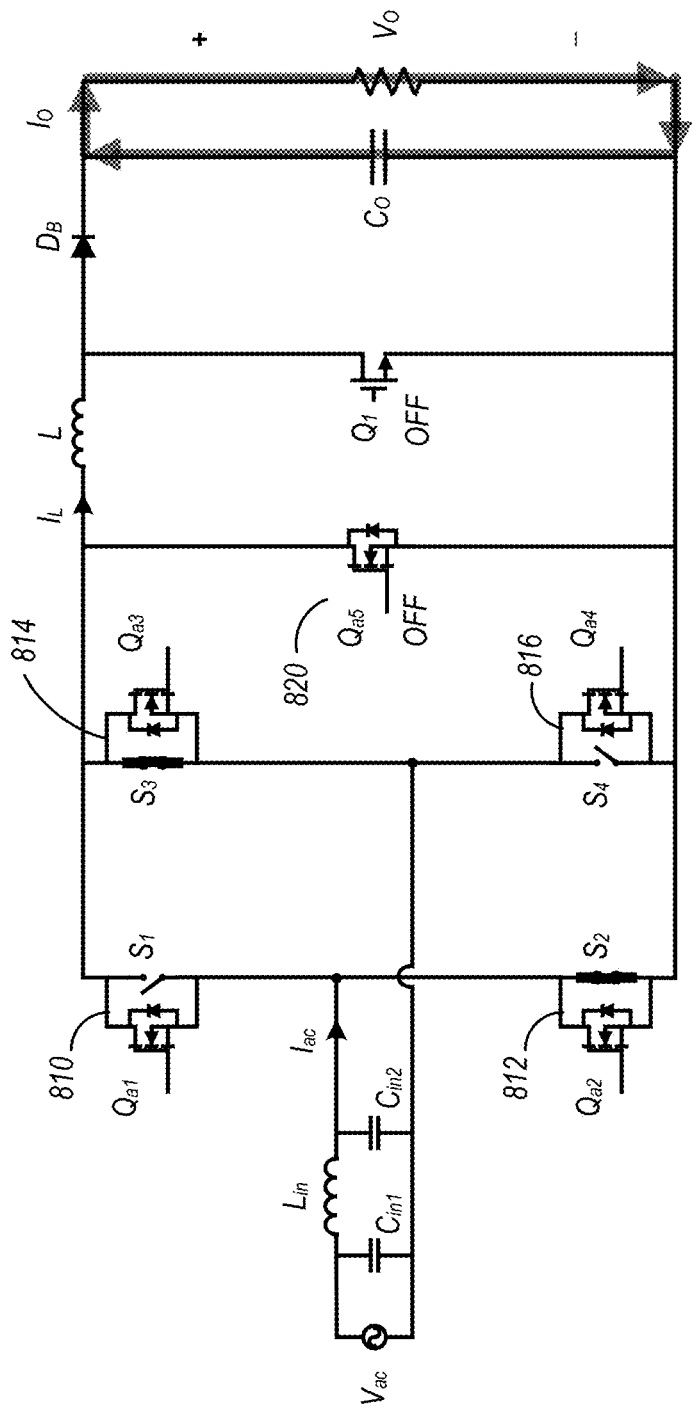

When the AC voltage Vac is close to zero after the negative half cycle, such as when AC voltage Vac is about −5V, the transition from the on-state to the off-state starts for S2 and S3 and from the off-state to the on-state for S1 and S4. At t=T0, the gate drive signal for Q1 is disabled by signal Q1en, in response, Q1 is turned off. Since the AC voltage Vac is close to zero, such as at −5V, turning-off of Q1 does not impact the normal operation of the AC-to-DC converter to achieve power factor correction. The load current is provided by the output capacitor Co. At this moment, MEMS switches S2 and S3 are in an on-state and the small inductor current will flow through S2 and S3. The equivalent circuit is shown in FIG. 9B.

Stage 3: Current Diverting Circuit, Qa5, is Turned on (from t=T1 to t=T2)

Figure 9C:
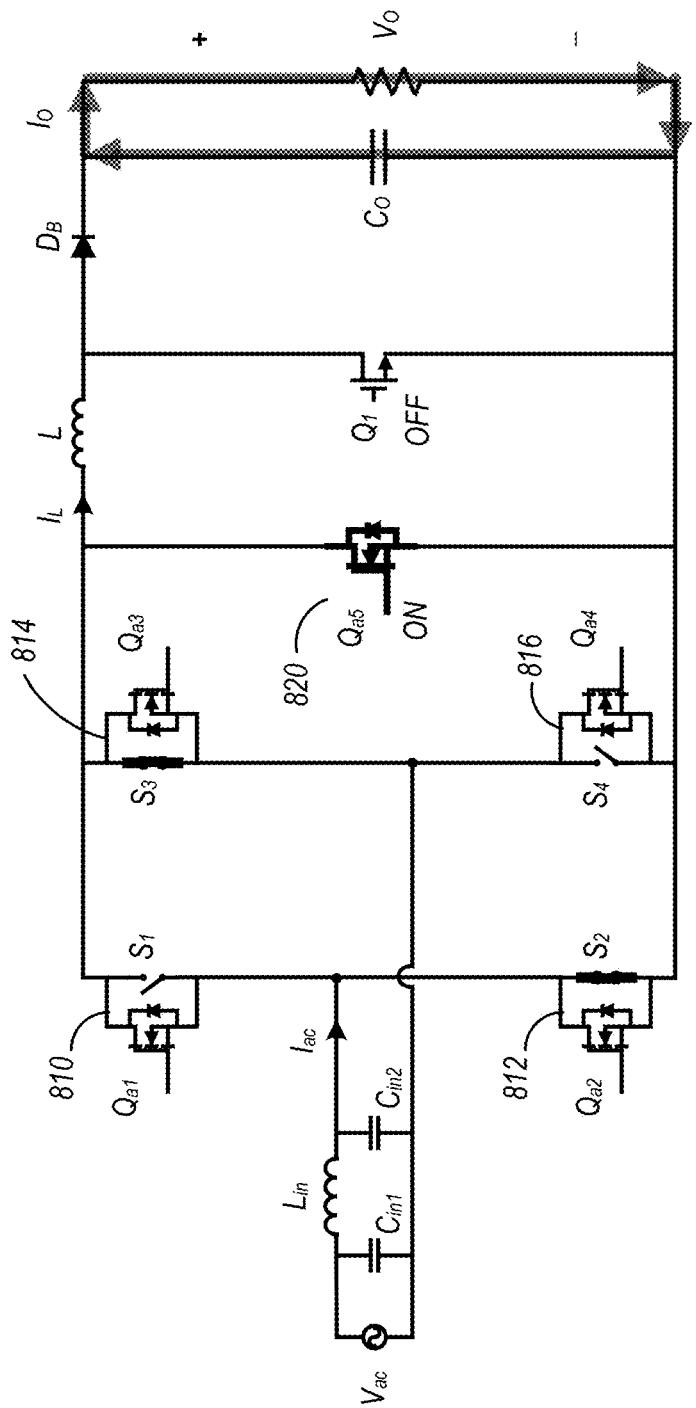

At t=T1, the auxiliary MOSFET Qa5 of current diverting circuit 820 is turned on by GateQa5. The equivalent circuit is shown in FIG. 9C. In this stage, the inductor current $I_L$, which is the same as the AC input current, Iac, flows through Qa5. The current through S2 and S3 is therefore very small as the load current is still provided by the output capacitor Co.

Stage 4: Voltage Clamp Switches Qa2, Qa3 are Turned on (from t=T2 to t=T3)

Figure 9D:
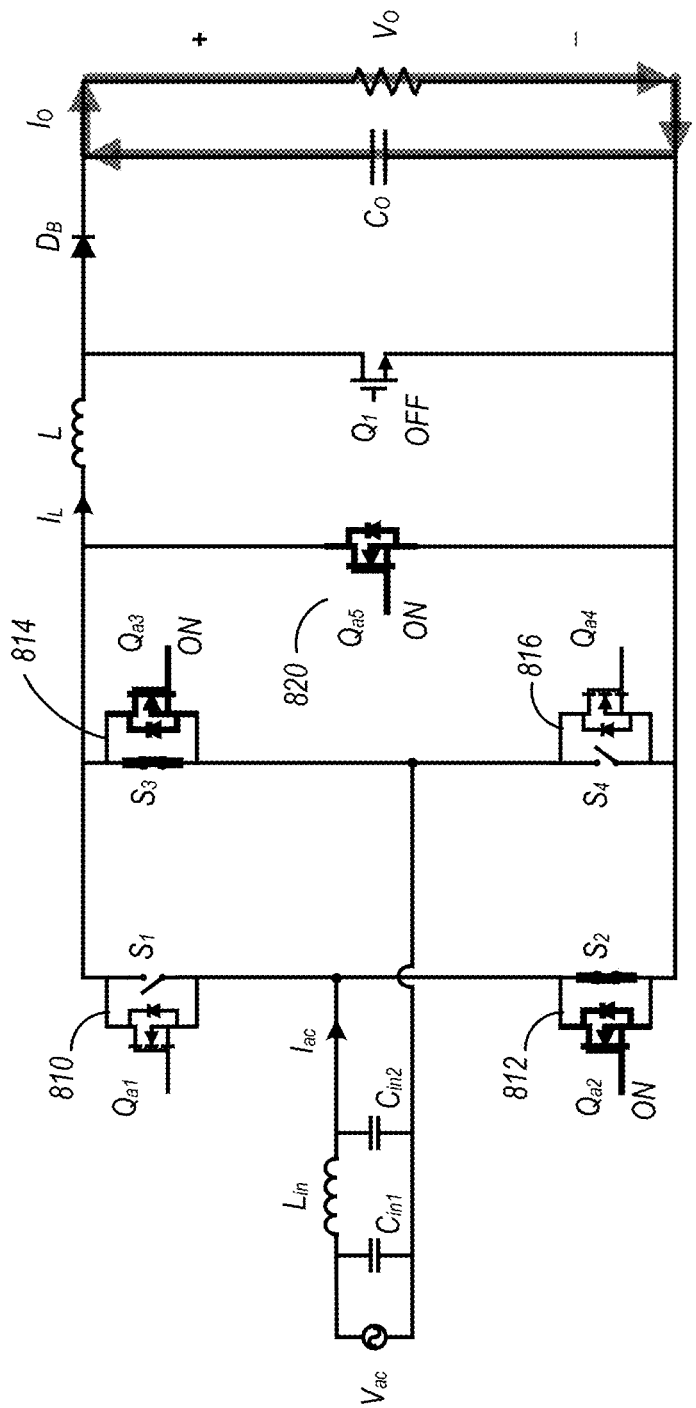

At t=T2, the voltage clamp switch, Qa2 and Qa3, are turned on, the equivalent circuit is shown in FIG. 9D. Since the current through S2 and S3 is almost zero, the current through both MEMS-Rectifiers 812 and 814 (S2/Qa2 and S3/Qa3) will also be about zero. It is noted that the transition to the on-state of Qa2 and Qa3 does not impact the circuit operation as S2 and S3 are on.

Stage 5: MEMS Switches S2, S3 are Turned Off (from t=T3 to t=T4)

Figure 9E:
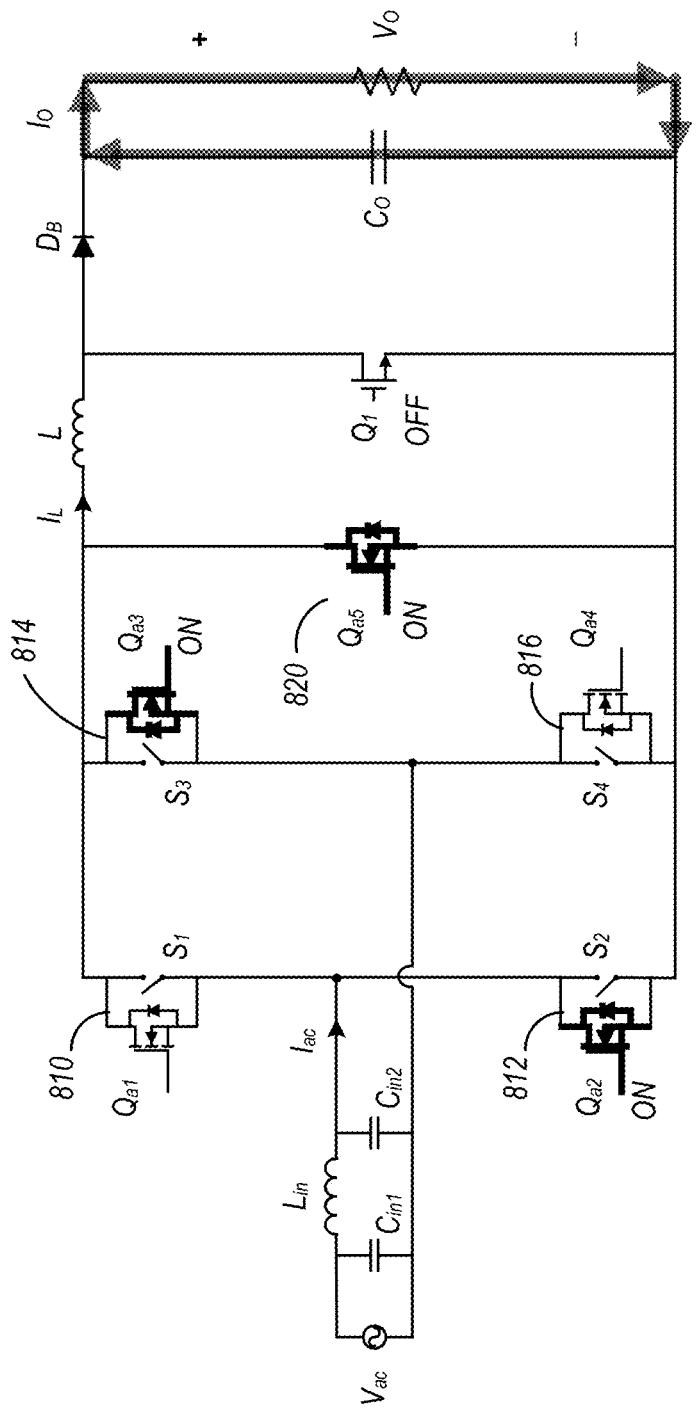

At t=T3, the gate voltage for MEMS switch S2 and S3 is removed and S2 and S3 are turned off. The equivalent circuit is shown in FIG. 9E. Since Qa2 and Qa3 are in an on-state and the current through Qa2 and Qa3 are very small, the voltage across Qa2 and Qa3 is also very small. Therefore, the voltage across S2 and S3 is very small. It is noted that the term "very small current" means that the current is less than 1% to 5% of the maximum AC current Iac. The term "very small voltage" means that the voltage is less than 0.1% to 1% of the maximum AC voltage Vac.

As can be seen above, between stage 3 and stage 5, that before S2 and S3 transition to the off-state, the current through S2 and S3 is very small, and that after S2 and S3 transition to the off-state, the voltage across S2 and S3 is also very small. Therefore, Zero-Current-Zero-Voltage turn-off is achieved for S2 and S3.

Stage 6: Voltage Clamp Switches, Qa2, Qa3 are Turned Off (from t=T4 to t=T5)

Figure 9F:
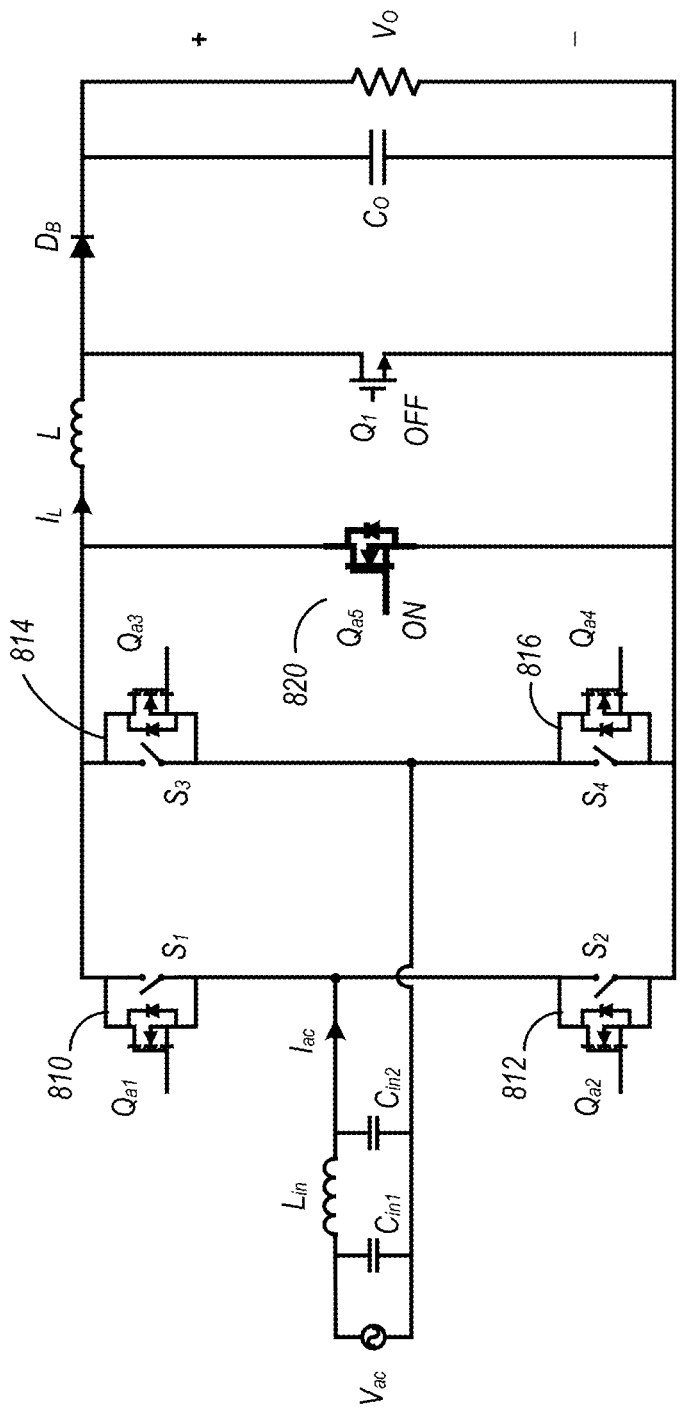

At t=T4, voltage clamp switches Qa2, Qa3 in second and third MEMS rectifier 812, 814 are turned off. In this stage, both second and third MEMS-Rectifier 812, 814 (S2/Qa2 and S3/Qa3) are in an off-state. The transition to the off-state for S2, S3 is therefore complete. The circuit 800 is ready for S1 and S4 to transition to the on-state. The equivalent circuit is shown in FIG. 9F.

Stage 7: Voltage Clamp Switches, Qa1, Qa4, are Turned on (from t=T5 to T6)

Figure 9G:
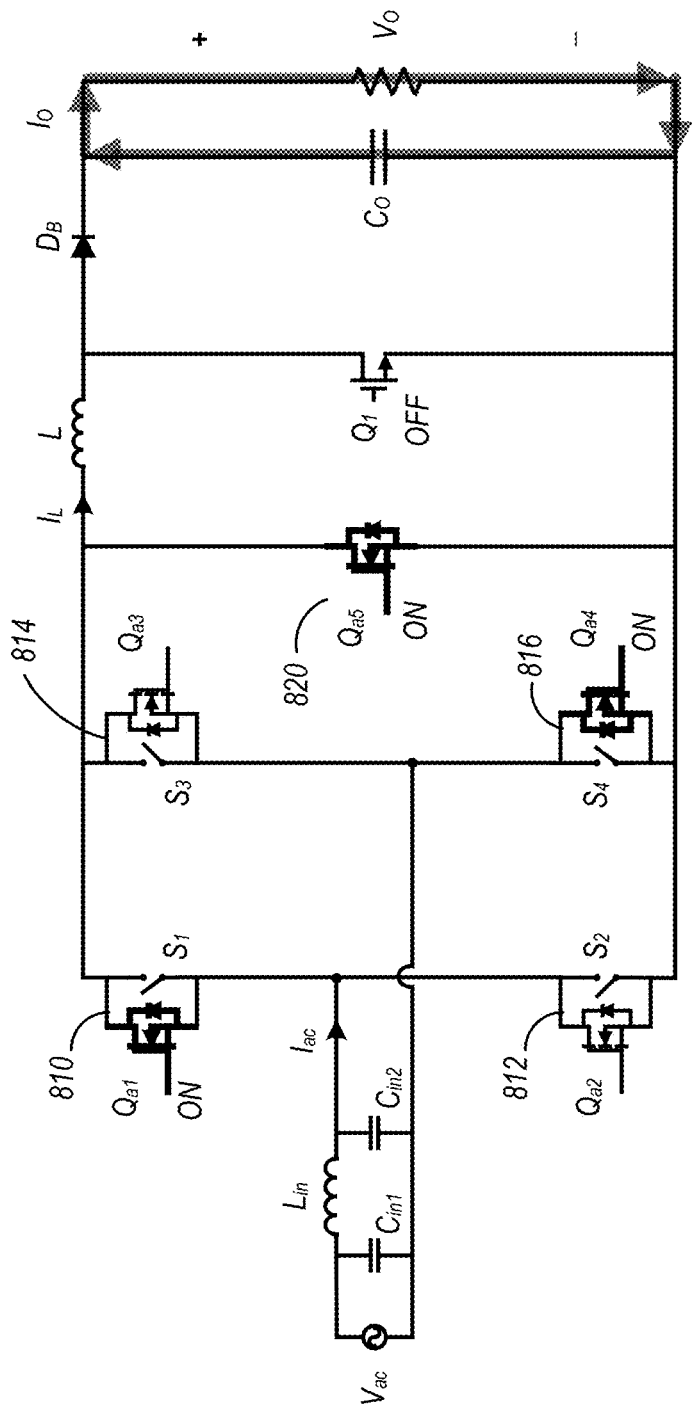

At t=T5, voltage clamp switches Qa1 and Qa4, are turned on. Since the inductor current $I_L$ still flows through Qa5, the current flowing through Qa1 and Qa4 is very small. Therefore, the voltage across S1 and S4 will be very small as well. The equivalent circuit is shown in FIG. 9G.

Stage 8: MEMS Switches S1, S4 are Turned on (from t=T6 to t=T7)

Figure 9H:
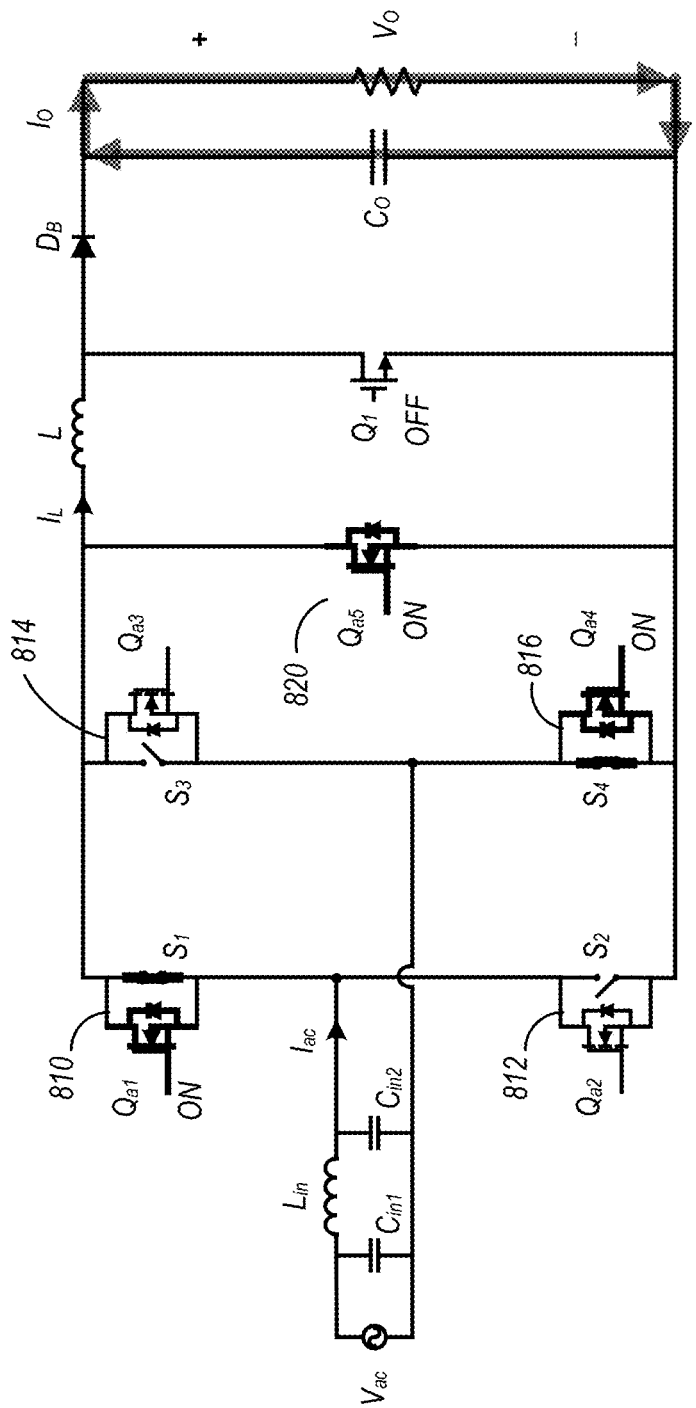

At t=T6, MEMS switches S1 and S4 transition to the on-state by changing their gate voltage Vgate from zero to high voltage (such as 80V). Since the current through Qa1 and Qa4 is still very small as the inductor current $I_L$ is flowing through Qa5, the current through S1 and S4 will also be very small. The equivalent circuit is shown in FIG. 9H.

As can be seen above, between stage 7 and stage 8, before S1 and S4 transition to the on-state, the voltage across S1 and S4 is very small and the after S1 and S4 transition to the on-state, the current through S1 and S4 is also very small. Therefore, Zero-Voltage-Zero-Current turn-on is achieved for S1 and S4.

Stage 9: Voltage Clamp Switches, Qa1, Qa4, are Turned Off (from t=T7 to T8)

Figure 9I:
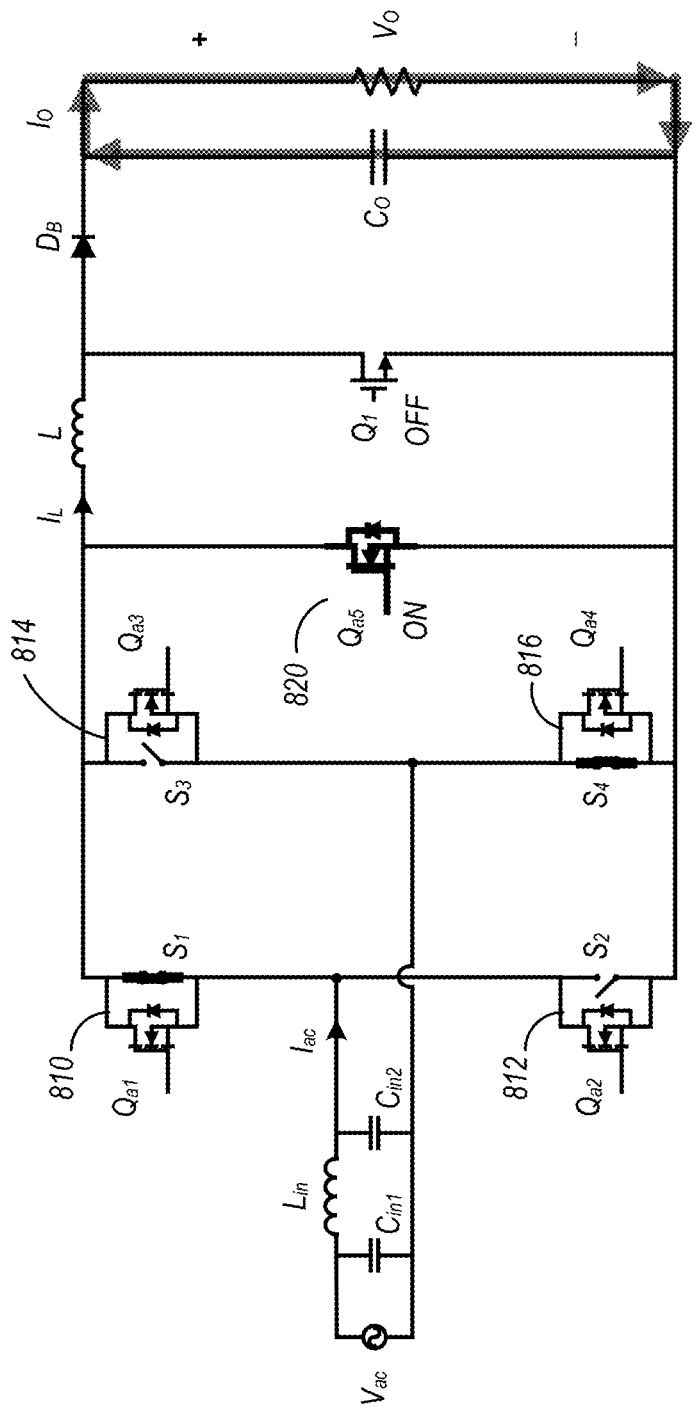

At t=T7, voltage clamp switches Qa1, Qa4 of the first and fourth MEMS rectifier 810, 814 are turned off. S1 and S4 remain in the on-state. The current through S1 and S4 remains very small. The equivalent circuit is shown in FIG. 9I. During time interval T7, the value of the inductor current $I_L$ (i.e. Iac) is very small, as it is at zero crossing interval, the inductor current $I_L$ will flow between Qa5 (which is in an on-state) and the series connection of the MEMS rectifier 810, the voltage source, and the MEMS rectifier 816. Therefore, the current through S1 and S4 is a fraction, such as around 50%, of the inductor current $I_L$. Therefore, the current through S1 and S4 is maintained at a very small value. In the proposed AC-to-DC converter 800 with MEMS rectifiers 810, 812, 814, 816, the current through S1 and S4 may be about 0.1% to 0.5% of the Rms current of the input AC current $I_{ac}$.

Stage 10: Current Diverting Circuit, Qa5, is Turned Off (from t=T8 to t=T9)

Figure 9J:
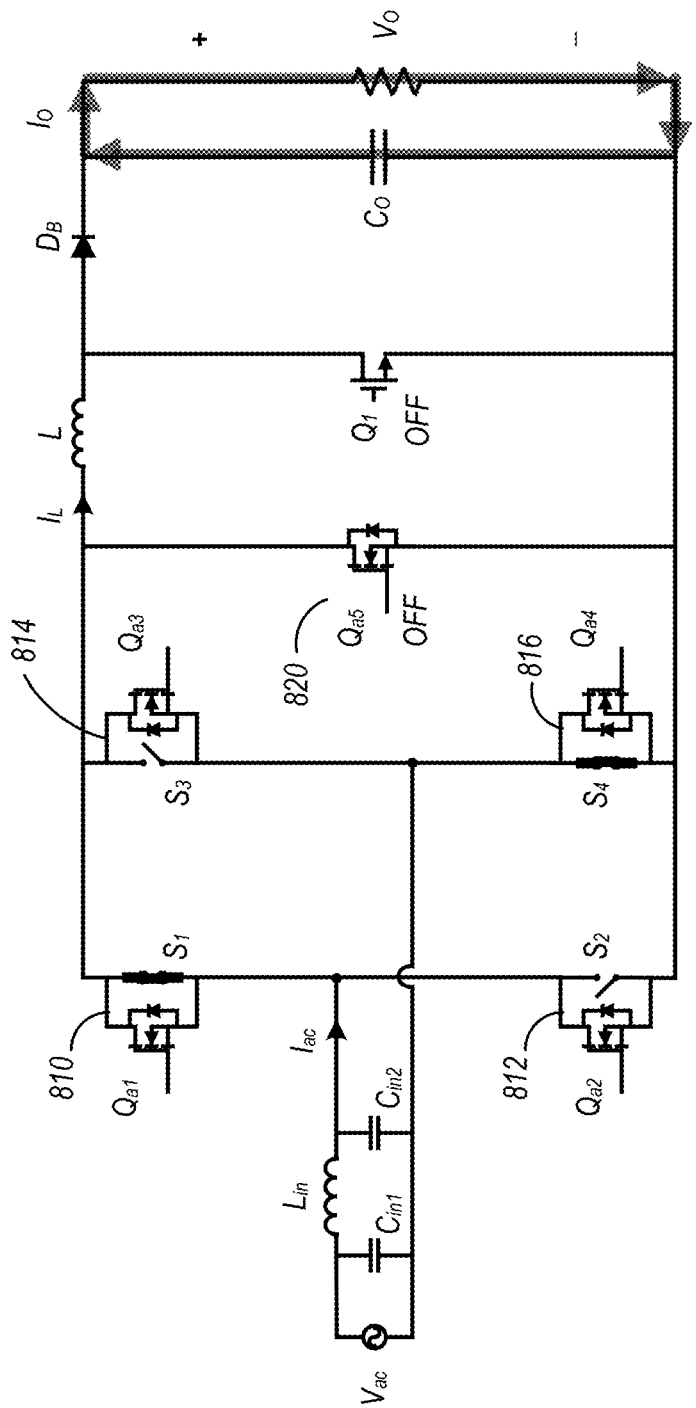

At t=T8, the switch Qa5 of the current diverting circuit 820 is turned off. S1 and S4 are in an on-state and S2 and S3 are in an off-state state. The circuit 800 is now ready for operation at a positive AC cycle. The equivalent circuit is shown in FIG. 9J.

Stage 11: Q1 is Turned on (after t>T9)

Figure 9K:
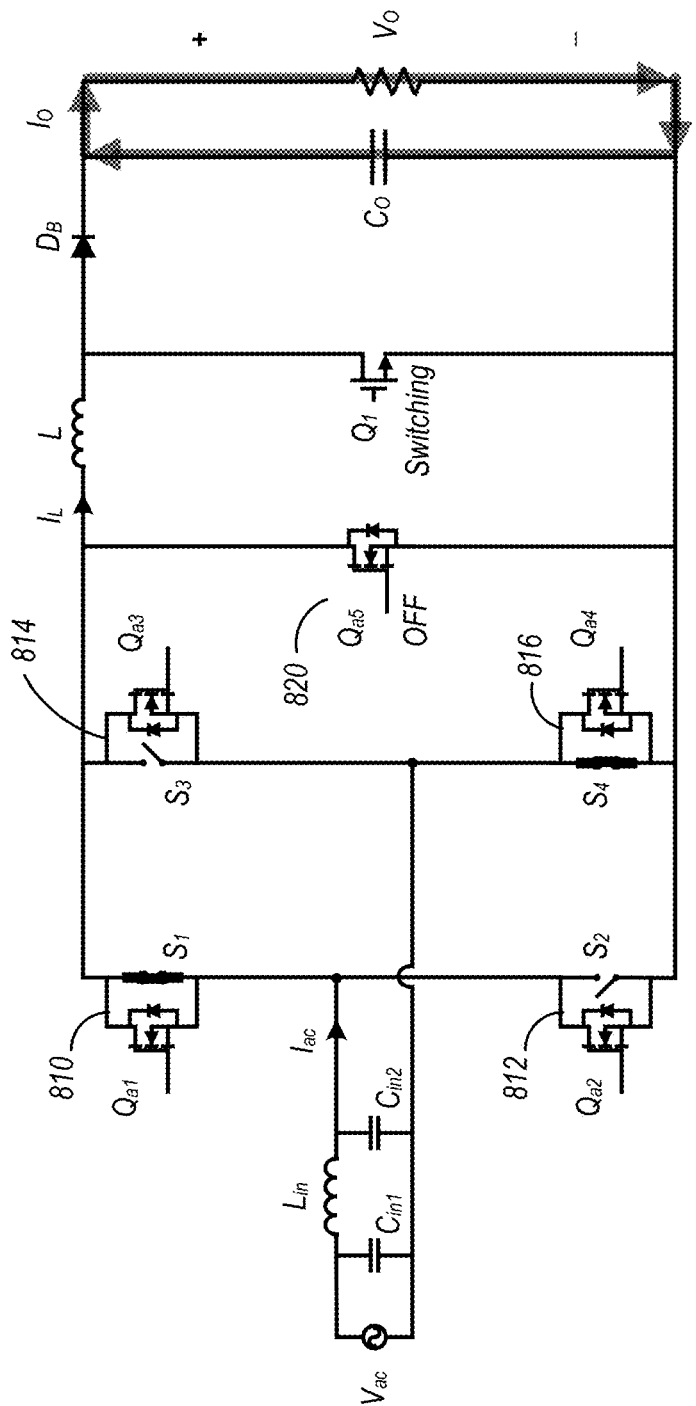

At t=T9, Q1 enable signal (Q1en) becomes high and the normal PWM operation resumes for the Boost converter. FIG. 9K shows the equivalent circuit at this stage.

FIG. 10 shows the timing diagram for the gate signals of the switches in the Boost AC-to-DC converter 800 as shown in FIG. 8. The timing diagram shows the gate signals GateS1S3, GateS2S4 for MEMS switches S1, S2, S3, S4, enable signal Q1en for Q1, gate signals GateQa1Qa3, GateQa2Qa4 for voltage clamp switches Qa1Qa3, Qa2Qa4, and gate signal GateQa5 for switch Qa5 in the current diverting circuit 820. It is noted that the gate signals for Qa1 and Qa3 are the same; Qa2 and Qa4 are the same, S1 and S3 are the same, and S2 and S4 are the same. It is also noted that the switch will be in an on-state when its gate voltage Vgate is high, and the switch will be in an off-state when its gate voltage Vgate is low (zero in FIG. 10).

Comparing the operation for Totem-Pole Boost AC-to-DC converter using MEMS switches 400 (as shown in FIG. 4) and the conventional Boost AC-to-DC converter using MEMS switches 800 (as shown in FIG. 8), the difference is that the MEMS switches in the totem-pole Boost converter 400 (FIG. 4) achieve true Zero-Current-Zero-Voltage turn-on and true Zero-Current-Zero-Voltage turn-off, while the MEMS switches in conventional Boost converter 800 (FIG. 8) achieves quasi Zero-Current-Zero-Voltage turn-on and quasi true Zero-Current-Zero-Voltage turn-off. By "quasi", it means the current through MEMS switches S2 and S3 is not exactly zero. As shown in FIG. 9D, the MEMS switch S2 and S3 are connected in series and then in parallel with Qa5. Therefore, the inductor current, $I_L$, split between Qa5 and S2/S3. At the zero crossing, the inductor current is very small and therefore, the current through S2 and S3 are also very small.

In the above description, a small MOSFET (with higher Rds) can be used as the voltage clamp switch which is connected in parallel with a MEMS switch to clamp the voltage to a very small value.

Figure 11A:
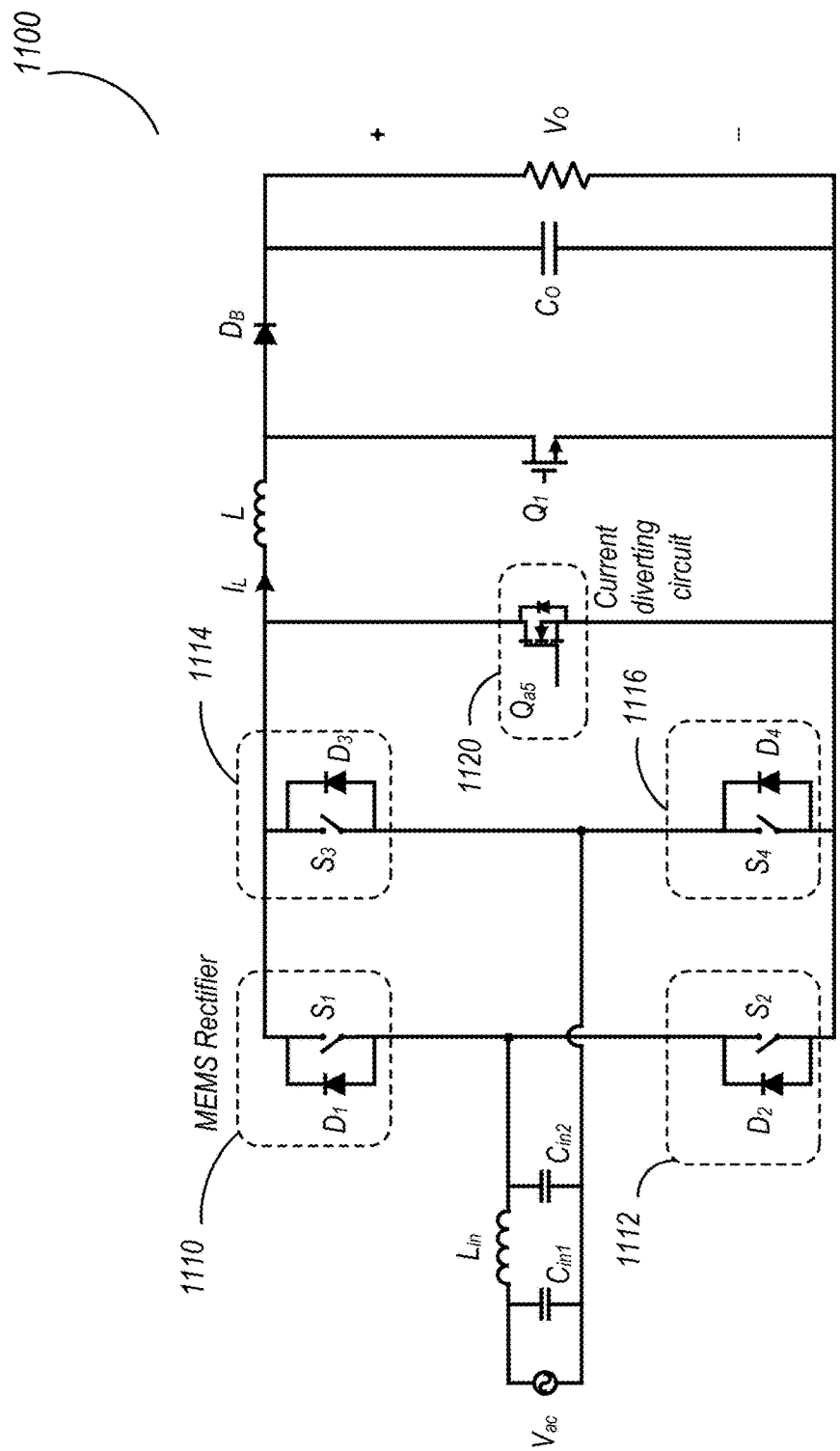
FIG. 11A is a circuit diagram for a proposed conventional Boost AC-to-DC converter using MEMS switches, according to some embodiments.
Figure 11B:
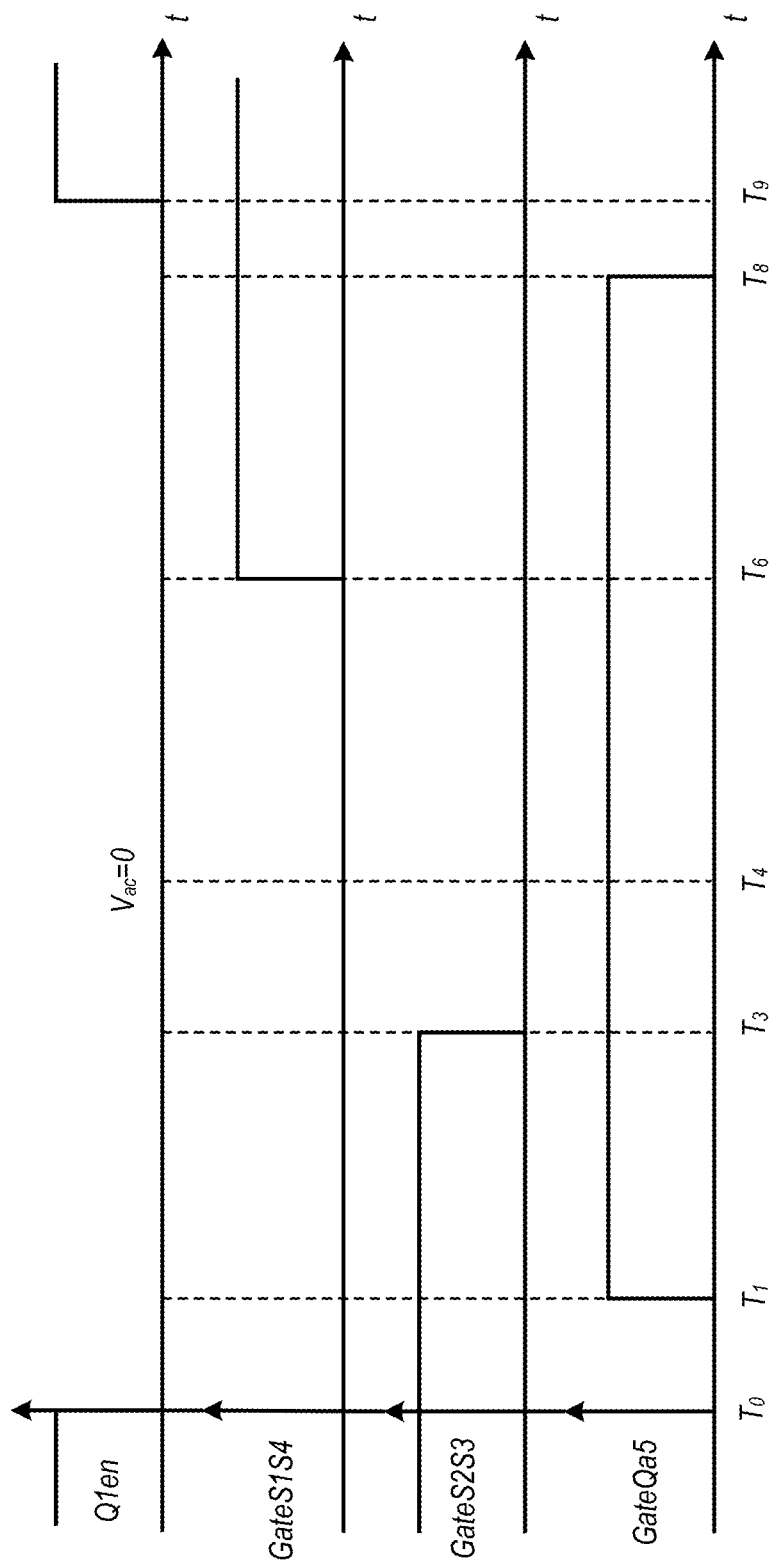
FIG. 11B is a timing diagram for the control signals of the switches in the proposed circuit shown in FIG. 11A, according to some embodiments.
Figure 12A:
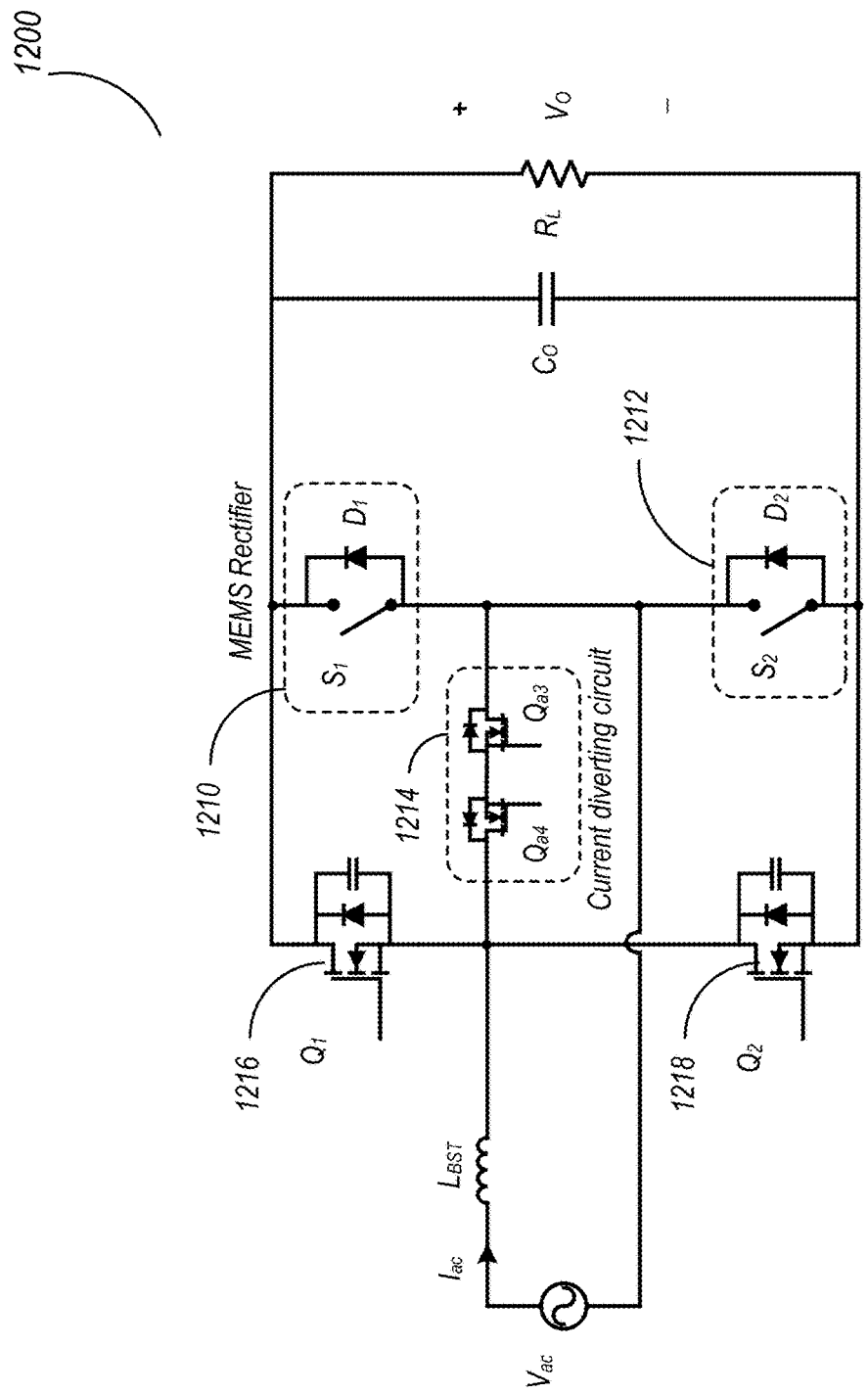
FIG. 12A is a circuit diagram for a proposed Totem-Pole Boost AC-to-DC converter using MEMS switches, according to some embodiments.
Figure 12B:
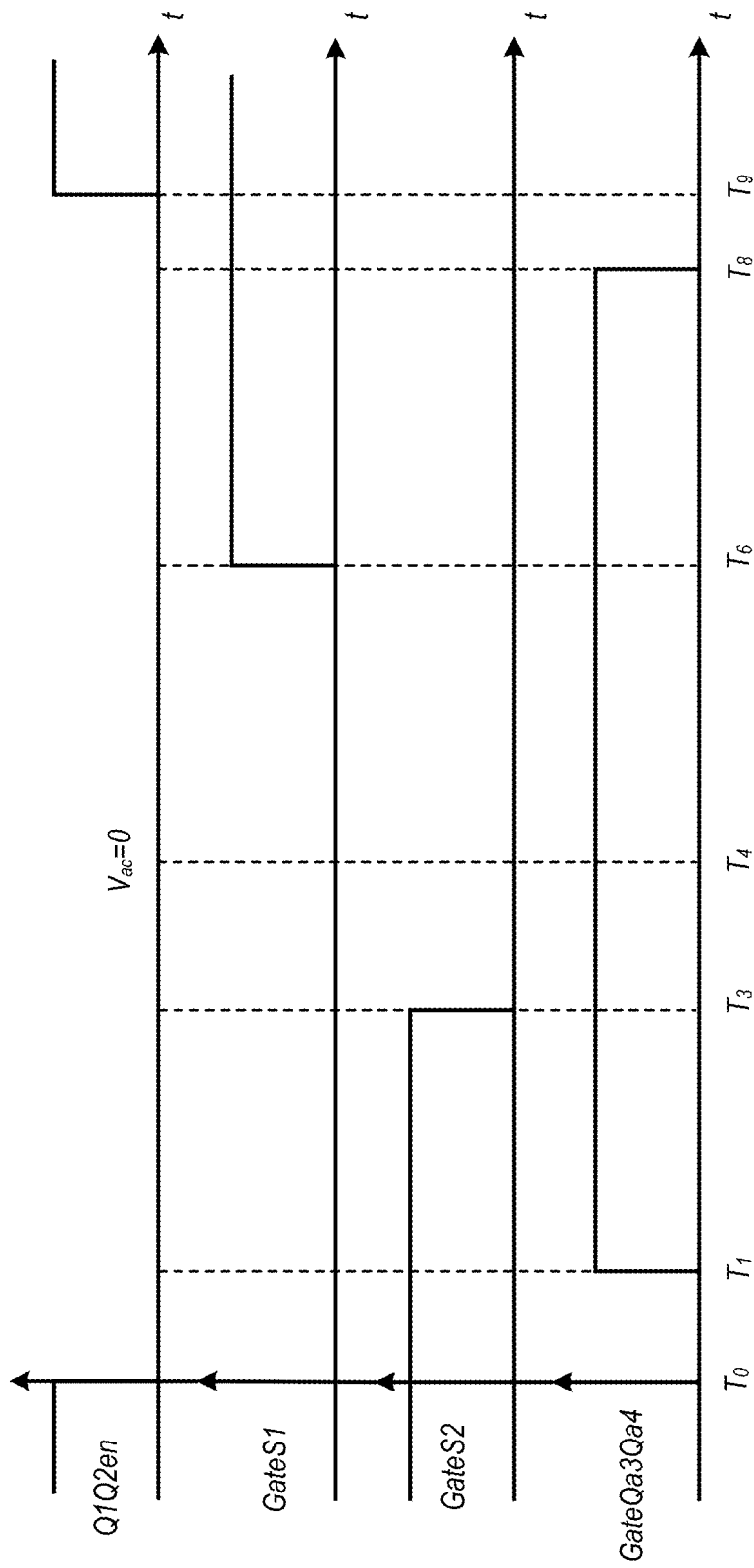
FIG. 12B is a timing diagram for the control signals of the switches in the proposed circuit shown in FIG. 12A, according to some embodiments.

In some embodiments, a diode may be used as the voltage clamp switch for the MEMS switch, as shown in FIG. 11A and FIG. 12A. The timing diagram of the gate signals for the circuits 1100 and 1200 shown in FIG. 11A and FIG. 12A are shown in FIG. 11B and FIG. 12B, respectively. In FIG. 11A, the circuit 1100 topology is a conventional AC-to-DC Boost converter having a first, second, third and fourth MEMS rectifier 1110, 1112, 1114, 1116 arranged in a full bridge structure, a current diverting circuit 1120 coupled to two opposing nodes on the full bridge arrangement, and a high frequency switching device Q1 in parallel with the current diverting circuit 1120. The MEMS rectifiers 1110, 1112, 1114, 1116 each contain a MEMS switch S1, S2, S3, S4 coupled in parallel with a diode D1, D2, D3, D4, respectively.

In FIG. 12A, the circuit 1200 topology is a totem pole AC-to-DC Boost converter having a first and second MEMS rectifier 1110 and 1212 connected in series. A current diverting circuit 1214 is connected on one side with the voltage source and on another side to a common node shared with the first and second MEMS rectifier 1210, 1212. Two high frequency switching device 1216 and 1218 are each connected in series with a respective first and second MEMS rectifier 1210, 1212.

As diodes can conduct current only in one direction, the MEMS switch which is transitioning to the off-state, such as S2 and S3 in FIG. 11A and S1 in FIG. 12A, should be turned off when the AC voltage Vac is still negative (or equivalently, the AC current Iac is still negative). Similarly, the MEMS switch which is transitioning to the on-state, such as S1 and S4 in FIG. 11A and S2 in FIG. 12A, should be turned on when the AC voltage Vac becomes positive (or equivalently, the AC current Iac becomes positive).

In FIG. 11B and FIG. 12B, it is assumed that the AC voltage Vac becomes zero at t=T4. In other words, in conventional Boost converter circuit 1100, as shown in FIG. 11A, MEMS switches S2 and S3 should be in the off-state before T4 and S1 and S4 should in the on-state after T4. In totem-pole Boost converter 1200, as shown in FIG. 12A, MEMS switch S1 should be in the off-state before T4 and S2 should be in the on-state after T4.

The potential penalty is that the voltage across the MEMS switch is clamped to the forward voltage drop of a diode. Since the current through the MEMS switch is either zero (for totem-pole Boost converter 1200) or very small (for conventional Boost converter 1100), the voltage stress on the MEMS switches is still very small. In a simplified Totem-Pole Boost converter, S1 can still achieve true Zero-Current-Zero-Voltage turn-off and S2 can achieve true-Zero-Voltage-Zero-Current turn-on when the AC voltage changes from negative to positive. Similarly, when AC voltage changes from positive to negative, S2 can achieve true Zero-Current-Zero-Voltage turn-off and S1 can achieve true-Zero-Voltage-Zero-Current turn-on.

Figure 13A:
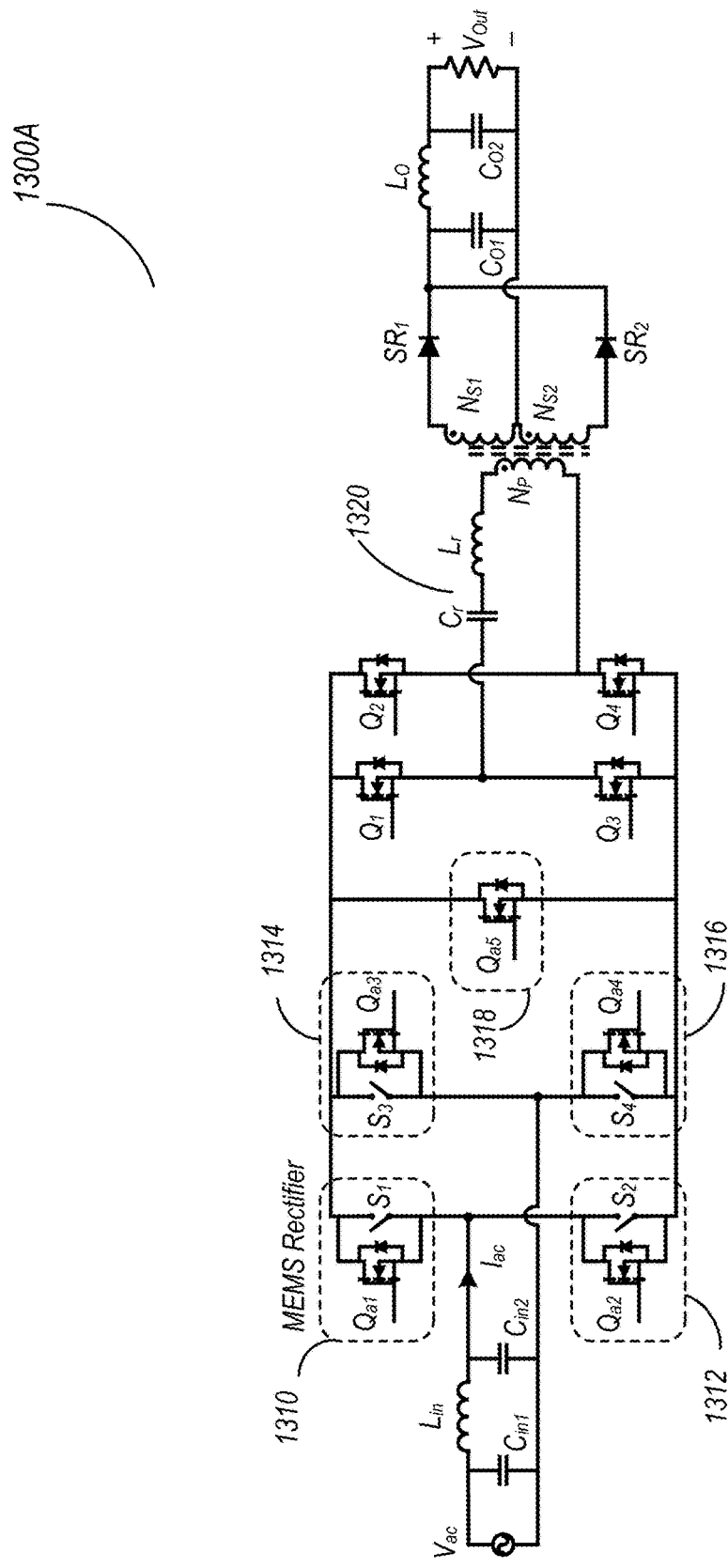
FIG. 13A is a circuit diagram of a proposed single stage AC-to-DC converter using MEMS switches, according to some embodiments.

FIG. 13A shows the circuit diagram of a single stage AC-to-DC converter 1300A using MEMS switches. The isolated LLC converter 1320 is connected after the MEMS rectifier bridge containing first, second, third and fourth MEMS rectifier 1310, 1312, 1314, 1316. In circuit 1300A, voltage clamp switches, MOSFETs, Qa1, Qa2, Qa3, Qa4, are connected in parallel with the MEMS switch, S1, S2, S3, and S4 within the first, second, third and fourth MEMS rectifiers 1310, 1312, 1314, 1316. In some embodiments, the Qa1, Qa2, Qa3, Qa4 may be diodes or any other type of switch. Qa5 is the current diverting circuit 1318. The circuit and method to generate the gate drive signals for all the switches S1, S2, S3, S4, Qa1, Qa2, Qa3, Qa4 and Qa5 in circuit 1300A are similar to that for conventional Boost converter 800, as shown in FIG. 8.

Figure 13B:
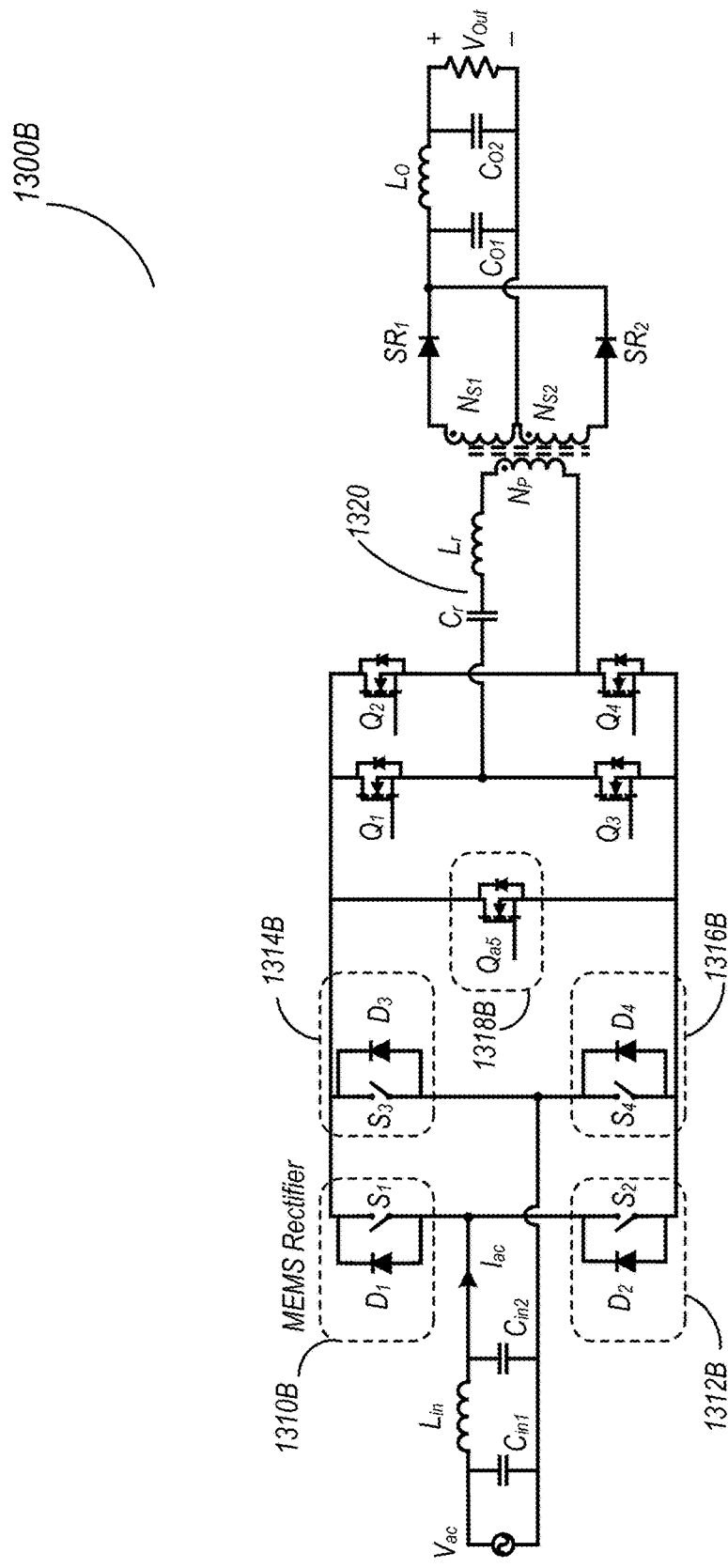
FIG. 13B shows a circuit diagram of a proposed single stage AC-to-DC converter using MEMS switches, according to some embodiments.

FIG. 13B shows the circuit diagram of a single stage AC-to-DC converter using MEMS switches 1300B. The isolated LLC converter 1320 is connected after the MEMS rectifier bridge containing first, second, third and fourth MEMS rectifier 1310B, 1312B, 1314B, 1316B. In circuit 1300B, diodes, D1, D2, D3, D4 are connected in parallel with the MEMS switch, S1, S2, S3, and S4 within the first, second, third and fourth MEMS rectifier 1310B, 1312B, 1314B, 1316B. Qa5 is the current diverting circuit 1318B. The circuit 1300B and method to generate the gate drive signals for all the switches in this circuit are similar to that for conventional Boost converter 1100, as shown in FIG. 11A.

Figure 14:
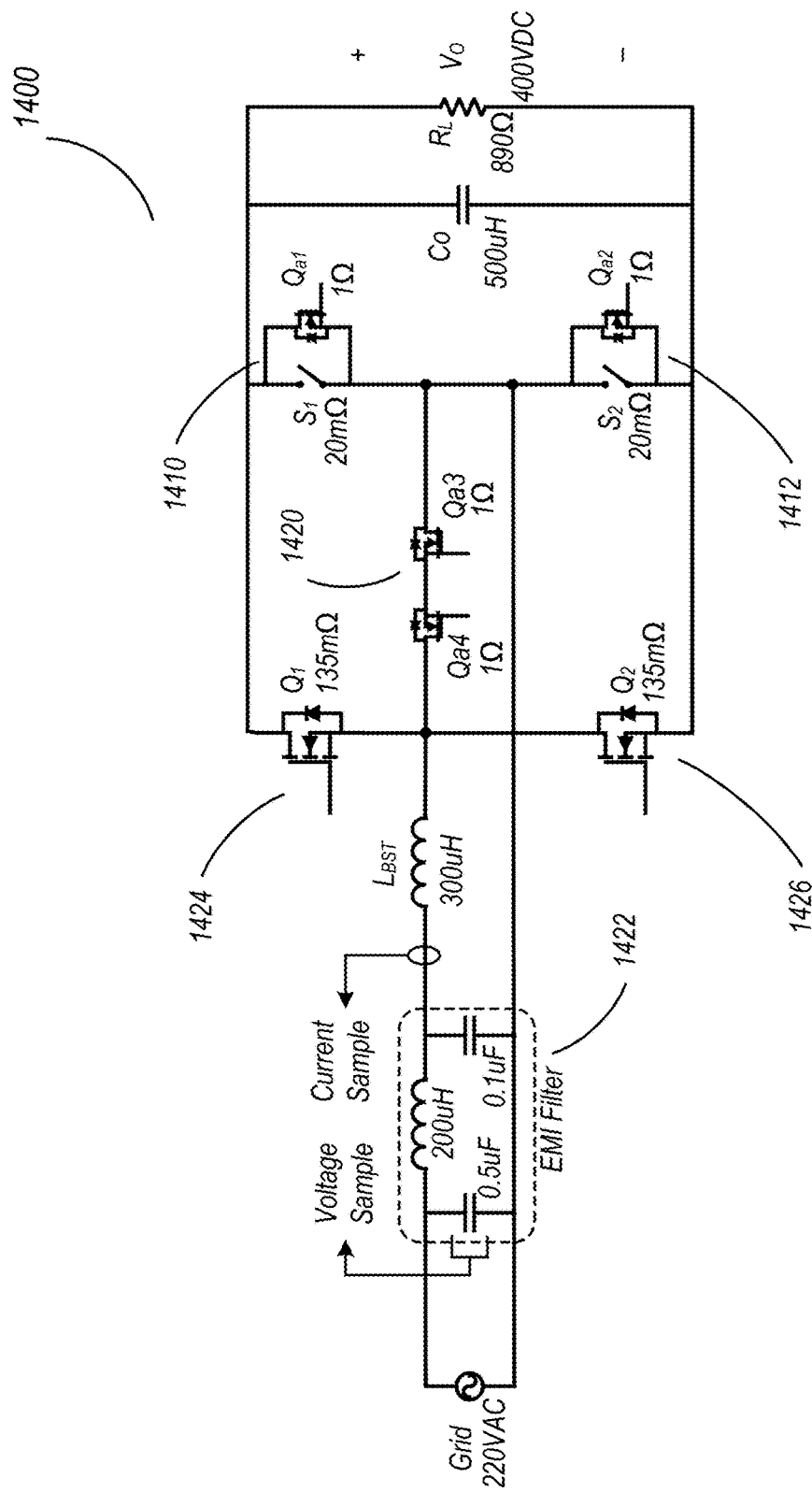
FIG. 14 is a circuit diagram of a computer simulated model of a proposed Totem-Pole Boost AC-to-DC converter using MEMS switches, according to some embodiments.

Simulation Verification:

Computer simulation was performed to verify the operation of the proposed AC-to-DC converter using MEMS switches 1400 to verify that true Zero-Current-Zero-Voltage turn-off and true Zero-Voltage-Zero-Current turn-on can be achieved for MEMS switches. A computer simulation model of Totem-Pole Boost AC-to-DC converter, as shown in FIG. 14, is used in the simulation. In circuit 1400, the input EMI filter 1422 is added. Circuit 1400 contains a first and second MEMs rectifier 1410 and 1412, containing respectively, a MEMS switch S1 and S2, and a voltage clamp switch Qa1 and Qa2. The MEMS switches S1 and S2 are connected in parallel with the voltage clamp switch Qa1 and Qa2. Circuit 1400 further contains a first and a second high frequency switching device 1424, 1426, and a current diverting circuit 1420 containing two switches Qa3 and Qa4.

Figure 15A:
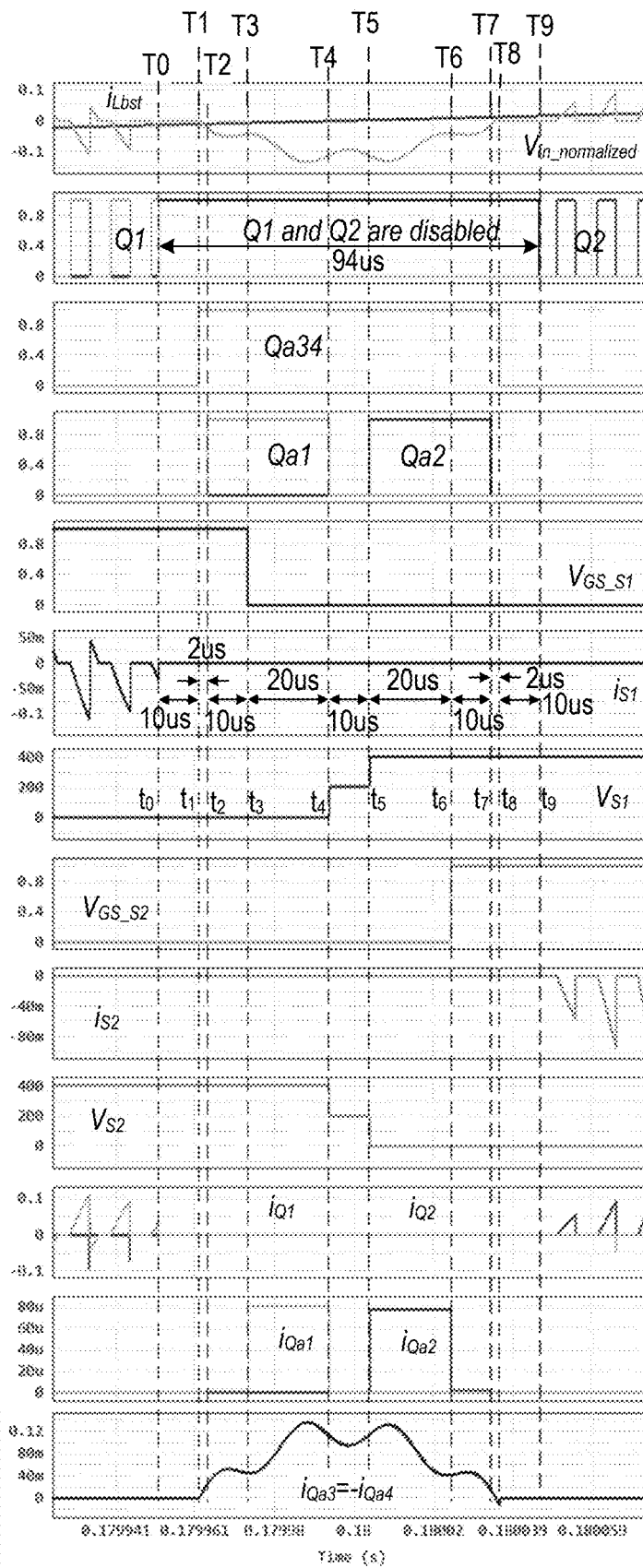
FIG. 15A is a simulated wave form graph for AC voltage zero-crossing from a negative value to a positive value, for the circuit shown in FIG. 14, according to some embodiments.
Figure 15B:
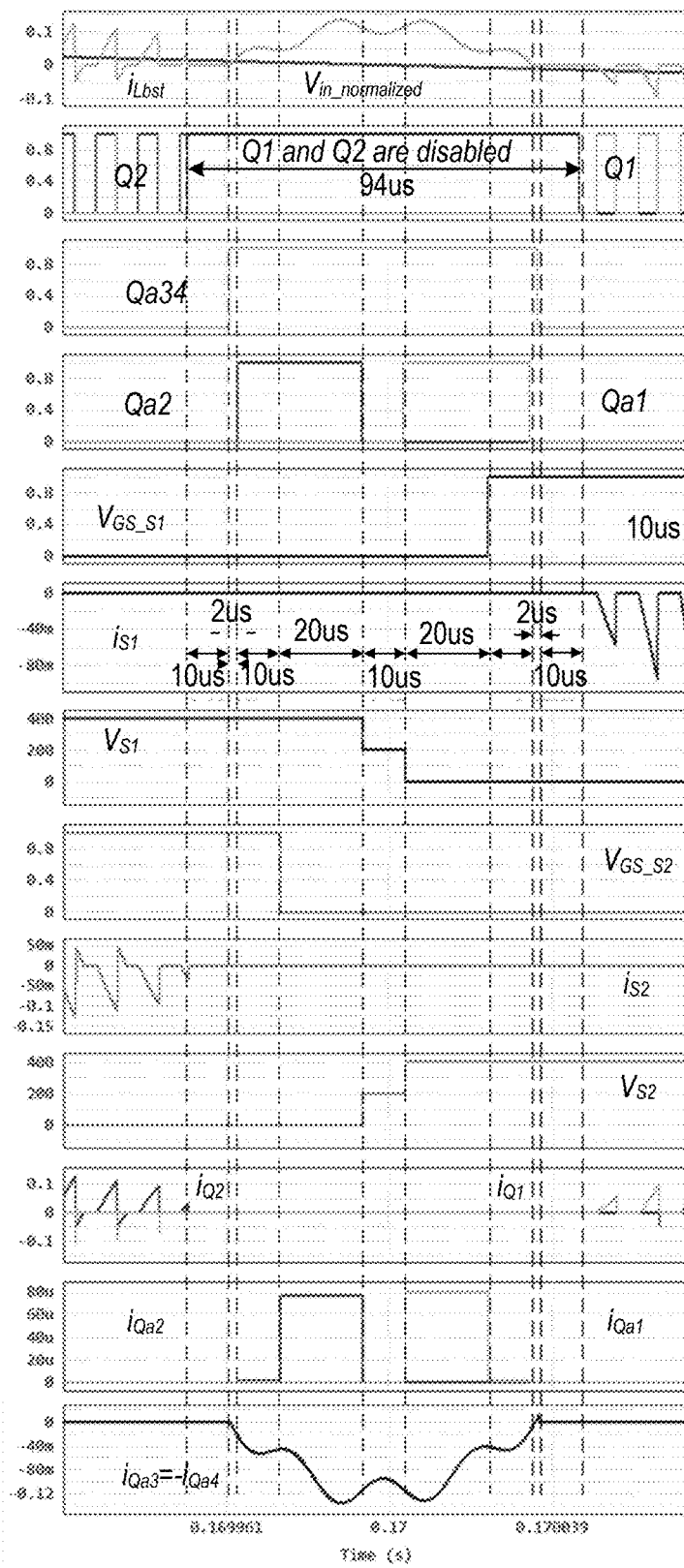
FIG. 15B is a wave form graph for the simulated waveforms of the AC voltage zero-crossing from a positive value to a negative value, for the circuit shown in FIG. 14, according to some embodiments.

FIG. 15A shows the simulated waveforms for AC voltage Vac zero-crossing from a negative value to a positive value for circuit 1400. FIG. 15B shows the simulated waveforms for AC voltage Vac zero-crossing from a positive value to a negative value.

Figure 16:
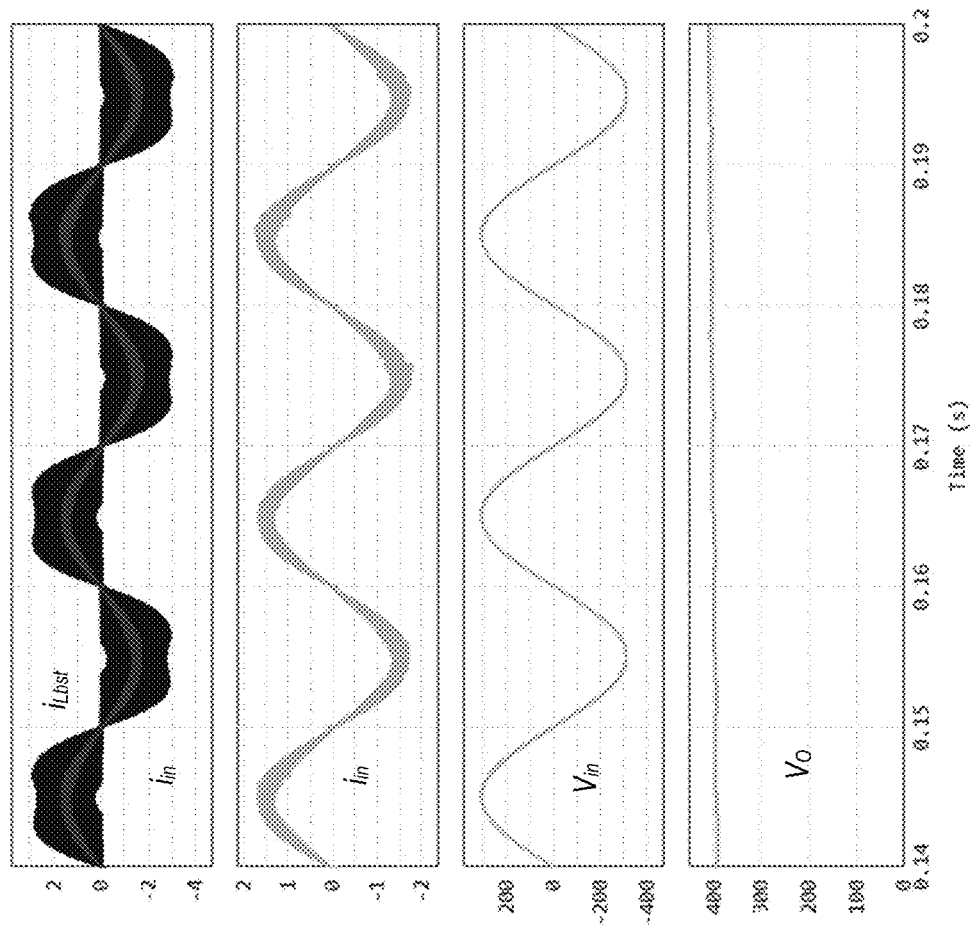
FIG. 16 is a wave form graph for the simulated waveforms of the input AC voltage, AC current, Boost inductor current and output voltage, over several line cycles, for the circuit shown in FIG. 14, according to some embodiments.

FIG. 16 shows simulated waveforms of input AC voltage Vin, AC current $I_{in}$, Boost inductor current $I_{LBst}$ and the output voltage Vo, over several line cycles.

The following description focuses on the AC voltage Vac/Vin zero-crossing transition from a negative value to a positive value, with reference to FIG. 14. The AC voltage zero-crossing transition from positive to negative voltage will be symmetrical. The equivalent circuit at each interval is shown in FIGS. 5A to 5K. In these circuits, the red lines denote the main current flow path.

Based on the waveforms shown in FIG. 15A, the transition time is divided into 9 intervals that will be discussed in the following.

At interval 0 (t<T0):

Before the converter 1400 enters to the transition time and when Vac<0, Q1 of the first high frequency switching device 1424 is operating as the main switch and Q2 of the second high frequency switching device 1426 is the synchronous rectifier. Also, S1 of the first MEMS rectifier 1410 is conducting and S2 of the second MEMS rectifier 1412 is in the off-state, as shown in FIG. 5A.

At t=T0, the gate of Q1 and Q2 are disabled and both switches enter the off-state.

At interval 1 [T0 T1]:

When Vac (AC voltage) is close to zero, such as about 1V, Q1 is turned off and the gate of Q2 is disabled. The threshold AC voltage Vac when Q1 and Q2 are disabled is a design parameter. While Q1 and Q2 have transitioned to the off-state, S1 of the first MEMS rectifier 1410 is still in the on-state. A very small amplitude high frequency current is circulating through S1 and the output capacitors of Q1 and Q2 as shown in FIG. 5B.

Based on the values obtained from the simulation, the current amplitude is lower than 5 mA.

At interval 2 [T1 T2]:

After Q1 enters the off-state, Qa3 and Qa4 transition to the on-state at t=T1, after a delay time (i.e., between T1 and T0, as shown in FIG. 6). In this case, a delay time of 10 us is used. The time delay may be in the range of 1 us to 20 us. In some embodiments, the delay time may be between 5 us and 40 us. In some embodiments, the delay time may be less than 5% to 10% of the line cycle. The optimal delay time will be adjusted during practical implementation. The switching time of a MOSFET may be very small (less than around 100 nano second), and the delay time between T0 and T1 can be as small as 1 us. In some embodiments, the delay time may be set to a smaller value than 1 us. After the 10 us delay time, auxiliary switches Qa3 and Qa4 of the current diverting circuit 1420 are turned on and enter the on-state at T1. The time delay between turning-off of Q1 and turn-on of Qa3 and Qa4 may be 10 us (as used in the simulation). The small amount of input voltage across the input inductor $L_{BST}$ generates a small current that goes through Qa3 and Qa4 (FIG. 5C). When Qa3 and Qa4 transition to the on-state, the current through S1 of the first MEMS rectifier 1410 drops to lower than 50 uA. In some embodiments, the current through S1 is zero.

At interval 3 [T2 T3]:

After Qa3 and Qa4 transition to the on-state, the Boost inductor current $L_{BST}$ will flow through Qa3 and Qa4 of the current diverting circuit 1420. At this point, the current through S1 is zero so therefore S1 is ready to transition to the off-state.

At t=T2, Qa1 of the first MEMS rectifier 1410 transitions to the on-state. Since the on-resistance of Qa1 and S1 are set to be 1Ω and 20 mΩ, respectively, at this moment the current going through S1 does not change significantly. However, turning Qa1 on ensures that after S1 transitions to the off-state, the voltage across S1 will still be zero (FIG. 5D).

At interval 4 [T3 T4]:

At t=T3, S1 of the first MEMS rectifier 1410 transitions to the off-state. At this moment (i.e. when S1 transitions to the off-state), the voltage across S1 is about zero (Vs1<50 uV). This small voltage is achievable due to the small current going through Qa1 of the first MEMS rectifier 1410.

Consequently, based on simulations, the voltage and current of S1 when it transitions to the off-state are 50 uA and 50 uV, respectively (FIG. 5E).

After S1 of the first MEMS rectifier 1410 has transitioned to the off-state, its voltage is clamped by Qa1 to a very low level, such as 50 uV because the current through S1 before it transitioned to the off-state was very small (about zero).

At interval 5 [T4 T5]:

With a delay of 20 us (as used in the simulation), during this delay time, the contacts inside S1 of the first MEMS rectifier 1410 will be stabilized to an open position. Qa1 transitions to the off-state at t=T4. It is noted that we will need to determine this delay time, between S1 turn-off and Qa1 turn-off based on the characteristics of the MEMS switch used in the design. In the simulation, MEMS switch MM9200 is used. As the turn-off time of a typical MEMS switch is around 1 us to 5 us, the delay time between T3 (when MEMS switch S1 is turned off) and T4 (when Qa1 is turned off) should be longer than the turn-off time of the MEMS switch S1. In the simulation, 20 us is used. In the practical design, it is suggested that this delay time be at least two times the turn-off time of the MEMS switches S1 or S2. In some embodiments, a longer delay time may ensure that MEMS switch is turned off reliably. In some embodiments, the range of the delay time may be around 10 us to 50 us.

At t=T4, following the delay time, Qa1 transitions to the off-state. At this moment, the output voltage Vo is being shared between S1 and S2. In some embodiments, the output voltage will be equally shared across S1 and S2 (VS1=VS2=Vo/2), as shown in FIG. 15A. In some embodiments, because of the output capacitance on Q1 and Q2 of the first and second high frequency switching device 1424, 1426, it takes time for the capacitors of Q1 and Q2 to change their voltage. So during this interval we assume that VS1 is slightly larger than Vo and VS2 is slightly smaller than Vo (FIG. 5F). This does not have any impact on the operation of S1 and S2 in the first and second MEMS rectifier 1410, 1412.

At interval 6 [T5 T6]:

After S1 of the first MEMS rectifier 1410 has transitioned to the off-state, the process to transition S2 to the on-state can begin. A delay time of 10 us was used in the simulation between T4 and T5. In practical design, this delay time may be adjusted from 1 us to 20 us. As the inductor current $I_L$ at this moment (zero crossing of AC voltage) is very small and it flows through Qa3 and Qa4 of the current diverting circuit 1420, the current through Qa2 is very small, such as 50 uA.

At t=T5, Qa2 of the second MEMS rectifier 1412 transitions to the on-state, and Qa3 and Qa4 are still conducting (i.e. in the on-state). A small AC current Iac (<50 uA) goes through Qa2 of the second MEMS rectifier 1412 and makes the voltage across S2 about 50 uV (FIG. 5G).

At interval 7 [T6 T7]:

After a 10 us delay from T5,

At t=T6, S2 of the second MEMS rectifier 1412 transitions to the on-state. Since the on-resistance of S2 is much smaller than Qa2, Qa2 carries almost all the current (<50 uA). Therefore, S2 enters the on-state at a threshold voltage and current of about 50 uA and 50 uV (FIG. 5H), as obtained from computer simulation. In some embodiments, the current and voltage across S2 is about zero. It is noted that in power circuit operations, 50 uA and 50 uV is an extremely small value.

At interval 8 [T7 T8]:

After a 20 us delay from T6, Qa2 of the second MEMS rectifier 1214 begins to transition to the off-state. In the simulation, a delay time of 20 us is used. In practice, the delay time (from T6 to T7) may be selected to ensure that MEMS switch S2 is reliably turned on. Considering that the turn-on time of a typical MEMS switch is around 1 us to 5 us, it is suggested that the delay time (from T6 and T7) be at least two times the turn-on time of the MEMS switch S2. In some embodiments, a range of 10 us to 50 us may be used. This delay time will be determined by the MEMS switch characteristics. Since no current flows through S2 of the second MEMS rectifier 1412, there is basically no transition as the threshold voltage and current have not been reached At t=T7, Qa2 of the second MEMS rectifier 1412 enters the off-state.

At t=T7, the current through S2 and Qa2 is very small (such as about zero), the current flowing through S2 will remain very small (such as about zero) after Qa2 is turned off. (FIG. 5I). At this moment, the transition of S1 from the on-state to the off-state and S2 from the off-state to the on-state is complete. S2 has now fully entered the on-state and is ready to carry current.

At interval 9 [T8 T9]:

After 10 us delay from T7,

At t=T8, Qa3 and Qa4 of the current diverting circuit 1420 transition to the off-state. Similarly, this delay time (from T7 to T8) may be adjusted from 1 us to 20 us. However, a very small current may still be circulating through S2 of the second MEMS rectifier 1412, and the converter 1400 is ready to operate for the positive half cycle (FIG. 5J).

Interval 10 (t>T9):

At t=T9, normal gate pulses are applied to Q1 and Q2 of the first and second high frequency current switching devices 1424, 1426. Q2 may operate as the main switch and Q1 may operate as the synchronous rectifier (FIG. 5K). The delay time between T8 and T9 may be in a range of 1 us to 20 us.

The proposed circuit topologies for the AC-to-DC Boost converter using a MEMS-rectifier as described above can be used in all types of AC-to-DC converters in order to reduce the power loss experienced by these AC-to-DC converters. For example, a MEMS-Rectifier may be used in miniature USB Type C power adapters to charge smart phones, tablets, and notebook computers. In this application, the output power is around 100 W to 250 W. The MEMS-Rectifier may also be used in AC-to-DC converters used in data center power supplies. In this application, the output power is around 1,000 W to 3,000 W. The MEMS-Rectifier may be used for fast charging of Electrical Vehicles (EV). In this application, the output power is around 6,600 W to 19,200 W.

In all these applications, the loss related to the diode can be reduced by 5 to 10 times and the overall efficiency of these proposed AC-to-DC converters will be increased accordingly.

In some embodiments, a processor, capable of executing a set of machine readable instructions, may be embedded within the proposed Boost AC-to-DC converter. In some embodiments, the machine readable instructions may be stored in a physical storage medium, including a non-transitory machine readable media. The processor may cause the proposed Boost AC-to-DC converters, upon executing the set of machine readable instructions, to control at least one high frequency switch into an off-state when the input AC voltage is close to zero, control a current diverting circuit to divert a flow of current from at least one MEMS switch within a MEMS rectifier in the on-state, to control at least one voltage clamp switch within a MEMS rectifier to transition to the on-state, to control at least one MEMS switch in a MEMS rectifier to transition from an on-state to an off-state when about zero voltage or current is present in the at least one MEMS switch, to control at least one voltage clamp switch to transition from an on-state to an off-state, to control at least one voltage clamp switch to transition from an off-state to an on-state, to control at least one MEMS switch to transition from an off-state to an on-state when about zero voltage or current is present in the at least one MEMS switch being transitioned, to control at least one voltage clamp switch and a current diverting circuit to transition from an on-state to an off-state.

In some embodiments, the processor may, upon executing a set of machine readable instructions, cause the proposed Boost AC-to-DC converters to be modulated based on the waveform control scheme shown in any of FIG. 6, FIG. 10, FIG. 11B and FIG. 12B.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments described above are intended to include within their scope such processes, machines, manufacture, compositions of matter, means, methods, or steps.

As can be understood, the examples described above and illustrated are intended to be exemplary only.

What is claimed is:

1. A boost AC-to-DC converter circuit for converting an input AC voltage of a voltage source into an output DC voltage, the boost AC-to-DC converter circuit comprising:
 a pair of micro-electro-mechanical systems (MEMS) rectifiers, each of the MEMS rectifiers of the pair of MEMS rectifiers having a MEMS switch connected in parallel with a voltage clamp switch;
 a current diverting circuit connected in series with the voltage source and sharing one common node with the pair of MEMS rectifiers, the current diverting circuit comprising at least one switch;
 a pair of high frequency switches connected in series and having a common node with the voltage source and the current diverting circuit, a first high frequency switch of the pair of high frequency switches connected in series with a first of the pair of MEMS rectifiers, and a second high frequency switch of the pair of high frequency switches connected in series with a second of the pair of MEMS rectifiers; and
 a capacitor connected in parallel with the pair of MEMS rectifiers;
 wherein the MEMS switches of each of the MEMS rectifiers, the voltage clamp switches of each of the MEMS rectifiers, the at least one switch in the current diverting circuit, and the pair of high frequency switches transition between an on-state and an off-state based on a corresponding gate voltage;
 wherein the corresponding gate voltage is generated by a control circuit based at least on the input AC voltage, an input AC current and the output DC voltage;
 wherein the control circuit modulates the corresponding gate voltages to achieve Zero-Voltage-Zero-Current turn-on and Zero-Current-Zero-Voltage turn off for the MEMS switches of each of the MEMS rectifiers; and
 wherein the control circuit generates the corresponding gate voltage for at least one of the MEMS switches and voltage clamp switches in the pair of MEMS rectifiers, the at least one switch in the current diverting circuit, and the pair of high frequency switches when the input AC voltage is approximately −5V or approximately +5V.

2. The boost AC-to-DC converter circuit of claim 1, wherein the voltage clamp switch of each of the MEMS rectifiers is either a MOSFET or a diode.

3. The boost AC-to-DC converter circuit of claim 1, wherein when the MEMS switches of each of the pair of MEMS rectifiers transition between the on-state and the off-state, the pair of high frequency switches are both in the off-state.

4. The boost AC-to-DC converter circuit of claim 1, wherein when the first high frequency switch of the pair of high frequency switches is in the on-state, the second high frequency switch of the pair of high frequency switches is in the off-state.

5. The boost AC-to-DC converter circuit of claim 1, wherein when the MEMS switch of each of the pair of MEMS rectifiers transitions between the on-state and the off-state, the voltage clamp switch connected in parallel to the respective MEMS switch of each of the pair of MEMS rectifiers is in the on-state.

6. The boost AC-to-DC converter circuit of claim 1, wherein a low on-resistor (Rds) value for the pair of high frequency switches is approximately 135 mΩ.

7. The boost AC-to-DC converter circuit of claim 1, wherein the boost AC-to-DC converter circuit is operated in discontinuous conduction mode and the pair of high frequency switches have a switching frequency of about 100 KHz.

8. The boost AC-to-DC converter circuit of claim 1, wherein the input AC current from the voltage source has a same sinusoidal waveform as the input AC voltage.

9. The boost AC-to-DC converter circuit of claim 1, wherein a current rating of the voltage clamp switch of each of the MEMS rectifiers in the pair of MEMS rectifiers is 5 to 10 times smaller than a current rating for the pair of high frequency switches and the MEMS switches in the pair of MEMS rectifiers.

10. The boost AC-to-DC converter circuit of claim 1, wherein the voltage clamp switch of each of the MEMS rectifiers has a low on-resistor (Rds) value that is about 10% to 20% of an Rds value for the pair of high frequency switches.

11. A boost AC-to-DC converter circuit for converting an input AC voltage of a voltage source into an output DC voltage, the boost AC-to-DC converter circuit comprising:
 a pair of micro-electro-mechanical systems (MEMS) rectifiers, each of the MEMS rectifiers of the pair of MEMS rectifiers having a MEMS switch connected in parallel with a voltage clamp switch;
 a current diverting circuit connected in series with the voltage source and sharing one common node with the pair of MEMS rectifiers, the current diverting circuit comprising at least one switch;
 a pair of high frequency switches connected in series and having a common node with the voltage source and the current diverting circuit, a first high frequency switch of the pair of high frequency switches connected in series with a first of the pair of MEMS rectifiers, and a second high frequency switch of the pair of high frequency switches connected in series with a second of the pair of MEMS rectifiers; and a capacitor connected in parallel with the pair of MEMS rectifiers;

wherein the MEMS switches of each of the MEMS rectifiers, the voltage clamp switches of each of the MEMS rectifiers, the at least one switch in the current diverting circuit, and the pair of high frequency switches transition between an on-state and an off-state based on a corresponding gate voltage;

wherein the corresponding gate voltage is generated by a control circuit based at least on the input AC voltage, an input AC current and the output DC voltage;

wherein the control circuit modulates the corresponding gate voltages to achieve Zero-Voltage-Zero-Current turn-on and Zero-Current-Zero-Voltage turn off for the MEMS switches of each of the MEMS rectifiers; and wherein the control circuit generates the corresponding gate voltage for at least one of the MEMS switches and voltage clamp switches in the pair of MEMS rectifiers, the at least one switch in the current diverting circuit, and the pair of high frequency switches when the input AC voltage is between approximately −1V to approximately −10V or between approximately +1V to approximately +10V.

12. The boost AC-to-DC converter circuit of claim 11, wherein the voltage clamp switch of each of the MEMS rectifiers is either a MOSFET or a diode.

13. The boost AC-to-DC converter circuit of claim 11, wherein the boost AC-to-DC converter circuit is operated in discontinuous conduction mode and the pair of high frequency switches have a switching frequency of about 100 KHz.

14. The boost AC-to-DC converter circuit of claim 11, wherein the input AC current from the voltage source has a same sinusoidal waveform as the input AC voltage.

15. The boost AC-to-DC converter circuit of claim 11, wherein a current rating of the voltage clamp switch of each of the MEMS rectifiers in the pair of MEMS rectifiers is 5 to 10 times smaller than a current rating for the pair of high frequency switches and the MEMS switches in the pair of MEMS rectifiers.

16. The boost AC-to-DC converter circuit of claim 11, wherein the voltage clamp switch of each of the MEMS rectifiers has a low on-resistor (Rds) value that is about 10% to 20% of an Rds value for the pair of high frequency switches.

17. The boost AC-to-DC converter circuit of claim 11, wherein when the MEMS switches of each of the pair of MEMS rectifiers transition between the on-state and the off-state, the pair of high frequency switches are both in the off-state.

18. The boost AC-to-DC converter circuit of claim 11, wherein when the first high frequency switch of the pair of high frequency switches is in the on-state, the second high frequency switch of the pair of high frequency switches is in the off-state.

19. The boost AC-to-DC converter circuit of claim 11, wherein when the MEMS switch of each of the pair of MEMS rectifiers transitions between the on-state and the off-state, the voltage clamp switch connected in parallel to the respective MEMS switch of each of the pair of MEMS rectifiers is in the on-state.

20. The boost AC-to-DC converter circuit of claim 11, wherein a low on-resistor (Rds) value for the pair of high frequency switches is approximately 135 mΩ.

* * * * *